(12) United States Patent
Hicok et al.

(10) Patent No.: US 11,874,663 B2
(45) Date of Patent: Jan. 16, 2024

(54) SYSTEMS AND METHODS FOR COMPUTER-ASSISTED SHUTTLES, BUSES, ROBO-TAXIS, RIDE-SHARING AND ON-DEMAND VEHICLES WITH SITUATIONAL AWARENESS

(71) Applicant: NVIDIA Corporation, Santa Clara, CA (US)

(72) Inventors: Gary Hicok, Mesa, AZ (US); Michael Cox, Menlo Park, CA (US); Miguel Sainz, Palo Alto, CA (US); Martin Hempel, Mountain View, CA (US); Ratin Kumar, Cupertino, CA (US); Timo Roman, Uusimaa (FI); Gordon Grigor, San Francisco, CA (US); David Nister, Bellevue, WA (US); Justin Ebert, Boulder, CO (US); Chin-Hsien Shih, Saratoga, CA (US); Tony Tam, Redwood City, CA (US); Ruchi Bhargava, Redmond, WA (US)

(73) Assignee: NVIDIA Corporation, Santa Clara, CA (US)

(*) Notice: Subject to any disclaimer, the term of this patent is extended or adjusted under 35 U.S.C. 154(b) by 0 days.

(21) Appl. No.: 17/896,825

(22) Filed: Aug. 26, 2022

(65) Prior Publication Data
US 2022/0413497 A1    Dec. 29, 2022

Related U.S. Application Data

(62) Division of application No. 16/286,330, filed on Feb. 26, 2019, now Pat. No. 11,474,519.
(Continued)

(51) Int. Cl.
*G05D 1/00* (2006.01)
*G06Q 50/30* (2012.01)
(Continued)

(52) U.S. Cl.
CPC ......... *G05D 1/0088* (2013.01); *G05B 13/027* (2013.01); *G05D 1/0055* (2013.01);
(Continued)

(58) Field of Classification Search
CPC .. G05D 1/0088; G05D 1/0055; G05D 1/0242; G05D 1/0246; G05D 1/0257;
(Continued)

(56) References Cited

U.S. PATENT DOCUMENTS

| 8,436,862 B2 * | 5/2013 | Yu .............................. G06F 8/45 345/501 |
| 9,811,086 B1 * | 11/2017 | Poeppel ............. G06Q 10/0631 |

(Continued)

FOREIGN PATENT DOCUMENTS

| KR | 20210109410 A | * | 9/2021 |
| WO | WO-2019151995 A1 | * | 8/2019 |

OTHER PUBLICATIONS

Huang et al. "Adas on Cots with OpenCL: A Case Study with Lane Detection," IEEE Transactions on Computers 67, No. 4, Apr. 1, 2018 (published Oct. 4, 2017), https://ieeexplore.ieee.org/abstract/document/8057795. (Year: 2017).*

(Continued)

*Primary Examiner* — Donald J Wallace
*Assistant Examiner* — Daniel M. Robert
(74) *Attorney, Agent, or Firm* — Nixon & Vanderhye PC

(57) ABSTRACT

A system and method for an on-demand shuttle, bus, or taxi service able to operate on private and public roads provides situational awareness and confidence displays. The shuttle may include ISO 26262 Level 4 or Level 5 functionality and can vary the route dynamically on-demand, and/or follow a predefined route or virtual rail. The shuttle is able to stop at any predetermined station along the route. The system allows passengers to request rides and interact with the (Continued)

system via a variety of interfaces, including without limitation a mobile device, desktop computer, or kiosks. Each shuttle preferably includes an in-vehicle controller, which preferably is an AI Supercomputer designed and optimized for autonomous vehicle functionality, with computer vision, deep learning, and real time ray tracing accelerators. An AI Dispatcher performs AI simulations to optimize system performance according to operator-specified system parameters.

20 Claims, 72 Drawing Sheets

Related U.S. Application Data

(60) Provisional application No. 62/635,503, filed on Feb. 26, 2018.

(51) Int. Cl.
   G05B 13/02   (2006.01)
   G05D 1/02    (2020.01)
   G06Q 10/02   (2012.01)

(52) U.S. Cl.
   CPC ......... G05D 1/0242 (2013.01); G05D 1/0246 (2013.01); G05D 1/0257 (2013.01); G06Q 10/02 (2013.01); G06Q 50/30 (2013.01); G05D 2201/0213 (2013.01)

(58) Field of Classification Search
   CPC ......... G05D 2201/0213; G05B 13/027; G06Q 10/02; G06Q 50/30
   See application file for complete search history.

(56) References Cited

U.S. PATENT DOCUMENTS

| | | | | |
|---|---|---|---|---|
| 10,429,846 | B2* | 10/2019 | Nix | B60W 50/0097 |
| 10,452,974 | B1* | 10/2019 | Cosic | G06N 5/022 |
| 10,665,140 | B1* | 5/2020 | Ahn | B60Q 1/04 |
| 10,803,089 | B1* | 10/2020 | Seibert | A63F 13/67 |
| 2011/0161616 | A1* | 6/2011 | Tarjan | G06F 9/384 |
| | | | | 711/170 |
| 2018/0136655 | A1* | 5/2018 | Kim | G05D 1/0088 |
| 2018/0201273 | A1* | 7/2018 | Xiao | B60W 30/18154 |
| 2018/0238698 | A1* | 8/2018 | Pedersen | G05D 1/0285 |
| 2018/0300964 | A1* | 10/2018 | Lakshamanan | G06F 9/5027 |
| 2019/0080514 | A1* | 3/2019 | Nasi | G06T 19/006 |
| 2019/0187705 | A1* | 6/2019 | Ganguli | B60W 30/12 |
| 2019/0263422 | A1* | 8/2019 | Enthaler | G06V 40/107 |

OTHER PUBLICATIONS

Marcher et al. "Automotive Embedded Software: Migration Challenges to Multi-Core Computing Platforms," (2015) https://ieeexplore.ieee.org/stamp/stamp.jsp?tp=&arnumber=7281937 (Year: 2015).*

Lee et al., "VADI: GPU Virtualization for an Automotive Platform," IEEE Transactions on Industrial Infomatics 12, No. 1 (Feb. 2016), https://ieeexplore.ieee.org/document/7359144 (Year: 2016).*

Lari et al. "Techniques for on-demand structural redundancy for massively parallel processor arrays," Journal of Systems Architecture 61, No. 10 (Nov. 2015): 615-627, https://www.sciencedirect.com/science/article/pii/S1383762115001186 (Year: 2015).*

En.wikipedia.org s.v. "massively parallel," accessed Dec. 13, 2022, https://en.wikipedia.org/wiki/Massively_parallel (Year: 2022).*

Eda Kavlakoglu, "AI vs. Machine Learning vs. Deep Learning vs. Neural Networks: What's the Difference?," published on May 27, 2020 (https://www.ibm.com/cloud/blog/ai-vs-machine-learning-vs-deep-learning-vs-neural-networks). (Year: 2020).*

* cited by examiner

Client

| 1000. Traveler Mobile | 3000. Traveler Desktop |
|---|---|
| 2000. Traveler Kiosk | 4000. Management/Setup |
| 520. In-Cabin | |

Server

5000. Dispatch Controller

Vehicle

100. In-Vehicle Controller

FIGURE 2B

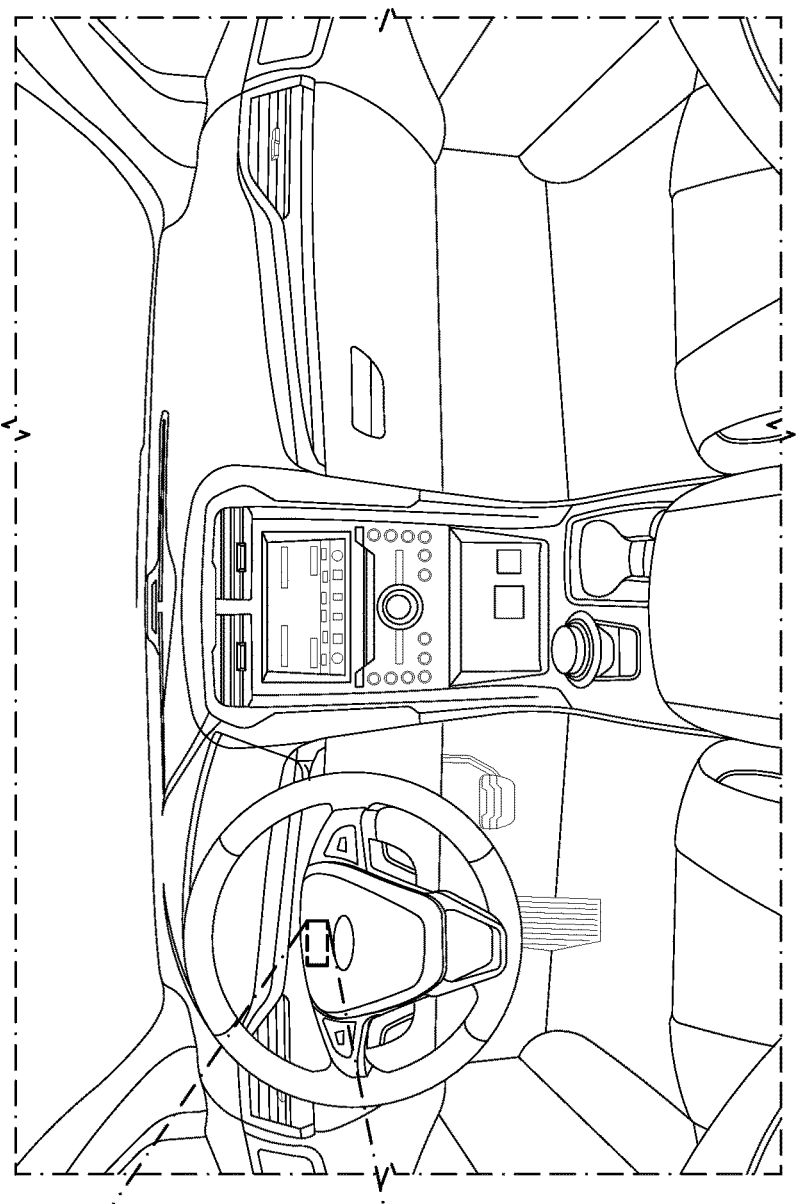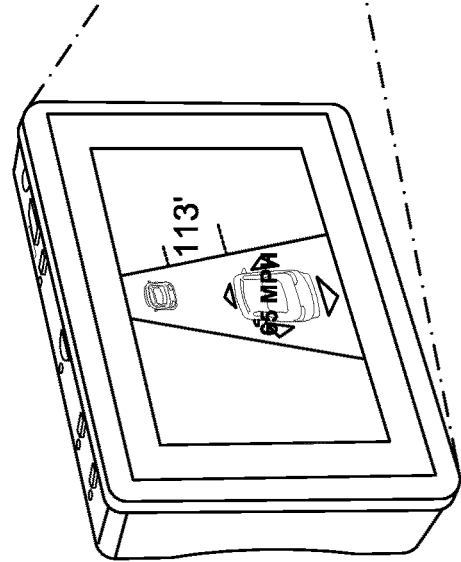
FIGURE 21A

SYSTEMS AND METHODS FOR COMPUTER-ASSISTED SHUTTLES, BUSES, ROBO-TAXIS, RIDE-SHARING AND ON-DEMAND VEHICLES WITH SITUATIONAL AWARENESS

CROSS-REFERENCE TO RELATED APPLICATIONS

This application is a divisional of U.S. application Ser. No. 16/286,330 filed Feb. 26, 2019, which claims benefit of U.S. Provisional Application No. 62/635,503 filed Feb. 26, 2018. These applications are incorporated herein by reference in their entirety and for all purposes.

STATEMENT REGARDING FEDERALLY SPONSORED RESEARCH OR DEVELOPMENT

None.

FIELD

The technology herein relates to autonomous and computer-assisted vehicles, and more particularly to autonomous and semi-autonomous shuttles, buses, robo-taxis, ride-sharing and on-demand vehicles.

BACKGROUND

Applications Incorporated by Reference

"Programmable Vision Accelerator", U.S. Provisional Patent Application Ser. No. 62/156,167 filed on May 1, 2015.
"Programmable Vision Accelerator", U.S. patent application Ser. No. 15/141,703 filed Apr. 28, 2016.
"Reliability Enhancement Systems and Methods" U.S. patent application Ser. No. 15/338,247 filed Oct. 28, 2016.
"Methodology of Using a Single Controller (ECU) For a Fault-Tolerant/Fail-Operational Self-Driving System", U.S. Provisional Patent Application Ser. No. 62/524,283) filed on Jun. 23, 2017.
"Method of Using a Single Controller (ECU) For a Fault-Tolerant/Fail-Operational Self-Driving System", U.S. patent application Ser. No. 15/881,426 filed on Jan. 26, 2018.
"Systems and Methods for Safe and Reliable Autonomous Vehicles" U.S. Provisional Patent Application No. 62/584,549, filed Nov. 10, 2017.
"Systems and Methods for Safe And Reliable Autonomous Vehicles", U.S. patent application Ser. No. 16/186,473 filed Nov. 9, 2018 (the entirety of which is incorporated by reference, including in particular the hardware architectures such as FIG. 20 and associated description, and software architectures such as FIGS. 41 & 42 and associated description).
"System and Method for Controlling Autonomous Vehicles", U.S. Provisional Patent Application No. 62/614,466, filed Jan. 7, 2018.
"Guiding Vehicles through Vehicle Maneuvers Using Machine Learning Models", U.S. patent application Ser. No. 16/241,005, filed Jan. 7, 2019.
"System and Method for Safe Operation of Autonomous Vehicles", U.S. Provisional Patent Application No. 62/625,351, filed Feb. 2, 2018.
"System and Method for Safe Operation of Autonomous Vehicles", U.S. Provisional Patent Application No. 62/760,916, filed Nov. 13, 2018.
"System and Method for Safe Operation of Autonomous Vehicles", U.S. Provisional Patent Application No. 62/768,064, filed Nov. 15, 2018.
"Safety Procedure Analysis for Obstacle Avoidance in Autonomous Vehicles", U.S. patent application Ser. No. 16/265,780, filed Feb. 1, 2019.
"Conservative Control for Zone Driving of Autonomous Vehicles Using Safe Time of Arrival", U.S. Provisional Patent Application No. 62/628,831, filed Feb. 9, 2018.
"Controlling Autonomous Vehicles Using Safe Time of Arrival", U.S. Provisional patent application Ser. No. 16/269,921, filed Feb. 7, 2018.
"System and Method for Sharing Camera Data Between Primary and Backup Controllers in Autonomous Vehicle Systems", U.S. Provisional Patent Application No. 62/629,822, filed Feb. 13, 2018.
"Sharing Sensor Data Between Multiple Controllers To Support Vehicle Operations", U.S. Provisional patent application Ser. No. 16/273,707, filed Feb. 12, 2019.
"Pruning Convolutional Neural Networks for Autonomous Vehicles and Robotics", U.S. Provisional Patent Application No. 62/630,445 filed Feb. 14, 2018.
"Pruning Convolutional Neural Networks", U.S. Provisional patent application Ser. No. 16/246,414 filed Jan. 11, 2019.
"Methods for accurate real-time object detection and for determining confidence of object detection suitable for autonomous vehicles" U.S. Provisional Patent Application No. 62/631,781, filed Feb. 18, 2018.

SUMMARY

Safe, cost-effective transportation for everyone has long been a goal for modern societies. While privately-owned individual vehicles provide significant freedom and flexibility, shared vehicles can be cost-effective, friendly to the environment, and highly convenient. The modern English word "bus" is a shortened form of "omibus" meaning "for all" in Latin. Anyone who has ridden a bus on express lanes past rush hour congestion, used a bus to take them to satellite airport parking or to school classes, called or hailed an on-demand vehicle to avoid a long walk on a cold dark night or to get home from an airport or train station, or taken a bus tour of a new city or other environment, knows firsthand the economy and convenience shared vehicles can provide. Such shared and on-demand vehicles are especially invaluable to the unsighted, the physically challenged, those too young or old to drive, and those who want to avoid the problems and expense associated with owning their own personal car.

While shared and on-demand vehicle operation often benefits from a human driver, there are contexts in which autonomous or semi-autonomous operation can be a tremendous advantage. For example, so-called "GoA4" automated train service has been used for some time in London, certain cities in Japan, and certain other places. The train between London's Victoria Station and Gatwick Airport is fully autonomous, meaning the train is capable of operating automatically at all times, including door closing, obstacle detection and emergency situations. On-board staff may be provided for other purposes, e.g. customer service, but are not required for safe operation. Copenhagen and Barcelona operate similarly-fully-autonomous subway trains. Other trains operate semi-autonomously, e.g., a computer system can safely move the train from station to station, but human personnel are still required to control doors, keep an eye out for safety, etc.

However, designing a system to autonomously drive a shared or on-demand vehicle not constrained to a physical rail without human supervision at a level of safety required for practical acceptance and use is tremendously difficult. An attentive human driver draws upon a perception and action system that has an incredible ability to react to moving and static obstacles in a complex environment. Providing such capabilities using a computer is difficult and challenging. On the other hand, automating such capabilities can provide tremendous advantages in many contexts. Computers never become fatigued or distracted. They can operate day and night and never need sleep. They are always available to give service. With an appropriate sensor suite, they can simultaneously perceive all points outside the vehicle as well as various points within a vehicle passenger compartment. Such computers could allow humans to focus on tasks only humans can do.

Some aspects of the example non-limiting technology herein thus provide systems, apparatus, methods and computer readable media suitable for creating and running autonomous or semi-autonomous shared transportation vehicles such as shuttle systems. "Shuttles" as used herein includes any suitable vehicle, including vans, buses, robotaxis, sedans, limousines, and any other vehicle able to be adapted for on-demand transportation or ride-sharing service.

Some example non-limiting systems include situational awareness based on machine perception and/or computer vision by a sensor suite that can rival and, in some aspects, even exceed perception capabilities of human drivers. Such situational awareness in many embodiments includes awareness (a) within the vehicle (e.g., within the vehicle's passenger compartment) and (b) outside of the vehicle (e.g., in front of the vehicle, behind the vehicle, to the left of the vehicle, to the right of the vehicle, above and below the vehicle, etc.). Such situational awareness can be supported by a sensor suite including a wide range of sensors (e.g., cameras, LIDARs, RADARs, ultrasonic, vibration, sound, temperature, acceleration, etc.) and may in some cases be interactive (e.g., the vehicle may interact with passengers within the passenger compartment and also may interact with pedestrians and other drivers).

Some example non-limiting systems include a software suite of client applications, server applications, and manager clients for operating the system on private and public roads. According to some non-limiting embodiments, the shuttle may follow a predefined route, which may be termed a "virtual rail", which is typically altered or deviated from minimally or only in specific conditions. The vehicle may generate the virtual rail itself based on stored, previous routes it has followed in the past. The vehicle in some embodiments is not confined to this virtual rail (for example, it may deviate from it when conditions warrant) but to reduce complexity, the vehicle does not need to generate a new virtual rail "from scratch" every time it navigates across a parking lot it has previously navigated. Such a virtual rail may include definitions of bus stops; stop signs, speed bumps and other vehicle stopping or slowing points; intersections with other paths (which the vehicle may slow down for); and other landmarks at which the vehicle takes specific actions. In some embodiments, the vehicle may be trained on a virtual rail by a human driver and/or receive information concerning the virtual rail definition from another vehicle or other source. However, in some embodiments it is desirable for the vehicle to calibrate, explore/discover, and map its own virtual rail because different vehicles may have different sensor suites. In typical implementations, the vehicle is constantly using its sensor suite to survey its environment in order to update a predefined virtual rail (if necessary, to take environmental changes into the account) and also to detect dynamic objects such as parked cars, pedestrians, animals, etc. that only temporarily occupy the environment, but which nevertheless must be avoided or accommodated.

The shuttle may stop at any point along the route, including unplanned stops requested by an on-board traveler or pedestrians wishing to ride on the shuttle. In other embodiments, the shuttle dynamically develops a "virtual rail" by performing a high definition dynamic mapping process while surveying the environment. In one example implementation, the shuttle ecosystem described herein for use on a college or corporate campus provides a seamless traveling experience from any point A to any point B in a campus service area, which may include locations that are on a private campus, off campus, or a combination of both.

In some non-limiting embodiments, the system uses a plurality of client applications, including human-machine interfaces ("HMI"), and devices that allow travelers to call for shuttle service, requesting pick-up time, pick-up location, and drop-off location. In non-limiting embodiments, the client applications include mobile applications provided on mobile or portable devices, which may include various operating systems including for example Android and iOS devices and applications and any other mobile OS or devices, including Blackberry, Windows, and others. In some embodiments, the system further includes a Web-based application or Desktop application, allowing users to summon a shuttle while sitting at their desk, in their home, etc. For example, the system preferably enables travelers to request a shuttle via a mobile app or kiosk terminals. The system preferably includes kiosks with large screen displays for implementing graphical implementations of Web Applications that allow users to summon shuttles and request service.

Once on-board, the passenger is able to interact with the shuttle via an on-board shuttle client-interface application, Passenger UX. In some embodiments Passenger UX includes camera-based feature recognition, speech recognition and visual information, as well as 3D depth sensors (to recognize passenger gestures, body poses and/or body movements). In some embodiments, the Passenger UX includes interactive displays and audio systems to provide feedback and information to the riders, as well as to allow the riders to make requests. The on-board displays may include standard read-only displays, as well as tablet or other touch-based interfaces. In some embodiments, Passenger UX is able to detect which display device a particular passenger is currently paying attention to and provide information relevant to that particular passenger on that display device. In some embodiments, Passenger UX is also able to detect, based on perception of the passenger, whether the passenger needs a reminder (e.g., the passenger is about to miss their stop because they are paying too much attention to a phone screen) or does not need a reminder (e.g., the passenger has already left their seat and is standing near the door ready to exit as soon as the door opens).

In the past, humans relied on intelligent agents such as horses or sled dogs to intelligently handle minute-to-minute navigation of a vehicle along a path, and the human driver was more concerned about overall safety. Similarly, in certain embodiments, one or more autonomous or semi-autonomous shuttles may include a human safety driver or other human attendant. In these embodiments, the shuttle preferably includes an on-board, integrated HMI comprising a Safety Driver UX, configured to inform the safety driver of the current vehicle status and operation mode. In some embodiments, the computer system pilots the vehicle and the safety driver gets involved only when necessary, and in other embodiments the safety driver is the primary vehicle pilot and the computer system provides an assist to increase safety and efficiency. In embodiments with a safety driver, the shuttle preferably includes an AI assistant or co-pilot system, providing multiple HMI capabilities to enhance safety. In preferred embodiments, the assistant or co-pilot includes features such as facial recognition, head tracking, gaze detection, emotion detection, lip reading, speech recognition, text to speech, and posture recognition, among others.

The shuttle preferably includes an External UX for communicating with the outside world, including third-party pedestrians, drivers, other autonomous vehicles, and other objects (e.g., intelligent traffic lights, intelligent streets, etc.).

In one aspect, the system preferably includes an AI Dispatcher ("AID") that controls the system, sets and adjust routes, schedules pick-ups, drop-offs, and sends shuttles into and out of service. A system operator communicates with the AI Dispatcher through a Manager Client ("MC") application that preferably allows the system operator to adjust system parameters and expressed preferences, such as, for example, average wait time, maximum wait time, minimum time to transport, shortest route(s), cost per person mile, and/or total system cost. The AI Dispatcher considers the operator's preferences, models the system, conducts AI simulations of system performance, and provides the most efficient shuttle routes and utilization consistent with the system operator's preferences. The AID may perform AI-enabled simulations that model pedestrians, third-party traffic and vehicles, based on the environmental conditions including weather, traffic, and time of day. The AID may also be used as a setup-utility, to determine the optimal location of system stops/stations for deployment, as well as the optimal number, capacity, and type of vehicles for a given system. The AID may be used to reconfigure an existing system or change the system settings and configurations for an existing system over a given timeframe.

The shuttles according to the present embodiment system and method can operate in a wide variety of different lighting and weather conditions, including Dusk/Dawn, Clear/Overcast, Day/Night, Precipitation, and Sunny conditions. Preferably, the system considers time of day, weather, traffic, and other environmental conditions to provide the desired level and type of service to travelers. For example, the system may dynamically adjust service parameters to reduce traveler wait times during inclement weather or night-time or react dynamically to address traffic conditions.

One example aspect disclosed herein provides a vehicle comprising: a propulsion system delivering power to propel the vehicle; a passenger space that can accommodate a passenger; first sensors configured to monitor an environment outside the vehicle; second sensors configured to monitor the passenger space; and a controller operatively coupled to the first and second sensors and the propulsion system, the controller including at least one GPU including a deep learning accelerator that, without intervention by a human driver: identifies a passenger to ride in the vehicle; controls the vehicle to take on the identified passenger; navigates the vehicle including planning a route to a destination; and controls the vehicle to arrange for the identified passenger to leave the passenger space at the destination.

The identifying may use the first sensors to recognize a gesture the passenger makes to signal that the passenger wishes to use the vehicle.

The identifying may be based on the passenger operating a mobile user device.

The passenger may specify the destination, and the controller may plan a route to the specified destination.

The controller may dynamically plan the route and navigate to the specified destination.

The first sensors may include a LIDAR sensor array, and the controller dynamically maps the environment around the vehicle using the LIDAR sensor array.

A signaling device on an exterior surface of the vehicle may be used to signal intention to pick up the passenger and/or to signal navigation intentions.

The vehicle may comprise a bus, a taxi, a limousine or a shuttle.

The vehicle may further comprise plural wheels in frictional contact with a surface, and the propulsion system drives the plural wheels to propel the vehicle across the surface.

The vehicle may include a passenger information confidence display disposed in the passenger compartment, the passenger information display providing confidence to the passenger.

The GPU may provide massively parallel processing and achieves an ISO 26262 level 4 or higher certification.

The second sensors may be configured to simultaneously sense activities of multiple passengers within the passenger space.

BRIEF DESCRIPTION OF THE DRAWINGS

The following detailed description of exemplary non-limiting illustrative embodiments is to be read in conjunction with the drawings of which:

FIG. 2B shows an example High-Level Architectural Overview.

FIG. 21A shows example alternative locations for a Safety Driver UX—I/O display;

DETAILED DESCRIPTION OF NON-LIMITING EMBODIMENTS

Figure 1A:
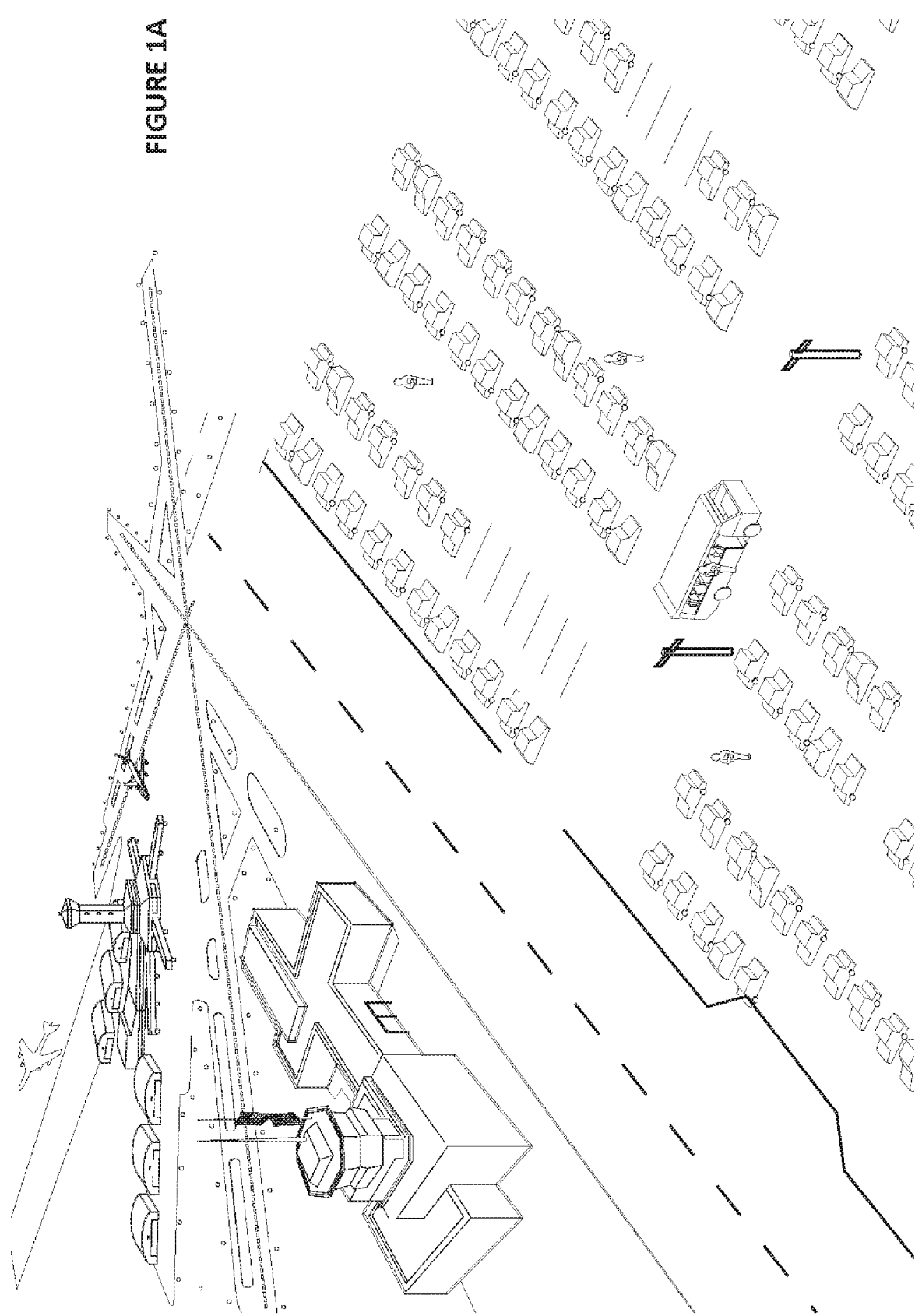
FIGS. 1A, 1B, and 1C show example use scenarios.
Figure 1B:
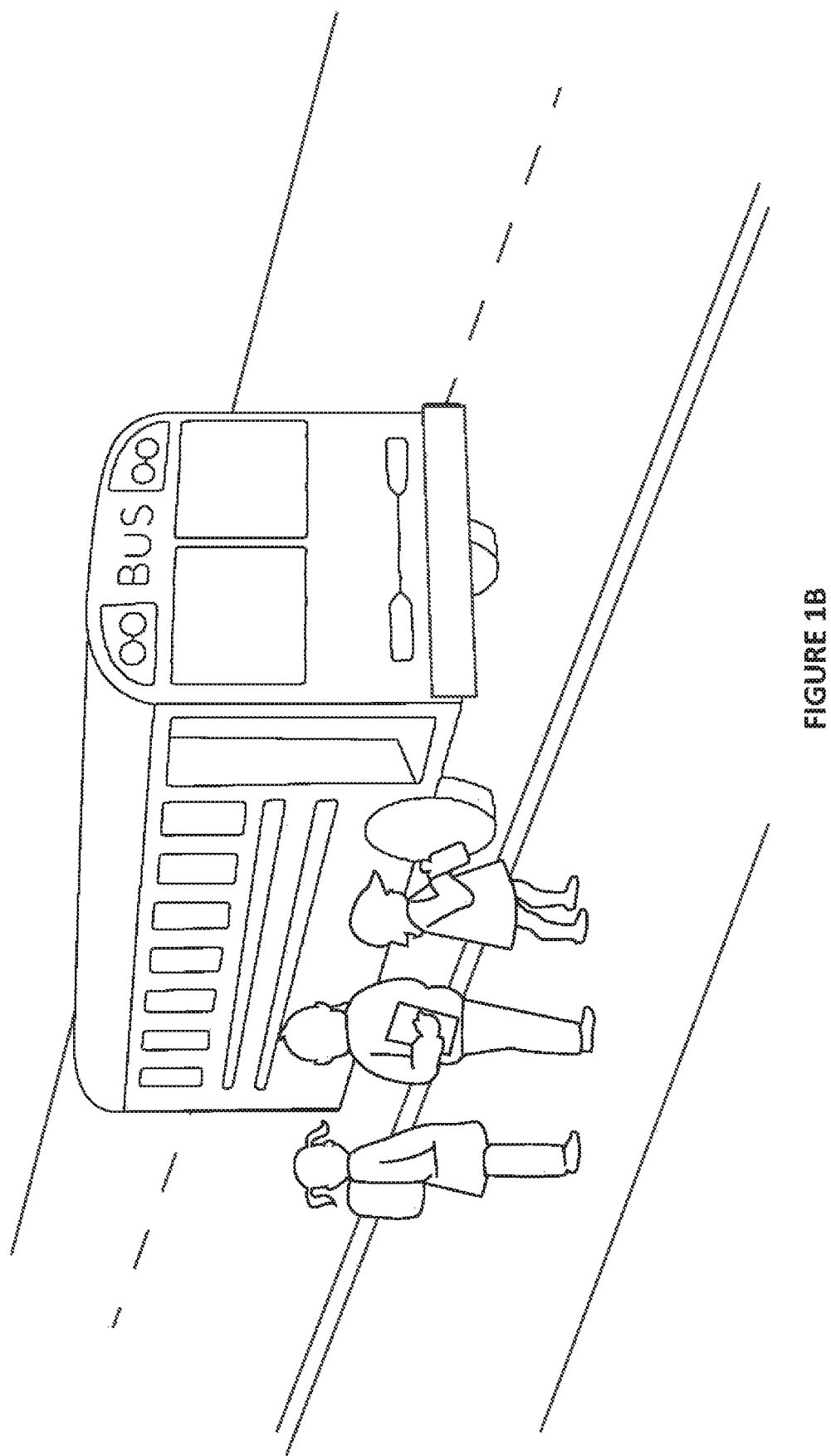
Figure 1C:
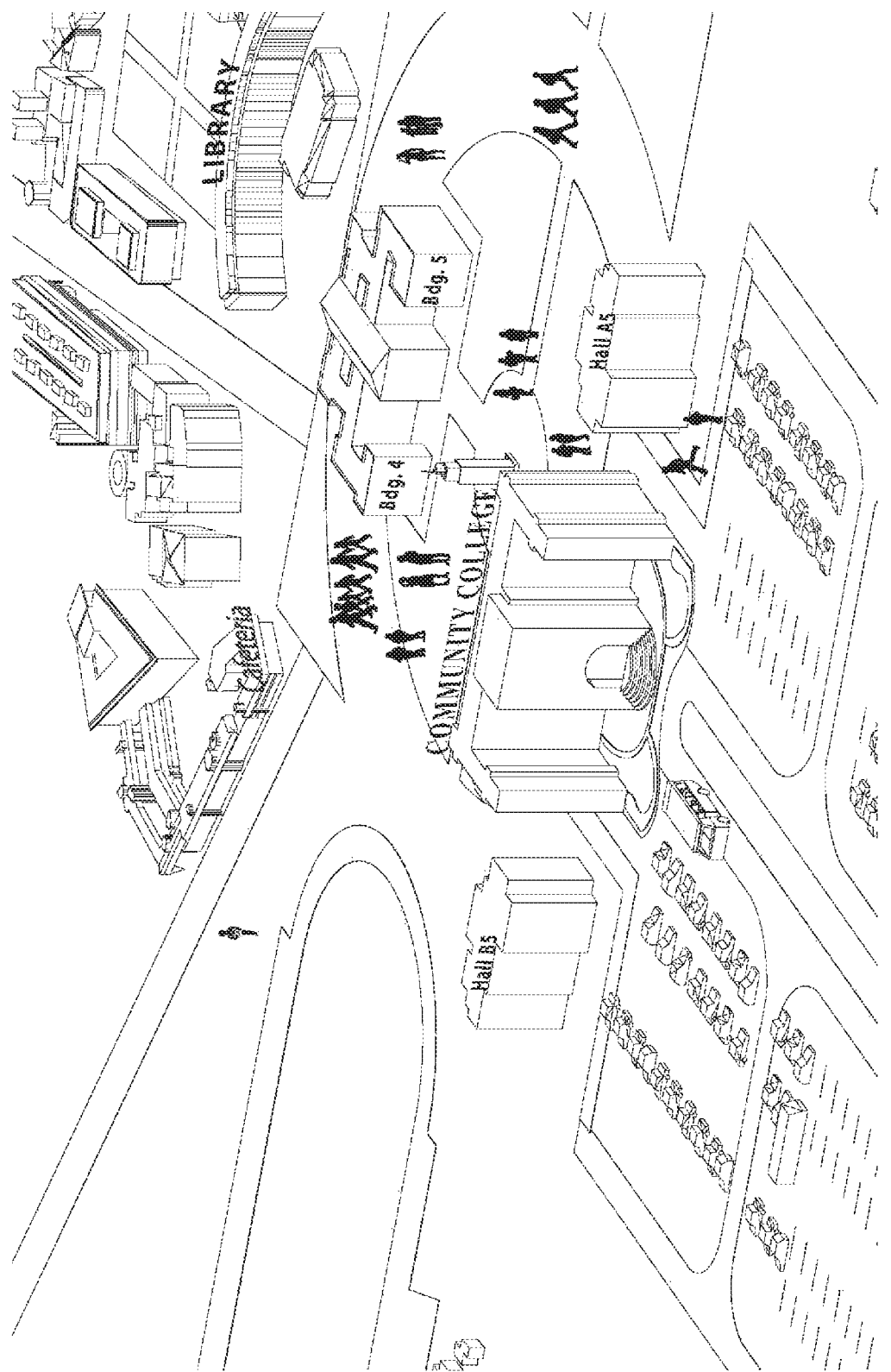

FIGS. 1A-1C show example scenarios including an autonomous, semi-autonomous or assisted shared or on demand vehicle operation including vans, buses, school buses, robo-taxis, sedans, limousines, and any other vehicle able to be adapted for on-demand transportation or ride-sharing service.

FIG. 1A for example shows a vehicle such as a shuttle bus that serves a satellite parking area for an airport. Airplane passengers going away for more than a few days park in the satellite parking area and then walk with their belongings to a nearby shuttle bus stop. The shuttle picks the passengers up at the stops and transports them to an airport terminal where the passengers check in to their flights.

FIG. 1B shows a school bus scenario where school children wait at a bus stop to be picked up by the school bus and transported to school.

FIG. 1C shows a shuttle bus used on a college or corporate campus. Passengers wait in front of a building (which may or may not have a predetermined bus stop) for a shuttle to pick them up and transport them to where they need to be next (e.g., next class, dorm, next meeting, cafeteria, etc.)

In the example non-limiting embodiments, a sensor suite on the vehicle is used for both for navigation and also for mapping. Use of the same sensor suite provides localization as well as other advantages.

Such environments as shown in FIGS. 1A-1C typically do not have lane markings and often lack physical boundaries such as lane dividers or curbs. Cars can drive anywhere in a parking lot, especially if the drivers ignore markings on the pavement. Speeds are generally low, but accuracy may be important due to tight or heavily congested spaces. Limited access highways, in contrast, are more structured because there is no parking on the side of the road, and the road boundaries tend to be more substantial or explicit, which makes it easier for the sensor suite to detect. Parking lots, residential streets and campus roads may thus, in some contexts, have some similarities to a parking lot or other unstructured driving spaces. Additional dynamic mapping based on LIDAR and other sensors may be desired in less structured environments such as these. Even in such unstructured or less structured driving environments, example non-limiting systems may develop a virtual rail, or such a virtual rail may be predefined for the vehicle.

One aspect of an example non-limiting system uses optical sensing such as LIDAR and optical cameras to generate and/or update a dynamic map of the environment the vehicle is operating within. Such mapping may be performed locally on the vehicle, in the cloud, or a combination. One example non-limiting embodiment filters dynamic objects out of the data set so the resulting map consists of static objects that remain stationary within the environment. For example, mapping of a tree-lined campus avenue may result in mapping information related to the trees lining the avenue, but the map excludes the vehicles that are traveling on the avenue, pedestrians walking along the sidewalk, and other dynamic objects. Environments that may be desirable to map include campuses, parking lots, and other relatively unconstrained driving environments. Mapping such environments can be challenging due to the absence of landmarks such as street signs, lane markers, utility or light poles or other regular virtual structures, and the like. Thus, mapping of campuses, parking lots and the like may need to be accomplished without the benefit of such standard features that may be present in many or most roadways. The sensor suite on the vehicle thus provides multiple solutions for generating an image or picture of the environment and providing the vehicle with perception.

The mapping algorithms may need to recognize parked cars since the cars are not necessarily permanent (for example, even a highly trafficked parking lot may be nearly empty on a Sunday morning). The mapping may thus recognize that the vehicle should not be driving on or through parking spaces whether or not they are currently occupied by parked cars.

In some example embodiments, such mapping for shuttles is based heavily on LIDAR with additional inputs from cameras, RADAR, sonar, etc. LIDAR can provide highly accurate ranging information, adding precision to allow a shuttle to navigate through tight spaces and detect small environmental features such as speed bumps. The resulting LIDAR based map for a campus environment may include for example, buildings, trees, and structural features of the driving environment such as e.g., curbs and wheelchair access ramps (so the shuttle can turn successfully without striking or going over curbs).

In the case of a predetermined route (e.g., for a shuttle bus), such high definition LIDAR based mapping can build highly localized, highly accurate map for the predetermined route rather than attempting to generate a more general map. In example non-limiting embodiments, the vehicle can reuse the same localized map over and over again while continually surveying the environment to update the map as needed. Some mapped features may change day by day or even minute by minute (e.g., a procession of pedestrians walking across a crosswalk to and from the cafeteria only at certain times of day) whereas other such features (e.g., buildings, trees, etc.) will remain relatively constant (in some climates, trees will change seasonally when they lose their leaves in autumn and grow new ones in spring).

In some example embodiments, the vehicle performs LIDAR based mapping continually in order to update its map with the most recent information based on the most recent conditions while filtering out dynamic objects (anything that changes relatively rapidly) and instead using dynamic object detection to detect such changing objects. The mapping algorithm in some embodiments may thus provide a sort of hysteresis in which features that remain constant or recurring for more than a certain time period are included in the map, and features that change more rapidly are excluded. Dynamic remapping and surveying may continually revisit map features to determine whether anything new needs to be added (e.g., a newly installed stop sign, or on many college campuses, a new building) or deleted (e.g., a now-removed speed bump). In case a new feature is added to the map (e.g., a new bus stop), the vehicle may decide autonomously what (if anything) to do with respect to it or wait for dispatch to notify it of a different or new action to take. Furthermore, the map can be structured for lower speed applications since in many contexts a shuttle will not exceed 20 or 25 mph. A map designed for higher speed autonomous vehicles may not require as much accuracy (for example, there are no speed bumps on a limited access highway except potentially at toll plazas).

Such localization used by example non-limiting mapping may sometimes reduce the reliance on GPS, which can have an accuracy (e.g., 8 meters) that is insufficient for a crowded shuttle parking lot. Thus, some embodiments use additional or alternative geolocation techniques such as beacons, virtual benchmarks, landmarks and other techniques to accurately geolocate the shuttle at all times. Similarly, a slow-speed shuttle's reliance on an on-board odometer for distance measurements places additional demands on the accuracy of the odometer sensor(s) because even a small percentage of error may significantly affect where the shuttle assesses itself to be relative to its actual location. Additional signal processing techniques such as filters can be used to increase the average precision of such sensing.

Once the mapping process generates a high definition map, the vehicle may use the dynamic map to perform route planning within the environment. The example non-limiting embodiment plots a "rail" and navigates the vehicle along the virtual rail while ensuring the vehicle does not collide with any dynamic objects. Meanwhile, the vehicle maintains situational awareness by using its sensor suite to detect certain types of dynamic objects that are of interest, e.g., a passenger trying to hail the vehicle.

Route optimization may be performed to prevent the vehicle from driving through dynamic objects. Navigation may also use LIDAR, cameras, RADAR, ultrasonics (sonar) and other sensors to detect dynamic objects and avoid collisions with them. For example, the controller may recognize a dynamic object ahead as a pedestrian, and slow down to give the pedestrian time to get out of the vehicle's path before the vehicle reaches the pedestrian.

Example Situational Awareness

Figure 1D:
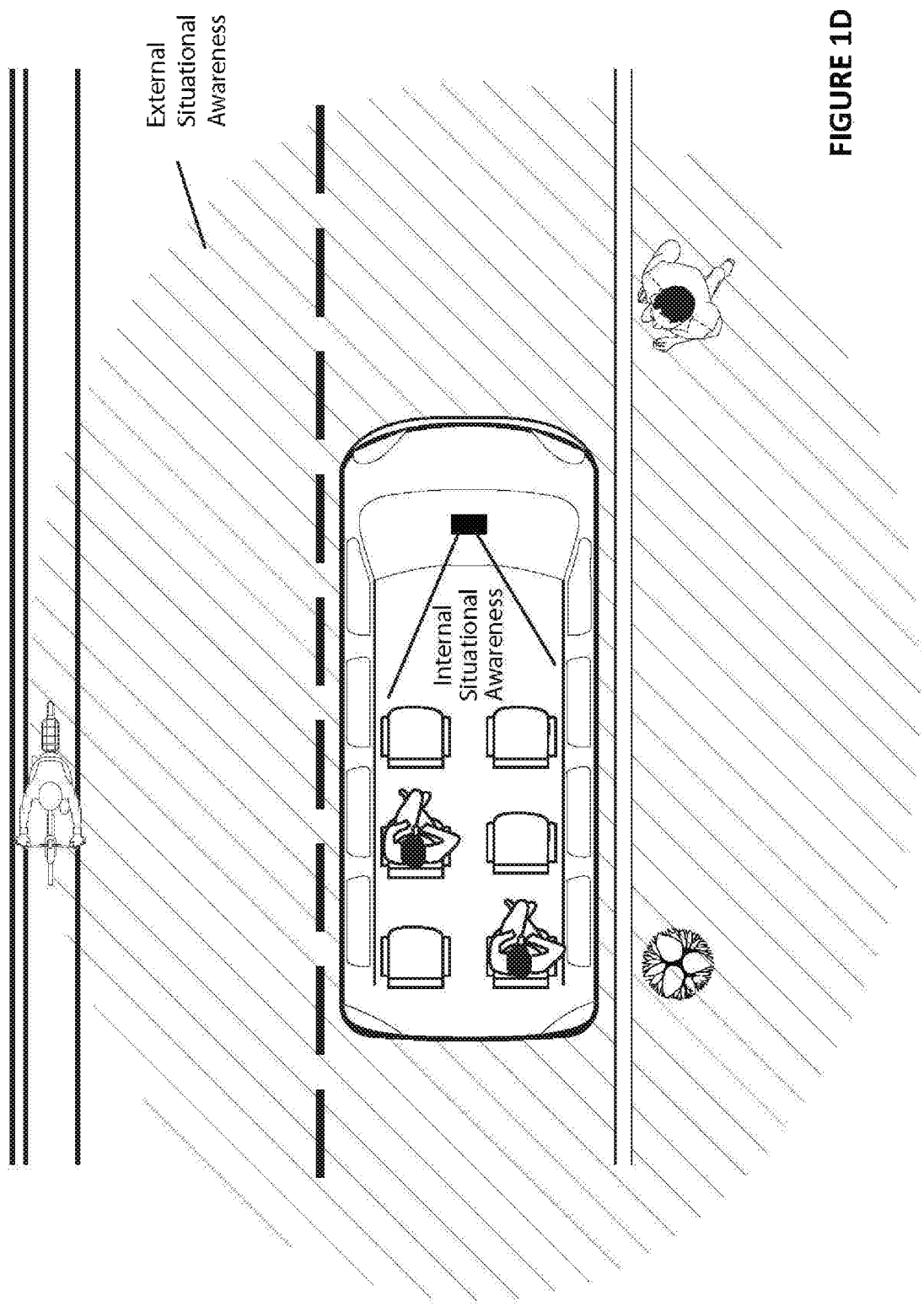
FIG. 1D illustrates situational awareness.

FIG. 1D shows an example vehicle with both internal situational awareness and external situational awareness. Sensors as described above are used both externally of the vehicle and internally of the vehicle to detect not necessarily just presence or obstacles, but along with neural networks and other machine learning, to become aware of the current situation and act or respond appropriately.

One aspect of situational awareness for shuttles involves perceiving potential passengers looking for a ride. For example, it is common in New York City to hail a taxicab by lifting your arm up and out and trying to make eye contact with the cab driver. In the context of a robo-taxi, there are no human eyes to make contact with but it can still be possible to signal the robo-taxi with a gesture such as sticking your arm out. In example embodiments, a neural network is trained to recognize hailing gestures and the robo-taxi can gently glide to the side of the street and automatically open a passenger door closest to the waiting potential passenger upon detecting such a gesture. Inward facing cameras may then detect that one or more passengers have entered the vehicle and are safely within it. Once all passengers are on board, the vehicle may automatically close its doors and announce, "Where do you want to go?" Voice recognition neural networks may detect a response, and a further neural network may be used to locate an address corresponding to the request (for example "the Statue of Liberty" or "the Empire State Building" are common requests that do not constitute addresses but which every cab driver in New York knows how to navigate to).

Dynamic internal and external situational awareness may be used to ensure high levels of safety. For example, the vehicle includes capabilities for automatically opening the passenger compartment door to allow passengers to enter and exit the vehicle. The vehicle controller can detect when the doors are open and ensure that the doors are not closed until an alighting passenger is safely inside and away from the doors. Such door control includes a safety aspect, whereby a controller uses inputs from the sensor suite to determine whether it is safe to open or close the doors. External dynamic situational awareness may be used to hold the vehicle at its current location so that a potential passenger running toward the vehicle can have a chance to board the vehicle before the vehicle closes its door and begins to move. A deep neural network accelerated by a deep learning accelerator hardware within a GPU may be used to perform such situational awareness in real time in order to ensure high levels of safety and accurate detection. Thus, proceeding, detecting and other operations may be performed very rapidly using advanced massively-parallel computing architectures including multiple GPUs and multiple CPUs to provide time-efficient operations and real time decision making that provides high levels of safety. Such deep learning can, for example, provide functionality that meets the expectations of passengers and others who are used to interacting with human-driven buses, taxi cabs, limousines, shuttles and other passenger vehicles. If the vehicle detects a special needs person, the vehicle may automatically lower the door entrance and if necessary, to deploy a ramp (e.g., to accommodate a wheelchair). If the vehicle detects a bicycle rider, it may unlatch a bicycle rack on the front or rear of the vehicle to accept the bicycle. When this particular passenger gets ready to disembark, the vehicle can automatically again unlatch the bicycle rack to allow the passenger to unload the bicycle. If a passenger has luggage, the vehicle can detect this and open a luggage compartment into which the passenger may deposit luggage. Once the luggage has been safely stowed, the vehicle can detect this and close the luggage compartment. The vehicle can also track who collects which luggage to ensure there are no mixups. The vehicle can provide personalized service to each individual passenger.

As another example, when a passenger within an automated vehicle stands up and moves closer to the door, inside-facing sensors may be used to detect such movement and change of position, and the controller (based on DNN analysis) may either reach a decision that the passenger intends to get off at the next stop or initiate a prompt querying the passenger orally via a paging system and voice recognition system to ask the passenger "Do you want to get off at the next stop?" Similarly, even though the vehicle may have already permitted all passengers to disembark at a particular stop and may have already picked up all passengers who are waiting at the stop, the vehicle may delay moving to the next stop if an additional passenger is running toward the vehicle waving her arms to signal that the vehicle should wait because she wants to get on board.

Outward facing sensors may detect the presence, position and change in position of such a potential passenger, and deep learning neural networks or other machine learning may recognize gestures or other movement in order to make a decision for controlling the vehicle to pause and wait to see if the running person in fact wants to board the vehicle. Outward facing sensors may track the position of the running person and if that person runs up to the door of the vehicle, the sensors may detect this, and the controller may open the door to allow the person to board the vehicle. Once on board, the interior facing sensors observe the newly boarded passenger and wait until she is seated safely before controlling the vehicle to begin moving.

The spatial scene within a shuttle can be large (for example, in a ten or twenty passenger vehicle, it may not be possible to predict where any particular passenger will sit. Accordingly, any number of (e.g., 9 or 10) cameras and/or other sensors may be used to capture all areas within the shuttle's interior without any blind spots. In each camera's perspective there will likely be multiple subjects of interest. The vehicle controller processes multiple camera image streams simultaneously. In this way, the vehicle is able to track the positions of all passengers at all times. Additionally, there is a lot to track in a shuttle environment. The passengers on board a shuttle can assume a variety of different positions and postures. Some may sit, others may stand. In some embodiments, the vehicle may detect subtle aspects of passenger posture (e.g., distance of feet apart, how strongly the passenger holds a rail or a handle) to for example assess the quality of the ride. On a shuttle there may not be any safety harnesses, so the vehicle may automatically adjust speed and route to ensure passenger safety. For example, if a passenger places a cup of coffee on the floor of the shuttle while sitting down, the vehicle may automatically detect this and slow down or otherwise modify its behavior to make gentler turns or take speed bumps more gradually in order to avoid spilling the coffee. Or if the deep learning system "knows" from experience that the particular route is likely to contribute to the coffee being spilled, the shuttle may orally warn the passenger to be careful with the coffee and that it is likely to spill unless covered or otherwise secured.

The vehicle can also automatically track passengers and their belongings. For example, if a passenger boarded the shuttle with a bag but left without it, the shuttle can keep the door open and signal the passenger (e.g., using loudspeakers, or via the passenger's mobile application) that he or she forgot a belonging. In other scenarios, leaving a bag on a shuttle may be a security risk that the vehicle may initiate a security protocol that involves alerting security personnel and driving to an inspection location to be immediately inspected to security personnel.

Different types of vehicles may impose different desired behaviors and/or constraints. For example, an automated school bus may require advanced monitoring to ensure children on board the bus stay in their seats and are not doing anything improper or dangerous. Similar safety precautions may be employed in city buses to ensure passengers remain safe.

School buses, on the other hand, may in many localities be protected by special laws that require, for example, that vehicles approaching the bus must stop and wait if the school buses loading or unloading passengers as indicated by flashing red lights. In the case of an automated school bus, the controller may cause such lights to automatically flash whenever the school bus has stopped and the door is open, and outward facing sensors may be used to monitor vehicles in the surrounding environment to ensure that they have stopped according to law. If improper movement of nearby vehicles is detected, appropriate action may be taken including but not limited to sounding an alarm, activating a horn, activating a loud speaker delivering a voice message, reporting to law enforcement, delay opening the door to let out students until a vehicle moving near the bus has stopped moving or has moved away, etc.

In the case of the school bus, if the controller determines that a car within the space of the school bus is not obeying the flashing red lights by coming to a stop, the vehicle can take emergency action to protect passengers embarking and disembarking from the vehicle. For example, if passengers were getting ready to be discharged from the vehicle, the controller may delay opening the door until the renegade vehicle has moved out of range of the bus and its passengers. If, on the other hand, the school bus was getting ready to pick up school children and another vehicle in the roadway fails to come to a full and complete stop in response to the stopped school bus, the school bus could issue a loud oral warning using external public address speakers warning the school children to watch out because a car is approaching.

In many prior art school buses, the flashing light display may be initiated not by the vehicle coming to a stop, but instead by the driver moving the lever to open the passenger door. However, in some embodiments disclosed herein, a controller would be responsible for both stopping the vehicle and actuating the door to open. Thus, in such use cases it may be appropriate for the controller to first stop the vehicle, then initiate the flashing light display, then use its sensor suite to detect whether there are any hazards, and only then if all is clear, actuate the door to open to discharge passengers. The vehicle may initiate different behavior if the current operation is to pick up passengers rather than to discharge them. Judgments that may be performed by a human school bus driver can also be performed by a controller of an autonomous school bus having judgment and decision making enabled by deep learning or other machine learning.

In the case of school buses, there may be scheduled predetermined bus stops, or it may be possible for students to orally or otherwise indicate where they need to be dropped off. Passengers may wait at a bus stop for the shuttle to pick them up, or some bus stops may be equipped with call buttons that can alert the shuttle that passengers are at the bus stop waiting to be picked up. In the case of a city bus or a school bus, outwardly facing sensors may be used to detect whether anyone is standing at a predetermined stop so that the controller may decide whether or not to stop the bus at that stop. In some passenger transport context, the bus will not stop at a predetermined stop unless either a passenger is waiting at that stop to board the bus or a passenger on board the bus has initiated some kind of signal (e.g., by pulling a rope, pressing a button, etc.) to indicate that the passenger wishes to get off at the next predetermined stop. In some example non-limiting embodiments, such functionality is duplicated by the vehicle controller autonomously deciding whether or not to stop at the next predetermined stop based on situational awareness provided by deep neural networks.

The vehicle may be provided with capabilities to communicate with other people (e.g., pedestrians and/or drivers) that are sharing the navigation space with the vehicle. As an example, an autonomous vehicle may include some type of indicators that clearly indicate to a pedestrian getting ready to cross in a crosswalk in front of the vehicle that the vehicle is stopping and pausing to allow the pedestrian to cross. Similarly, the vehicle may include external signaling devices to signal to human drivers of other vehicles concerning the intention of the vehicle to stop, move, turn or otherwise navigate, in order to warn the other drivers and indicate aspects of the intentions and decision making of the autonomous vehicle controller. Example non-limiting embodiments provide functionality based on deep neural networks that is unique to buses or other transports relating to the situational awareness that is helpful to operate the bus or other vehicle in a busy, crowded or unstructured environment and/or to interact with other objects or people in those environments.

In another risk scenario, suppose the vehicle is navigating on a virtual rail to a desired destination and a pedestrian suddenly runs across the road in front of the vehicle. This is not an unusual occurrence on college campuses, in airport satellite parking lots and any other place where people are in a hurry. In such situations, the sensor suite perceives the pedestrian running across the road as an obstacle to be avoided, and dynamic object detection processed by one or more deep neural networks takes appropriate action such as slowing down the vehicle to give the pedestrian time to move out of the vehicle's path, or, in more urgent cases, make an emergency stop of the vehicle to avoid striking or otherwise endangering the pedestrian. The vehicle can perform similar actions upon detecting that another vehicle has backed up out of a parking space and is obstructing the vehicle's virtual rail or otherwise presents a collision risk. Upon taking such action, the controller may use internal warning systems within the vehicle to warn passengers (if any) that the vehicle is about to come to a sudden emergency stop so they can hold on to a rail and not slide off their seats. For example, if an emergency stop is necessary, the controller may flash red lights within the passenger compartment, display a written message on a passenger display that says "emergency stop" or the like, and use a loud speaker or other sound system to provide an oral alert such as "hold on—the vehicle is about to come to a quick stop."

Other scenarios in crowded parking lots include cars that suddenly pull out of parking spaces in front of the shuttle, and vehicles that suddenly stop in the shuttle's path. Additionally, all sorts of vehicles may be temporarily stopped outside of buildings. Some may be loading or unloading, including with rear cargo doors open that may confuse some kinds of dynamic object sensing. Shuttle artificial intelligence can be trained on such scenarios so it recognizes such patterns and can avoid accidents. Many example embodiments are trained to back up automatically and then follow a different forward path when helpful to avoid risk.

In some exemplary use cases, the bus implementation of a vehicle may not "park" in the conventional sense but may instead perform other stopping strategies to allow passengers to get on and get off. For example, in the case of a city bus, a school bus or a shuttle operating within a parking lot or a campus, the bus may be a priority vehicle that is authorized to stop in the middle of a thoroughfare and hold up traffic in one or both directions. The vehicle operating as a city bus may attempt to pull over to the side of the road when possible so other traffic can pass while passengers are getting on and/or off the bus. If, however the roadway does not offer room to pull over (e.g., because of parked cars, snow deposits, the absence of a shoulder, or for other reasons), the vehicle may gradually slow down and come to a stop in the middle of the road. As the vehicle comes to a stop, it may warn other vehicles on the roadway—not merely by illuminating brake lights, but by generating other visual and/or oral displays that can be seen and observed by other drivers so they have adequate warning that the vehicle is coming to a stop and that they must also stop to avoid hitting the vehicle. When approaching the stop, the vehicle can use its sensor suite to provide additional situational awareness as to any safety concerns or hazards that may exist at the stopping point. For example, in the case of a snowy or icy road, the vehicle may use its optical sensors and LIDAR to detect a position that has been cleared that would allow passengers to more safely embark and disembark.

Some example non-limiting embodiments identify people outside of the vehicle using for example facial recognition or other identifying techniques. Once the vehicle identifies a person and understands who the person is, the vehicle can take appropriate actions based on the recognition. In a campus environment, for example, there may not be any controlled access—that is, a person can still board a shuttle even if he or she has not been recognized as a student. On the other hand, some use cases may offer rides only to authorized individuals (e.g., in a corporate campus environment, only employees and authorized contractors may be permitted to ride a shuttle; and in a theme park context, only customers with appropriate admission tickets may be authorized to travel to certain destinations). Alternatively, in a corporate environment where non-employees are permitted to board and ride shuttles, it may be desirable to alert employees that they should not be discussing confidential information while such non-employees are present. In such contexts, the controller may light up the passenger cabin with a different colored lighting (e.g., pinkish as opposed to greenish) or lighting patterns/sequences to alert employees an outsider is present on the shuttle and that they should refrain from discussing corporate confidential information.

In a robo-taxi environment, a frequent traveler could be recognized and the vehicle could begin implementing a set of procedures that are particularly geared to that frequent traveler (e.g., instead of asking the traveler where she wants to travel to, the robo-taxi could ask the traveler whether she wants to go home or to work and then rely on information stored for previous trips to determine the address/location information for the appropriate destination). If the vehicle has authorized access to additional information about the passenger such as in a work environment, the vehicle could use passenger identification to access the passenger's work calendar to automatically determine where the passenger is supposed to be next and set the destination accordingly.

Similarly, in a university environment, the robo-taxi or shuttle may have access to the student's schedule and can, based on facial recognition or other person identification technique(s), automatically select a destination for the student based on the student's schedule. In some use cases, the shuttle could ask the student orally to confirm "Do you wish to go to Sloan Hall for your 2 o'clock calculus class?" Such techniques provide a more personalized experience by taking extra care to ensure that people know where they are going and that they get to their appointed destinations on time. These functionalities can connect with other services such as calendaring, reminding, social media, mobile application alerts, and other features to provide additional enhanced functionality.

In some example non-limiting embodiments, automatic vehicles can be used to help track people's location. For example, in a secure corporate campus or government installation, it may be desirable to know at all times where each individual is located. Furthermore, it may be desirable to restrict access to certain locations by only authorized people. For example, the corporate or governmental cafeteria might be accessible by all employees and contractors, but certain "black" buildings may only be authorized for access by those with a "top secret" security clearance. A vehicle may automatically use personnel detection to deliver each person only to an appropriate location consistent with his or her security clearance, meanwhile reporting real time tracking information to security personnel so that security personnel can know at all times who is on what shuttle and where that shuttle is currently located.

There may be privacy concerns against implementing such tracking and access control in open environments such as universities, but such precautions and tracking may be entirely appropriate and necessary in more secure environments such as military installations. Meanwhile, such tracking may be quite helpful in a corporate environment, a military installation or even a university environment for other reasons. For example, a vehicle may inform those in the meeting room waiting to start a meeting that other meeting participants are en route and only two minutes away.

For external monitoring, a vehicle may use spatial detection and identification enhanced or performed by deep learning or other machine learning. Such spatial detection and identification may be supported by back end functionality residing in the cloud, implemented and distributed fashion or across multiple vehicles, or other. Such spatial detection can be used for example to recognize gestures or other body language to discern what a person wants or is trying to do. One example is reading the body language of a potential passenger to determine that the passenger is beckoning the shuttle to stop and pick her up. For example, a backward wave or two-handed wave may be interpreted as "please stop for me." On the other hand, some passengers may make a gesture such as a "go away" wave or shake their head "no" from side to side to indicate to the shuttle that it should not stop for them because they do not wish to board the shuttle. Deep learning may be used to train neural networks or other machine learning to detect different gestures in different regions or cultural environments, so the gestures are appropriately determined. The gestures used by bus riders in San Francisco may be different than those in New York, and the gestures used in Nagoya, Japan may be different from the ones used in Helsinki, Finland.

Once a passenger in within the passenger compartment, speech recognition on board the vehicle may be used to understand oral directions or requests that the passenger gives to the vehicle. The vehicle may maintain and understand context, so it knows from personal identification who is speaking and what context the person may be within. As an example, on a university campus, the vehicle may know the difference between a professor and a student. On a corporate campus, the vehicle may know the difference between an employee and a visitor. The vehicle may adapt its responses to questions based on such context and accessed knowledge by the speaker. The vehicle may analyze the gaze or head position of the passenger so that it recognizes the context of what the passenger is looking at when they are asking the question. The vehicle can be more helpful in its responses the more it knows about the context of the query. As an example, in a multi-display environment within a passenger compartment, information relevant to a particular passenger can be directed to the particular display the passenger is paying attention to. The inside sensors can determine that display based upon recognizing the gaze of the particular passenger and display a message for that particular passenger on the display she is currently looking at. If that passenger is not looking at any display on the shuttle but is instead staring at his mobile device, the shuttle could instead find another means to communicate with the passenger such as using the sound system or possibly even linking with an application on the mobile device.

Such functionality can be provided using computer vision and deep learning using deep neural networks. Such functionality can be accelerated using a hardware-based computer vision accelerator and/or a deep learning accelerator provided on the controller as part of deep learning support. Communications between the vehicle and other computing resources located remotely from the vehicle (e.g., in the cloud, over a network, ATC) may be used to support such functionality to provide additional computation power and more timely results. In one implementation, a first neural network might classify or identify the object as being a person and a second neural network may be used to recognize the face of the person. Body pose recognition can be performed by a neural network that models bodies based on "bones" (i.e., maps, joint positions within a constellation and uses the set of changing constellations to recognize current body pose and, by extension, gestures such as full body gestures). A classifier may be used to classify what pose or gesture has been detected. Deep learning-based speech recognizers may be used to detect passenger speech. Such speech recognition may be geared to the particular types of questions a passenger would ask an automatic shuttle. For example, passengers are more likely to ask, "What time is it?" or "How long to my stop?" than "What is my spouse's birthday?"

Perception may be used to find a passenger's face, determine the head orientation of the passenger, and localize the passenger's eyes and what the passenger's gaze is looking at. The neural network may use such information to try to predict a vector or viewing direction in 3D and dimensional space to predict what object the passenger is seeing or looking at the current time.

Example non-limiting embodiments may also have an additional, activity monitoring neural network that monitors inside visual perception from cameras and the like and classifies observed activity such as sitting, standing, eating, drinking, talking, other. For example, the shuttle could refuse to move until all passengers are seated. As another example, if the shuttle determines a passenger is talking on the telephone when his stop is coming up, the shuttle might automatically announce through a paging system that the next stop is approaching so the passenger has time to gather his belongings and disembark. On the other hand, if the shuttle observes that the one and only passenger who has asked to get off at the next stop has already stood up and walked to the door, the shuttle could refrain from making a general announcement and avoid disturbing other passengers unnecessarily. An activity classifier could operate based on classifying a sequence of body poses that have themselves been classified already based on a neural network used to classify body poses.

One potential challenge with respect to performing such activities and functionalities on board a shuttle or other vehicle is the potentially unreliable network connection with external computing resources. For example, if the shuttle enters an area of high network traffic, network latency may increase substantially which will degrade the shuttle's ability to perform analyses in real time if it is relying on computation resources that are accessible over the network as opposed to resources that are local and disclosed on the shuttle itself. Accordingly, in some example non-limiting embodiments, even when remote computing resources are being used, the vehicle may have sufficient on-board computation resources (e.g., multiple CPU's use of virtual machines on a given SOC) to provide individual functionalities may be useful to ensure the timeliness of the results and avoid interference between performing the different functions, while reducing the number of computing devices required. In some context, it may be desirable to have multiple input sources (e.g., multiple microphones within a passenger compartment). Some embodiments may provide local processing for one or a set of input devices, while off-loading the processing of other input devices to remote computing resources available over a network. If network reliability or latency becomes an issue, the off-loaded functionality may cease to be timely but the local-processing will still be viable. Smart caching may also be used to minimize network traffic. As an example, passenger requests for an update on the stock market after 2 PM California time can be cached and not refreshed until the next morning when the stock market opens again. As a pedestrian, a more relevant example, sight-seeing information about a city can be cached by a robo-taxi and not updated until the information changes (e.g., a building is torn down, a restaurant closes, a new restaurant opens, etc.).

On Demand System Overview

An example non-limiting on-demand system includes a suite of software applications that together manage a fleet of autonomous shuttles, allowing users and operators to request rides, select the optimal shuttle, calculate the best route for each shuttle, and maintain the system.

System includes centralized AI Dispatch (aka Server), which in a preferred embodiment is the single, central software entity coordinating at least a substantial portion of communication between entities (e.g., shuttles, client terminals, and applications) within the system. In other implementations, AI Dispatch could be distributed and operate on a number of different computers. AI Dispatch performs fleet management, routing, and deployment.

The system also includes one or a plurality of shuttles. Each shuttle preferably includes a plurality of software components installed on a computer within each shuttle. Each shuttle communicates with AI Dispatch, and optionally, directly with other shuttles and third-party vehicles and passengers outside the system.

The system also includes a plurality of client applications, used by system passengers and system operators. Passengers request rides using the client applications. Client applications provide fleet status updates to travelers, customers, and/or employees. The client application typically includes multiple modes, including (1) Mobile: preferably used on a mobile phone for single ride request and fulfillment, running on a mobile operating system such as iOS, Android, and/or Blackberry, (2) Kiosk: preferably a fixed-location installation, used by guests for single ride, and (3) In-Ride: installed on each shuttle, e.g., headrest tablets, overhead screen, or touch-screen at the shuttle entrance.

Figure 2A:
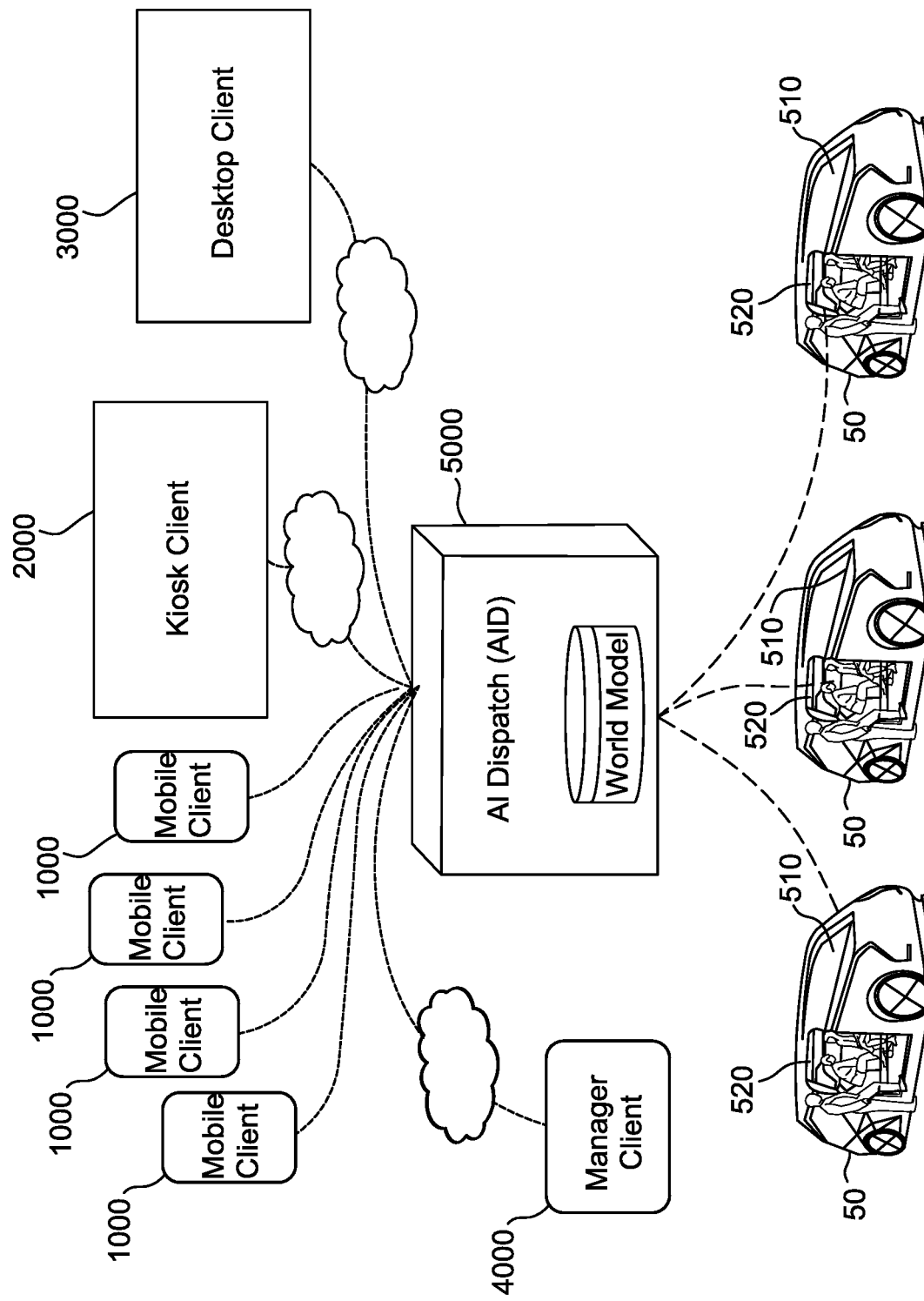
FIG. 2A shows an example System Overview.

FIG. 2A is an overview of a system. The system includes a plurality of autonomous or semi-autonomous vehicles (50a, 50b, . . . 50n), each of which includes an in-cabin client (520) for communication with the travelers, an AV client (510) for controlling the vehicles and communicating with a human safety driver (if one is present) and further functionality for communicating with objects (e.g., other vehicles, pedestrians, potential passengers) outside the vehicle. While each of vehicles 50 is shown in FIG. 2A as being of the same type, the system can operate vehicles of different (or any) types including for example robo-taxis, limousines, shuttle buses, etc.

The system includes a central or other dispatch server (5000), coupled by wireless networks to the plurality of AVs (50) in the field. The AVs may be vehicles of the same or different type. A manager client (4000) is used to interface with the dispatch server, and control the dispatch, reservations, and AV control functions. A plurality of mobile clients (1000a, 1000b, 1000c, . . . 1000n) comprise handheld devices, such as a smartphones, tablets, or laptops, able to request and schedule rides from the system. One or more kiosk clients (2000) perform a similar function from fixed locations, connected to the network. Similarly, the system may include one or more desktop or other clients (3000), which may comprise computers connected to the internet or other network that are permitted to access the system.

Figure 3:
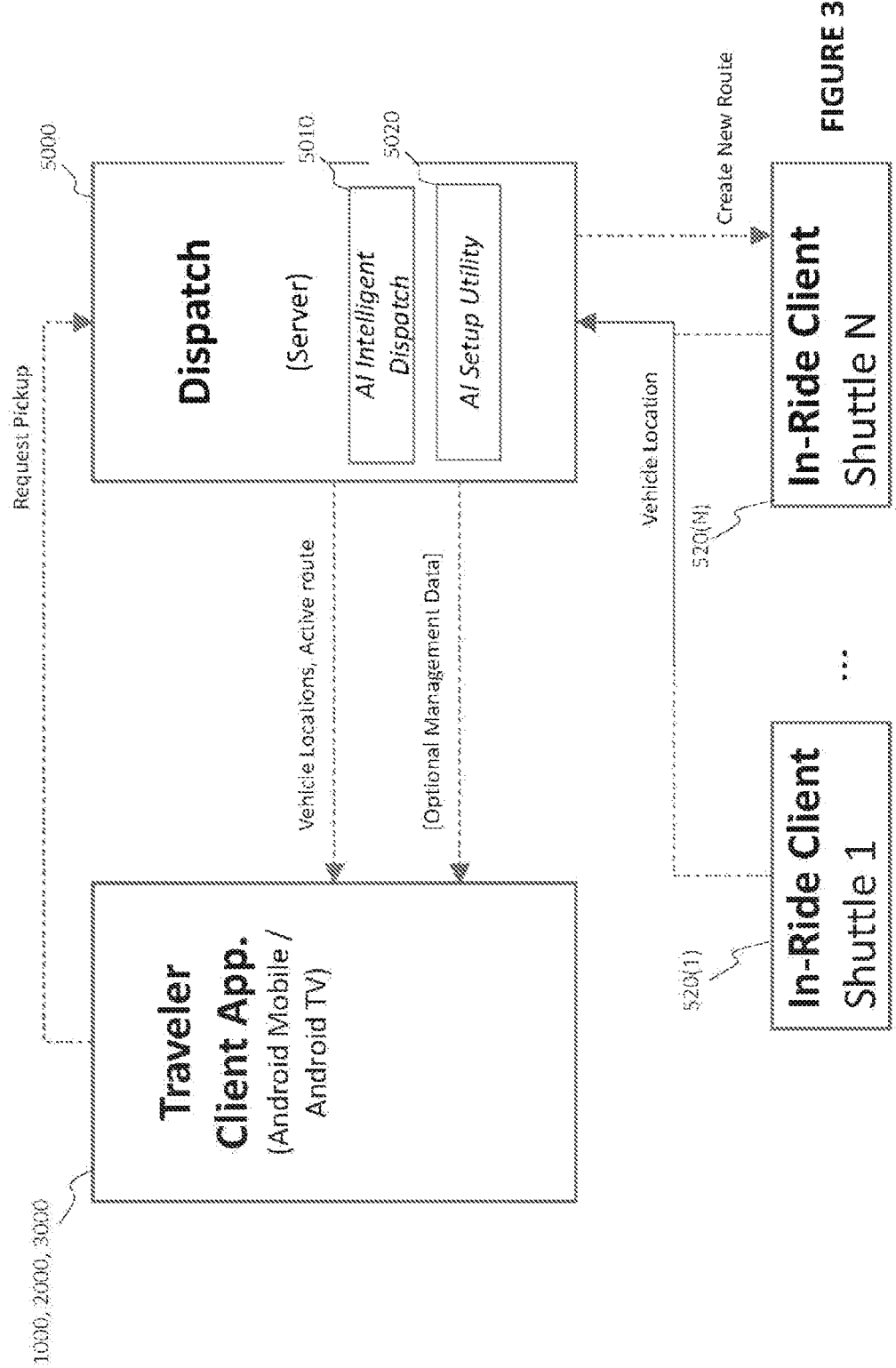
FIG. 3 shows an example High-Level System Overview.

FIG. 2B and FIG. 3 are additional high-level architectural overviews of the system's main components. In preferred embodiments, the system includes five client types:
- a Traveler Mobile Application ("TMA") (1000),
- a Traveler Kiosk Application ("TKA") (2000),
- a Traveler Desktop Application ("TDA") (3000),
- a Manager Client ("MC") (4000), and
- an In-Cabin Client ("ICC") (520).

Example embodiments of these clients are described in more detail below. In some embodiments, the In-Cabin Client provides multiple interfaces, including (1) Safety Driver UX, (2) Passenger UX, and (3) External UX. Each shuttle preferably includes an in-vehicle controller (100), which preferably is an AI Supercomputer designed an optimized for autonomous vehicle functionality. The AI Supercomputer may be a single SoC or a platform with multiple SoCs, as described, for example, in U.S. Provisional Patent Application No. 62/584,549, filed Nov. 10, 2017 and U.S. patent application Ser. No. 16/186,473 filed Nov. 9, 2018, incorporated herein by reference. Such AI supercomputer may include one or more CPUs, and one or more GPU including hardware accelerators including but not limited to a computer vision accelerator, a deep learning acceleration and a real time ray tracing accelerator. Such AI supercomputer is in some embodiments capable of accessing additional computing resources over one or more networks, and in some cases may use distributed computing to expand or enhance its capabilities. However, to guard against degraded real time functionality based on increased network latency, unreliability or failure, many embodiments will provide sufficient localized computing to perform at least all functions essential to operation with a requisite degree of safety.

Travel Mobile Application ("TMA")

The Traveler Mobile Application ("TMA") allows passengers to summon and track their shuttle rides. In preferred embodiments, instantiations of the TMA allows travelers to provide survey responses and feedback, including app usage monitoring and shuttle service ratings. In preferred embodiments, the TMA includes calendar application integration, including notifications to offer and request shuttle service. The TMA is deployable on any mobile device, including mobile phones, tablets, and smart watches. The TMA is deployable on stationary tablet devices at main shuttle stops (kiosk), as well as on laptops and desktops that have internet or other network connectivity.

In preferred embodiments, the system includes instantiations as mobile applications, including for example Android and iOS applications (or applications running under any other mobile or portable operating system), displayable in either portrait and landscape configuration. In embodiments, the system further includes a Web App or Desktop App, allowing users to summon a shuttle while sitting at their desk or otherwise interact with the dispatch system (e.g., to determine current shuttle location, number of shuttles operating, traffic delays, make a future reservation, etc.).

Figure 4:
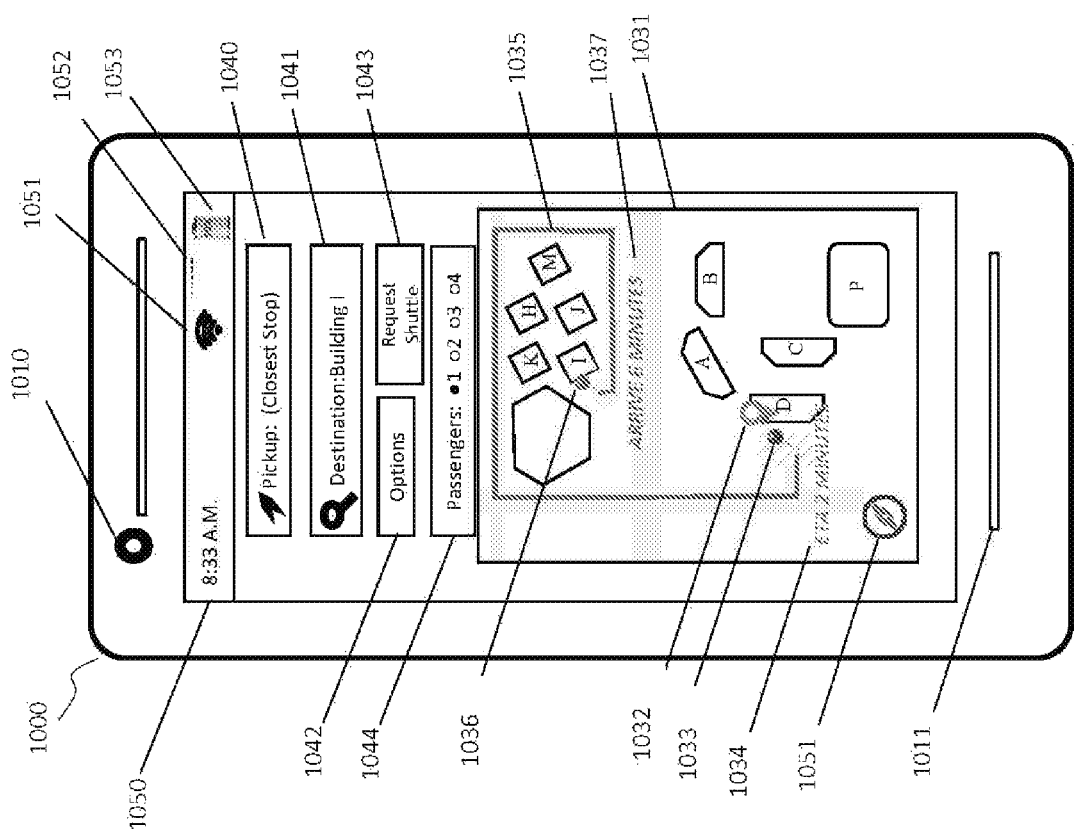
FIG. 4 shows an example Example Mobile Device with Traveler Mobile Application (TMA)

One example of a mobile device with the TMA is shown in FIG. 4. Mobile device (1000) is preferably a handheld device, such as a smartphone, tablet, smart-watch or laptop. Mobile device (1000) preferably includes a camera (1010), as well as a microphone (1011), for use with facial recognition, lip-reading, speech detection, and other features. Mobile device preferably includes a wireless modem and antenna for wireless connectivity to outside networks and other vehicles. Mobile device preferably is able to communicate wirelessly via a cellular phone or other terrestrial network—such as LTE, where available, and/or WCDMA, UMTS, CDMA2000, HSPA+, GSM or a satellite radio network. Optical wireless connectivity may also be used. Alternatively, mobile device preferably is able to communicate with wireless hotspots with WiFi (IEEE 802.11). Mobile device displays the presence and availability of WiFi and wireless networks through user interface (1051) and (1052). Mobile device preferably includes additional display features indicating the time (1050) and battery power reserve (1053).

TMA executes on mobile device (1000) to provide functionality to travelers. Mobile device (1000) preferably includes a display map (1031) showing the presence of the traveler (1032) and the local area. TMA preferably allows the user to select the closest stop (pickup location) by providing input such as, for example, touching an area of a display corresponding to a virtual button (1040). The system will identify the closest pickup location and display it on the screen (1033). Alternatively, TMA allows the user to specify "closest location" via voice command received through microphone (1011), by lip-reading of image information received through camera (1010), by textual input in field (1040) or in some embodiments, by speaking with a human dispatcher. TMA displays the closest pick-up location (1033) via a pin, icon, or textual description.

Mobile device preferably allows a traveler to enter a desired destination textually (1041) or by touching a point on the display map (1031).

Alternatively, the user may specify a location, such as "Building I" or "home office." When the user specifies "home office", the system identifies the location associated with the user. The system may identify the user by phone number, device ID, by facial recognition, or by other means. Using facial recognition, the system may identify any person in the system's registry. TMA allows the user to specify a destination in a variety of other ways. For example, a user can say "executive conference room" and the system will identify the destination or programmed nearest pick-up or drop-off location associated with that room. The traveler may also enter the desired destination textually, or search using a search string input in field (1041).

In the example illustrated in FIG. 4, a destination selected by the traveler (1036) is preferably displayed on display map (1031) via a pin, icon, or textual description.

Once the traveler has selected a desired destination, TMA preferably allows the traveler to select the number of passengers desiring to travel to the selected destination. Providing the selected number of travelers is preferred for scheduling purposes because the most proximate shuttle may not have sufficient space for the desired number of passengers. Thus, the system schedules a shuttle based on the desired number of passengers (1044), departure location (1033), and destination (1036). In an alternative embodiment, the TMA may detect (and pre-fill) the number of travelers by estimating the number of persons next to the person ordering the ride (from a camera image).

After the system schedules a shuttle, the mobile device preferably displays the estimated pickup time (1034) at the pickup location (1033), as well as a planned travel route (1035) and estimated arrival time (1037). To confirm the pickup, TMA may in some embodiments ask the user to confirm the request for the shuttle by pressing a button (1043) labeled "request shuttle" or similar command. Alternatively, TMA allows the user to indicate "request shuttle" or similar command via voice received through microphone (1011), by lip-reading of image information received through camera (1010), or the like.

TMA preferably include an "options" button (1042) allowing the traveler to access a menu of options, including scheduling a ride for a future time. As with all of the other commands, the traveler may execute the options command via voice received through microphone (1011), by lip-reading of image information received through camera (1010), or the like.

The options menu preferably includes a ride scheduler allowing the user to specify a date, time, destination, pickup, and number of passengers for a ride. When the ride scheduler is used, the system preferably provides a calendar invitation to the user's calendar or scheduling system, such as Microsoft Outlook. Other scheduling programs may be used, including web and cloud scheduling. The system also preferably notifies the mobile device (1000) via text when the ride is a (configurably) specified time (e.g., 15 minutes, 5 minutes, etc.) away, allowing the mobile device to cancel or confirm the ride if desired.

Traveler Kiosk Application ("TKA")

Figure 5:
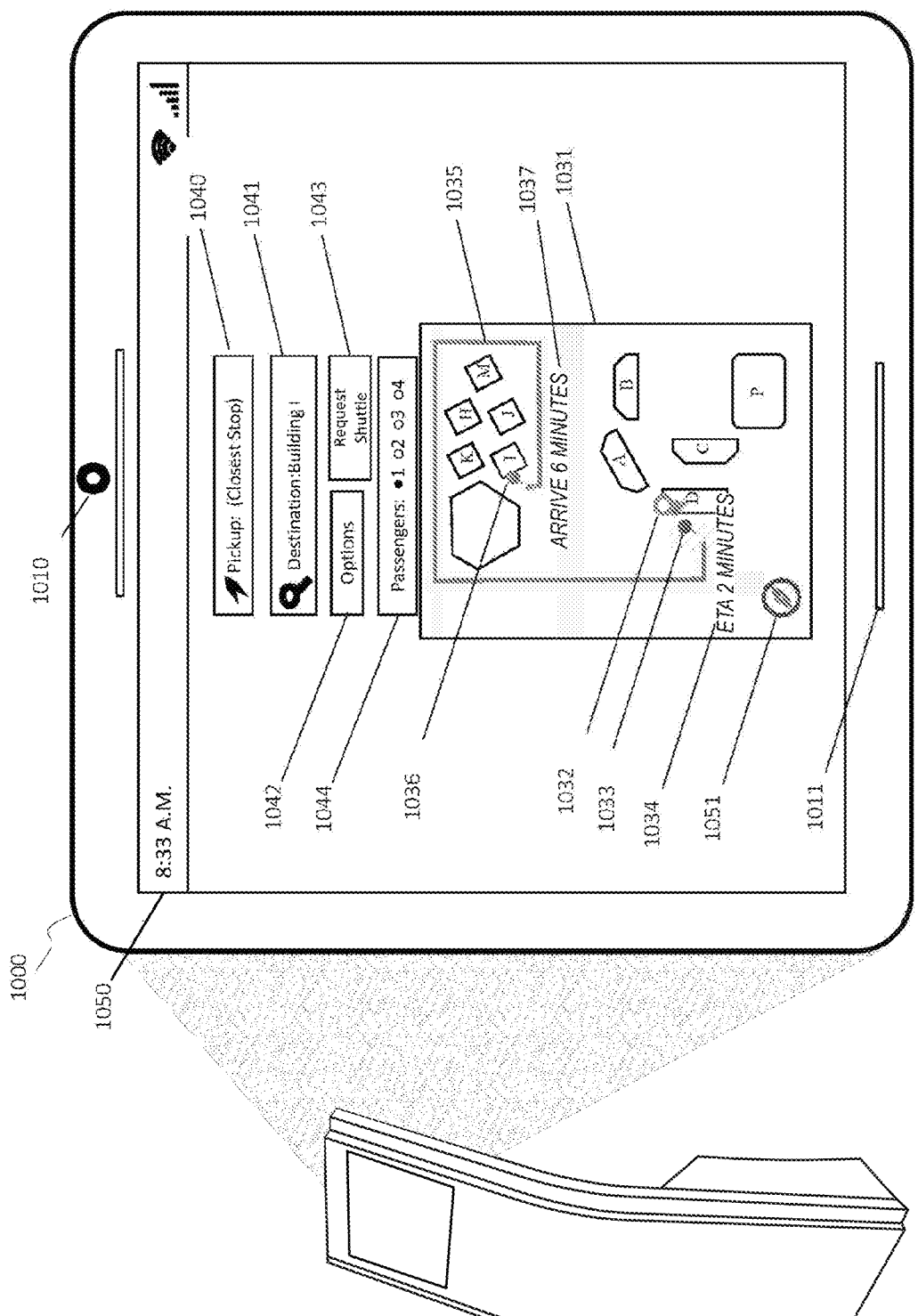
FIG. 5 shows an example Traveler Mobile Application (TMA) Deployed at Stationary Kiosk.

TMA may also be deployed at a stationary location, such as a kiosk, as illustrated in FIG. 5. The system preferably includes stationary Traveler Kiosk Applications (TKA), as discussed below.

The Traveler Kiosk Application in some embodiments is similar to the TMA, in that it allows passengers to summon and track their shuttle rides from a set location (kiosk) in the service area. Such Traveler Kiosk Application can be deployed in various settings including for example airports, corporate office lobbies, college dormitories and classroom halls, hotel lobbies, etc.

Figure 6:
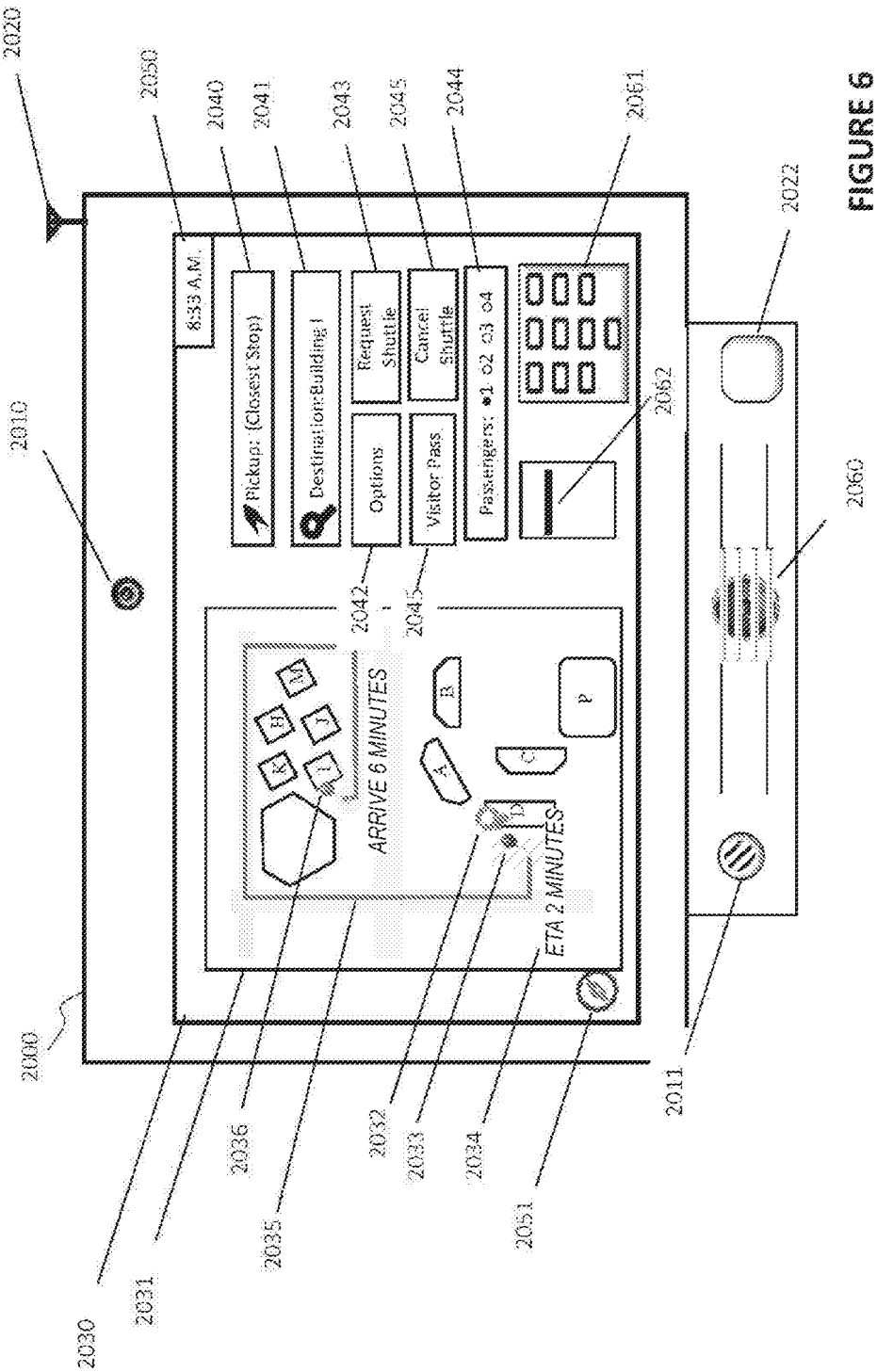
FIG. 6 shows Example Traveler Kiosk Application (TKA)

One example of a kiosk device with TKA is shown in FIG. 6. Kiosk device (2000) preferably includes a camera (2010), as well as a microphone (2011), for use with facial recognition, lip-reading, speech detection, gesture recognition, and other features. In corporate, college and other environments, kiosk device (2000) also preferably includes a badge reader (2022) or a card reader (2062). Badge reader (2022) may be a wireless device or sensor, such as an RFID device that allows persons eligible to use the system to confirm their identity and authorization to access and use the system. Suitable RFID technologies are known in the art, and include, for example, HID Multiclass RFID readers in 2 different frequencies (1) 125 kHz for proximity, and (2) 13.56 MHz for encrypted handshake/transmission. Card reader (2062) may perform a similar may be configured to read magnetic strips or chips, such as those on credit and debit cards. If desired, card reader (2062) may accept credit or debit card payment for a requested ride. Badge reader (2022) may be used to detect not only employee badges, but any mobile payment system (e.g., smart cards, mass transit cards, etc.), for systems that are implemented for use by the public. Persons known to the system and identified by facial recognition through information received from camera (2010) may use badge reader (2022) or card reader (2062), though they need not do so. Other embodiments may provide restricted access and/or authorization via biometrics including fingerprint identification, facial recognition, retina scans, etc.

In some embodiments, kiosk device (2000) includes a keypad (2061) to allow alphanumeric entries, including PIN numbers, employee numbers, or other information related to a requested trip or payment.

Kiosk device (2000) may communicate with the network via any known method for connecting a network, including ethernet, coaxial cable, optical cable, or a wireless connection. Kiosk device (2000) preferably includes a wireless modem and antenna (2020) for wireless connectivity to outside networks and other vehicles. In one preferred embodiment, the kiosk device (2000) may communicate wirelessly via a cellular phone or other terrestrial network—such as LTE, where available, WCDMA, UMTS, CDMA2000, HSPA+, GSM or a satellite radio network. Alternatively, kiosk device (2000) preferably may communicate with wireless hotspots with WiFi, using for example any 802.11-compliant device. Kiosk device preferably includes additional display features indicating the time (2050). Kiosk device may in some implementations optionally display infotainment information, such as weather updates, stock updates, news or other information.

TKA executes on kiosk device (2000) to provide functionality to travelers. Kiosk device preferably includes a display map (2031) showing the presence of the traveler (2032) and the local area. TKA preferably allows the user to select the closest stop (pickup location) by touching a button (2040), and the system will identify the closest pickup location and display it on the screen (2033). Such closest pickup location identification can be based on knowledge of the geolocation of the kiosk device (2000) based on known installation point and kiosk device identification, GPS, information provided by the traveler, etc. Alternatively, TKA allows the user to specify "closest location" via voice command received through microphone (2011), by lip-reading of image information received through camera (2010), or by textual input in field (2040). TMA displays the closest pick-up location (2033) via a pin, icon, or textual description. Preferably kiosk device will be at a pickup location, though the kiosk may be located at any other place as well.

Kiosk device preferably allows traveler to enter a desired destination textually (2041) or by touching a point on display map (2031).

Alternatively, the user may specify a location, such as "Building I" or "home office." When the user specifies "home office", the system identifies the location associated with the user. The system may identify the user by phone number, device ID, or by facial recognition or other biometrics. Using facial recognition, the system may identify any person in the system's registry. TMA allows the user to specify a destination in a variety of other ways. For example, a user can say "executive conference room" and the system will identify the destination associated with that room. The traveler may also enter the desired destination textually, or search using a search string input in field (2041).

In the example illustrated in FIG. 6, the destination selected by the traveler (2036) is preferably displayed on display map (2031) via a pin, icon, or textual description.

Once the traveler has selected a desired destination, TKA preferably allows the traveler to select the number of passengers desiring to travel to the selected destination. Providing the selected number of travelers is in some embodiments preferred for scheduling purposes because the most nearby shuttle may not have sufficient space for the desired number of passengers. Thus, the system schedules a shuttle based on the desired number of passengers (2044), departure location (2033), and destination (2036).

After the system schedules a shuttle, the mobile device preferably displays the estimated pickup time (2034) at the pickup location (2033), as well as a planned travel route (2035) and estimated arrival time (2037). To confirm the pickup, TKA preferably requires the user to request the shuttle by pressing a button (2043) labeled "request shuttle" or similar command. Alternatively, TKA allows the user to indicate "request shuttle" or similar command via voice received through microphone (2011), by lip-reading of image information received through camera (2010), or the like.

TKA preferably also allows the user to cancel a previously submitted request for shuttle (2045) service by pressing a button or issuing a voice command. Preferably, where the pickup location is different than the kiosk location, the "cancel shuttle" command (2045) may only be used by the same person requesting the shuttle, as identified by facial recognition through camera (2010) or other positive identification. Otherwise, after the traveler has requested a shuttle and headed toward the pickup location, another person could cancel the shuttle, which is undesirable.

TKA preferably include an "options" button (2042) allowing the traveler to access a menu of options, including scheduling a ride for a future time. As with other commands, the options command may be indicated via voice received through microphone (2011), by lip-reading of image information received through camera (2010), or the like.

The options menu preferably includes a ride scheduler allowing the user to specify a date, time, destination, pickup, and number of passengers for a ride. When the ride scheduler is used, the system preferably provides a calendar invitation to the user's calendar or scheduling system. The system also preferably notifies the user's mobile device (1000) via text when the ride is some threshold time (e.g., 15 minutes) or distance away, allowing the mobile device to cancel or confirm the ride if desired.

Manager Client ("MC")

Figure 7:
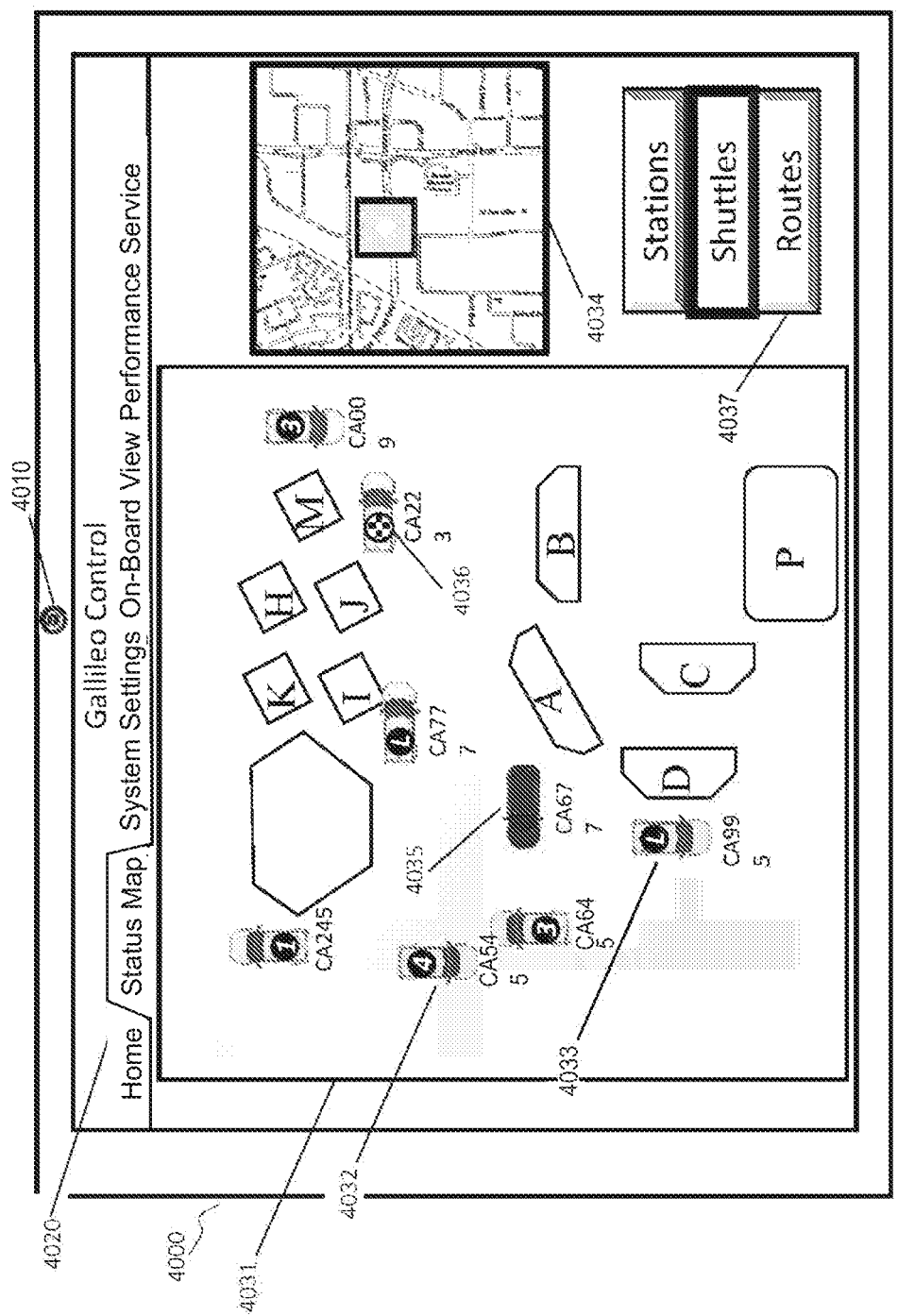
FIG. 7 shows an example Manager Client Status Map Page—Shuttles Selected.

The Manager Client (4000) in some embodiments is comprised of one or more central or distributed controllers connected to the system for monitoring, maintaining, and controlling the system. Manager Client (4000) includes a user interface to facilitate the control of the system. For example, in the embodiment shown in FIG. 7, Manager Client (4000) includes a Status Map tab (4020), which displays a map (4031) of all shuttles in an area selected from a map of a larger area (4034). In the status map shown in FIG. 7, each shuttle in the area displayed appears as an icon with the number of travelers. For example, shuttle (4032) in FIG. 7 is carrying four passengers. Shuttles that are in a Loading or Unloading condition may be designated by letter or other visual icon, as shuttle (4033) in FIG. 7, depicts. Shuttles out of service and powered-down may be visually depicted as such (4035), while shuttles without any instructions, yet available for service, may display a different visual symbol (4036). In an embodiment with electric shuttles, MC (4000) may provide an indicator of shuttles charging and their associated state of charge.

Figure 8:
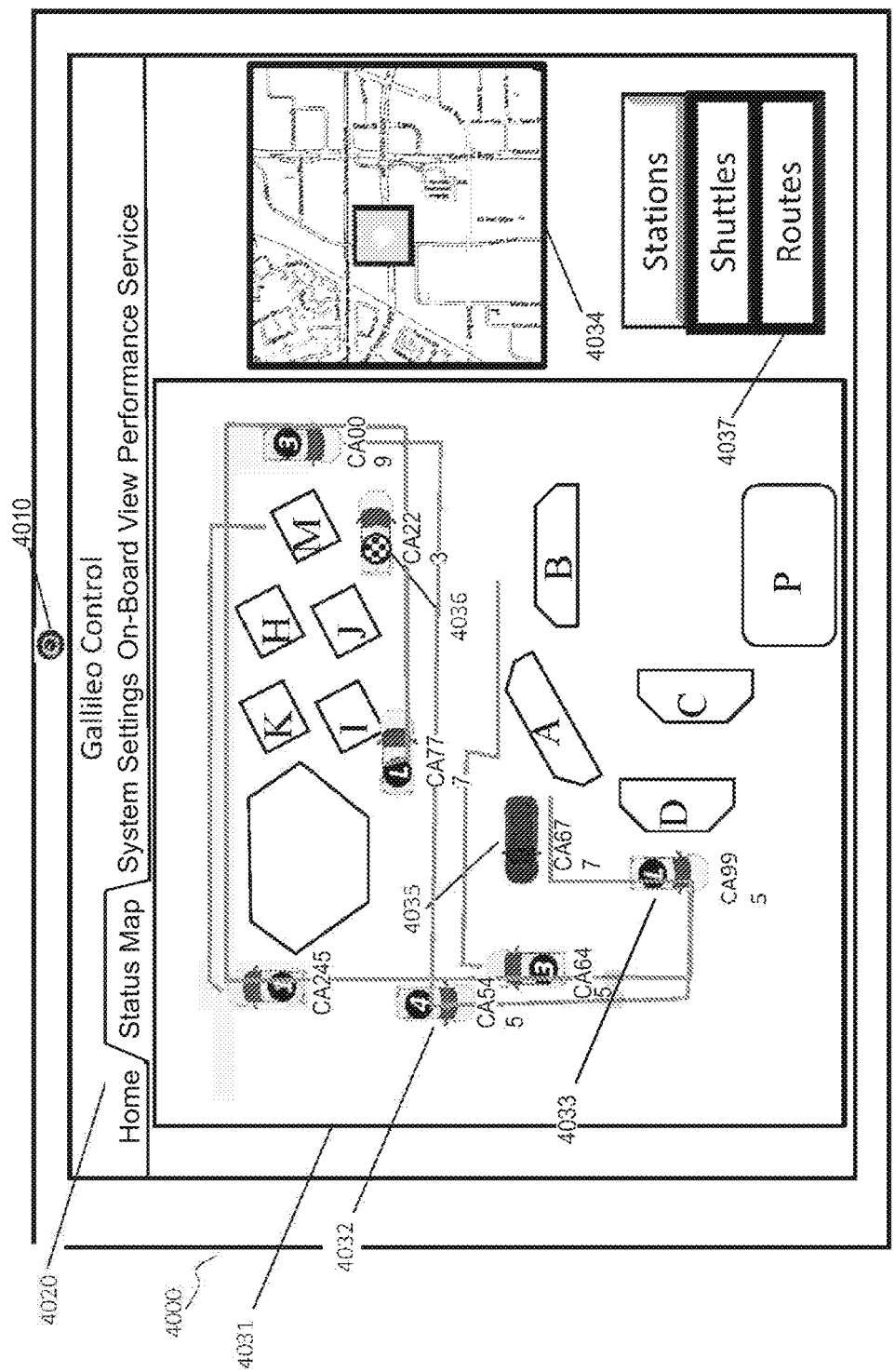
FIG. 8 shows an example Manager Client Status Map Page—Shuttles and Routes Selected.
Figure 9:
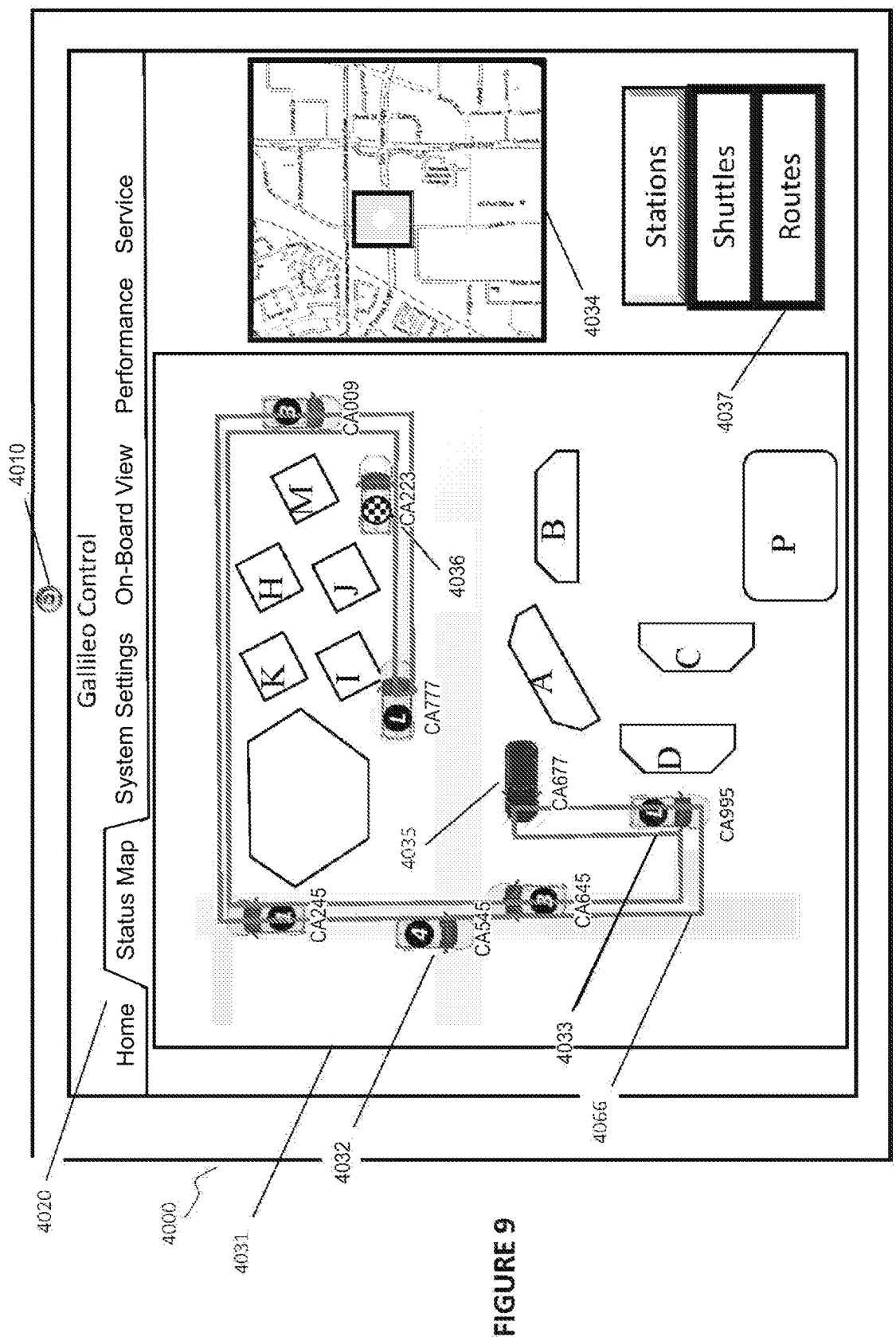
FIG. 9 shows an example Manager Client Status Map Page—Shuttles and Routes Selected.

Manager Client (4000) may display the planned routes for one or more shuttles upon request, either by use of the "display routes" command button (4037), by voice command received through microphone, or by lip reading of images through camera (4010). FIG. 8 illustrates the map display of the Manager Client with the <display routes> command on.

FIG. 8 illustrates a case in which AI Dispatch determines the routes for each shuttle, without being confined to a pre-determined loop or route. In other words, AI Dispatch (5000) is able to dynamically optimize the route for each shuttle according to system preferences—the shuttles do not need to travel on predetermined loops. As a result, according to these embodiments, AI Dispatch (5000) provides for a more efficient, effective route-planning that reduces system operating costs, while enhancing traveler experience and minimizing travel and wait time. Furthermore, by allowing AI Dispatch (5000) to optimize the route for each shuttle according to system preferences, the system is able to minimize delays due to traffic and contributing to further traffic congestion for other commuters.

Figure 11:
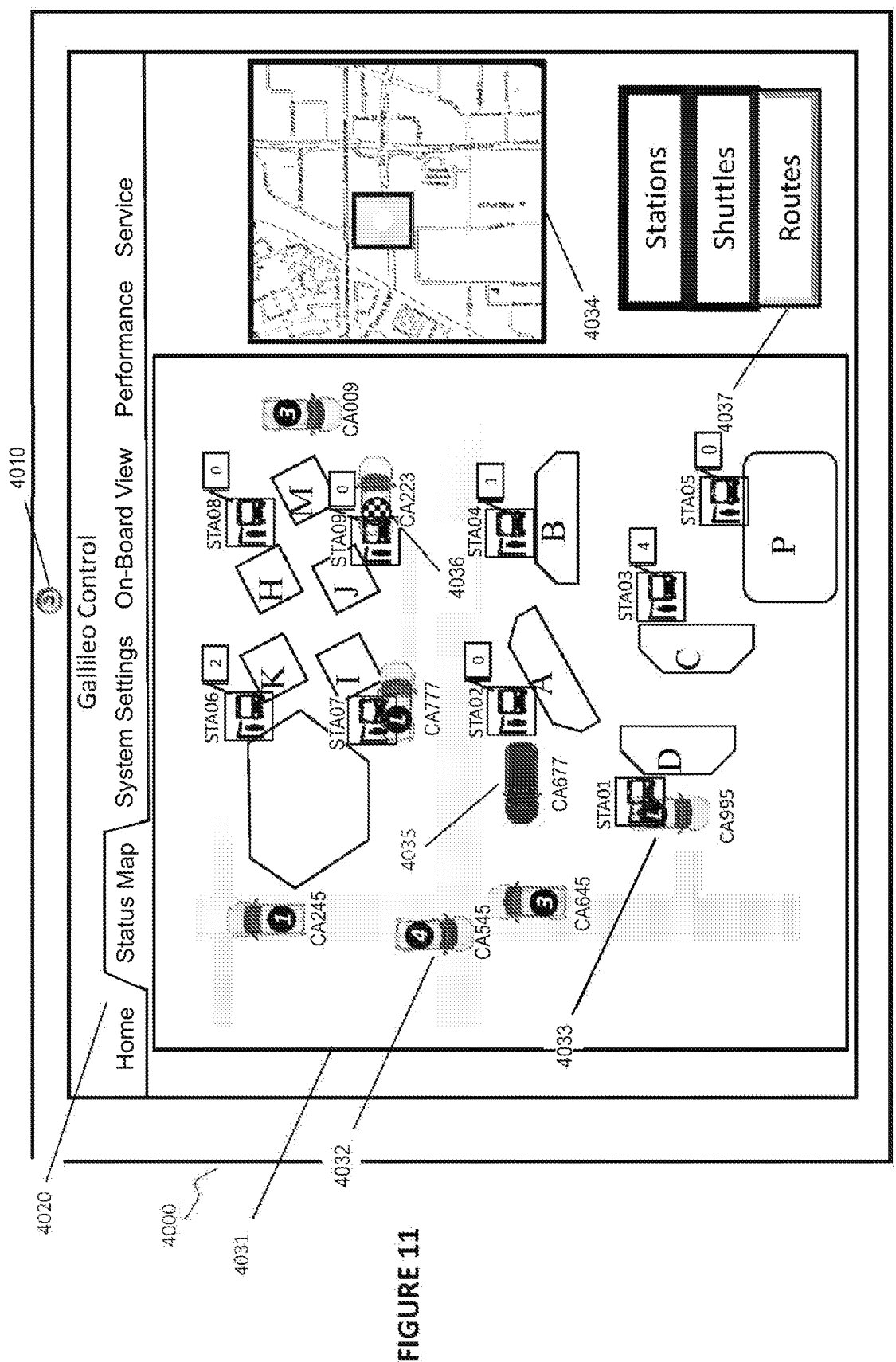
FIG. 11 shows an example Manager Client Status Map Page—Shuttles and Stations Selected.

Alternatively, the system allows for the use of more traditional shuttle loops or routes, as illustrated below in FIG. 11. In these embodiments, the shuttle may be thought of as following a predetermined "rail". It should be apparent that while these embodiments may allow for easier training of the shuttle's autonomous vehicle controller, they limit overall system efficiency, and limit the ability of the system to reduce cost and wait/travel time. Thus, providing AI Dispatch (5000) with an AI-enhanced simulation, dispatch and control capability is preferred.

Figure 10:
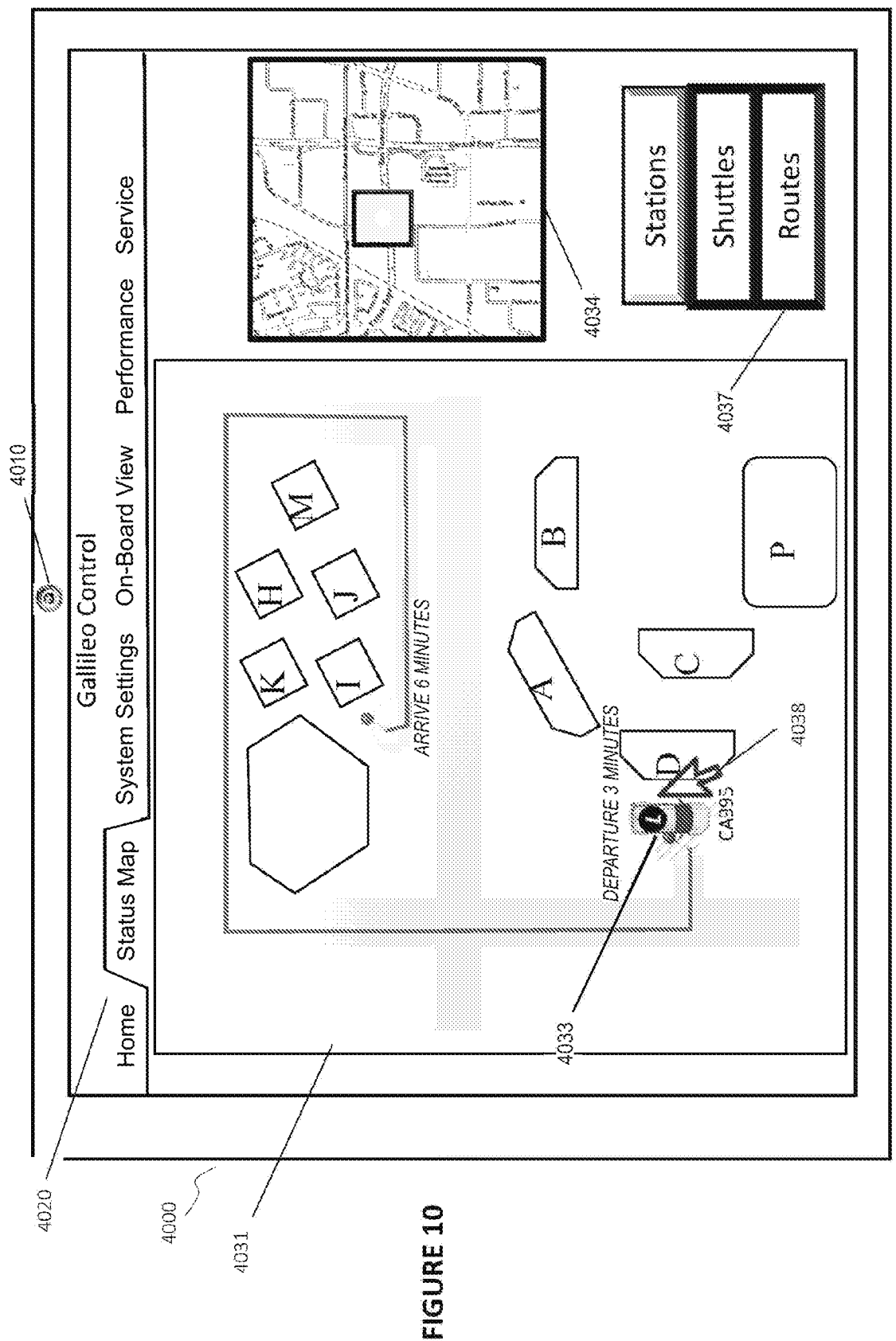
FIG. 10 shows an example Manager Client Status Map Page—Display Routes On, Single Shuttle Selected.

As FIG. 8 illustrates, displaying all routes can create a display that is difficult for a human operator to interpret. Thus, in a preferred embodiment the Manager Client (4000) allows the user to select a single shuttle and display the route of that single shuttle, as illustrated below in FIG. 10. The single shuttle displayed (4033) may be selected by mouse click (4038) or by speaking the vehicle's ID, e.g., "CA995" in the form of a voice command provided to microphone, or by lip reading of images through camera (4010).

The Status Map may also display the stations in a selected area, as shown below in FIG. 11. Each station is preferably identified by an icon and a station ID number (e.g., STA01). In a preferred embodiment, the Status map displays the number of travelers waiting at the station, illustrated by the callouts in FIG. 11.

Figure 12:
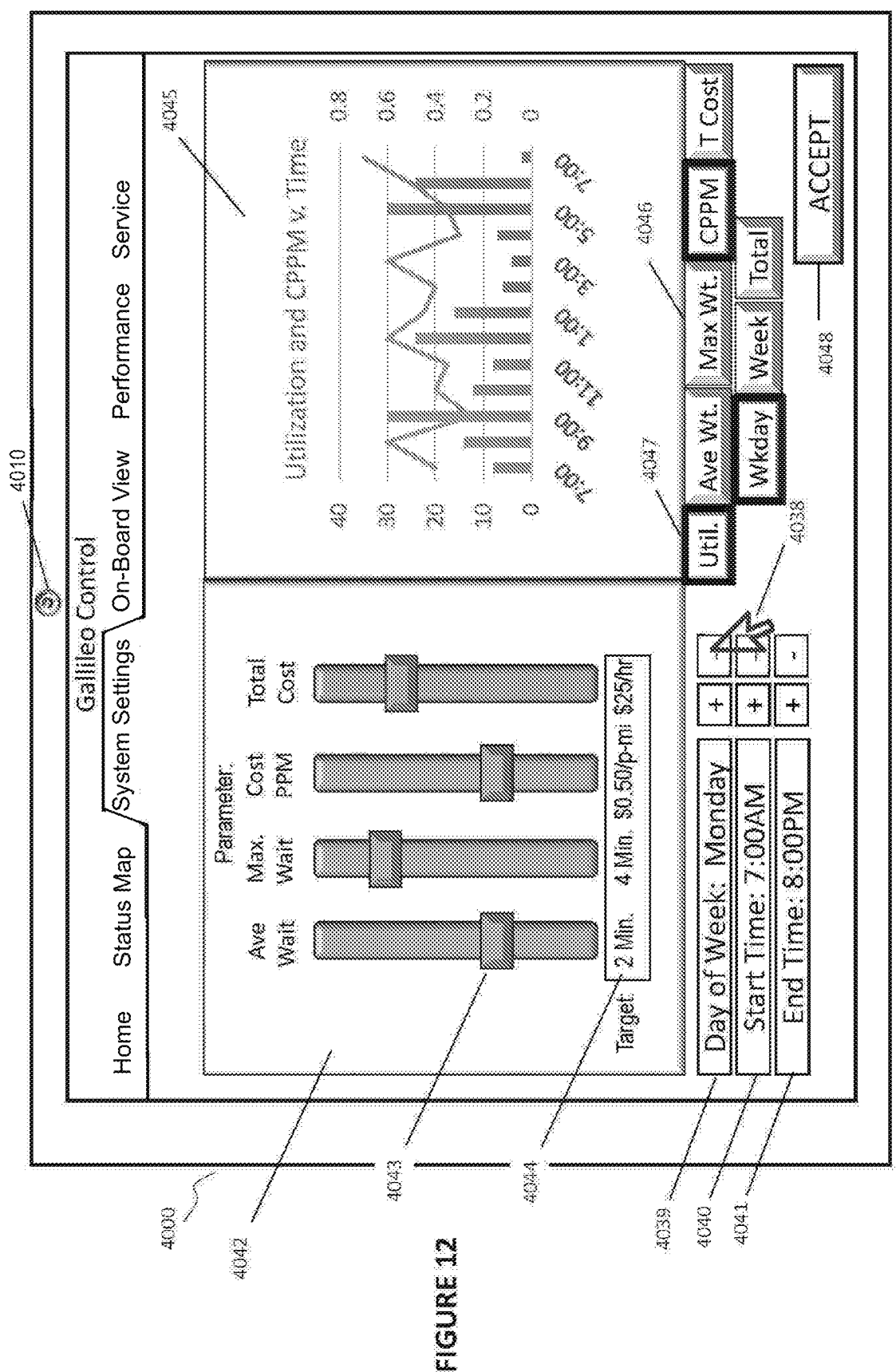
FIG. 12 shows an example Manager Client System Settings Page—Parameter Settings and Utilization Selected.

One embodiment of the Systems Settings page in the Manager Client is illustrated below in FIG. 12. In this embodiment, the operator may set system preferences using sliders (4042). The position of each slider (4043) illustrates the operator's relative priorities for the system parameters at issue. For example, FIG. 12 depicts settings under which the operator expresses a preference for a lower average wait time (2 minutes), as compared to the maximum wait time (4 minutes). The example of FIG. 12 further illustrates the operator's preference for a low cost per person mile (cost PPM), and a slightly higher tolerance for total cost (e.g., dollars per hour). The settings associated with the sliders represent operator preferences that AI Dispatch (5000) will weigh and consider in determining shuttle service, pickup times, drop off times, and routes. The operator's preferences, as expressed in the sliders (4042) express tradeoffs. For example, all things being equal, a lower average weight time will tend to result in higher operating costs, because low weight times constrain the system's ability to plan routes in the most efficient routes for multiple travelers or require transportation before maximum or near maximum occupancy is reached.

In preferred embodiments, the Manager Client allows an operator to set system preferences for specific days (4039) and times (4040-4041). For example, an operator may wish to have the system reduce average wait times and maximum wait times during rush hour (8:00 AM-9:00 AM) to help employees get to work as quickly as possible. Alternatively, an operator may prefer that the system operate more cost efficiently during times of less heavy use (e.g., 2:00 PM-3:00 PM). The system preferably allows an operator to set preferences and priorities at any level of granularity (e.g., down to windows of 10 minutes or less), including any combination of entire weeks, days, hours, or ten-minute windows. The system preferably allows an operator to change system preferences at any time, and AI Dispatch (5000) will adjust system performance in accordance with those preferences. The preferences may be selected by mouse input (4038) or by speaking the days and/or times in the form of a voice command provided to a microphone, or by lip reading of images through camera (4010).

In preferred embodiments, Manager Client may provide feedback to the operator in a variety of forms, to assist the operator in choosing system preferences. In one embodiment illustrated in FIG. 12, Manager Client provides graphical data (4045) for system utilization (riders) and cost per person mile (CPPM) per hour. The data allows system operator to see patterns throughout the day and adjust parameters and preferences accordingly. For example, the graphical data (4045) illustrated in FIG. 12 shows that the system has its heaviest utilization during the 9:00 AM and 5:00 PM hours, consistent with rush hours. At those times, the CPPM is relatively low, indicating that the system is scheduling rides efficiently and that shuttles likely have multiple passengers. On the other hand, graphical data (4045) illustrated in FIG. 12 shows relatively low use in the 3:00 PM hour, and relatively high CPPM. System operator may wish to adjust the average wait and maximum wait times in the 3:00 PM hour to see whether the CPPM, and thus total cost may be improved. Of course, especially in the case of systems operated on business campuses, it may also be the case that the CPPM is acceptable to the operator, because traveler wait time is also an effective cost to the system operator.

In preferred embodiments, as illustrated in FIG. 12, Manager Client allows an operator to select the graphical data (4045) to be displayed, either through buttons on the user interface (4046) or voice-activated commands. For example, Manager Client allows the operator to select the timeframe to be displayed (e.g., workday, last week, running total), and data such as utilization (4047), average wait, maximum wait, and cost data.

System Simulation

When an operator sets new system preferences, the AI Dispatch determines new system parameters that align with the operator's new system and performs AI simulations to optimize performance according to the new system preferences and determine how those preferences impact key performance metrics, as illustrated below in FIG. 13.

Figure 13:
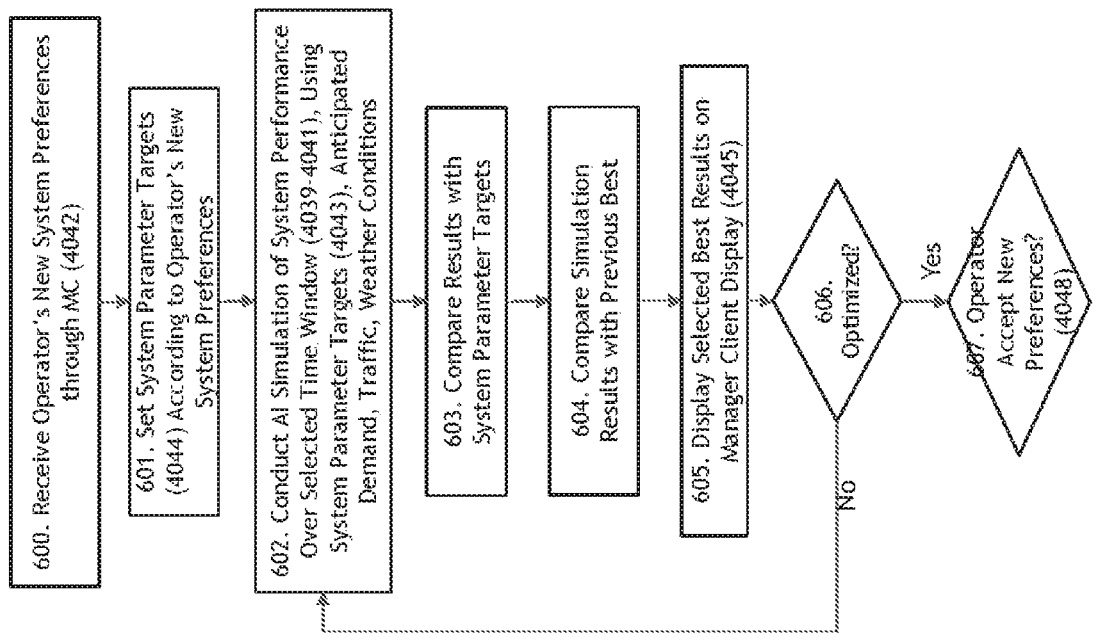
FIG. 13 shows an example AI Dispatch Optimizing System Based on New Operator Preferences.

FIG. 13 illustrates one process that may be used to assess the operator's selection of system preferences. In Step (600), AI Dispatch receives the operator's new system preferences through the MC (4042).

In Step (601), AI Dispatch sets system parameter targets (4044) according to operator's new system preferences. This step is necessary because the operator's new system preferences must be translated into achievable objectives. For example, the slider position (4043) selected as illustrated in FIG. 12 must be translated into a Target Average Wait (in minutes) that AI Dispatch will attempt to achieve by simulation. The range of values of the targets are based on system configuration such as number of stations, distance between stations, speed limits between stations, number of stop signs, intersections, and traffic lights on the route, number of shuttles, and other parameters. AI Dispatch determines the target (4044) displayed on MC based on the slider position and the range of achievable values.

In Step (602), AI Dispatch conduct an AI simulation of system performance over the selected time window (4039-4041), using system parameter targets (4044), as well as anticipated traveler demand, traffic, and weather conditions during that time window. AI simulation is performed as described more fully below.

In Step (603), AI Dispatch compares the results of the simulation with system parameter targets (4044). This comparison may be performed in a variety of ways. For example, AI Dispatch may compare each parameter with the target, determine a percentage deviation from the target, and determine an average deviation of all targets. Alternatively, AI Dispatch adds each of the deviations and determine an overall sum.

In Step (604), AI Dispatch compares simulation results with previous best. Manager Client displays the selected best results on Manager Client Display (4045) as illustrated in FIG. 12.

In Step (606), AI Dispatch determines whether the simulation results have been optimized. Many simulations may be required before AI Dispatch optimizes the results for a given selection of system parameter targets (4044). Once the results have been optimized, the best results are displayed on Manager Client Display (4045), and the operator may accept or reject the new system preferences (4048). Such steps may be repeated or iterated as needed to achieve further optimizations or improvements.

In some embodiments, systems for simulating the performance of a shuttle service, comprising a dispatch server, comprising: a graphics engine, for simulating a virtual world in which a virtual autonomous shuttle, corresponding to an autonomous shuttle, operates, a plurality of graphics processing units, for generating inputs to a plurality of virtual sensors corresponding to said sensors on said autonomous shuttle, an autonomous vehicle platform, for receiving said inputs to said plurality of virtual sensors, and a processor configured to determine the virtual shuttle's performance. A manager client, coupled to said dispatch server, may be configured to set system preferences. The system preferences may include at least one of average wait time, maximum wait time, and cost per person mile. The dispatch server may be configured to determine shuttle routes based on said system preferences. The autonomous shuttle is configured to execute one or more neural networks trained to identify one or more obstacles.

Real Time Camera Views

Figure 14:
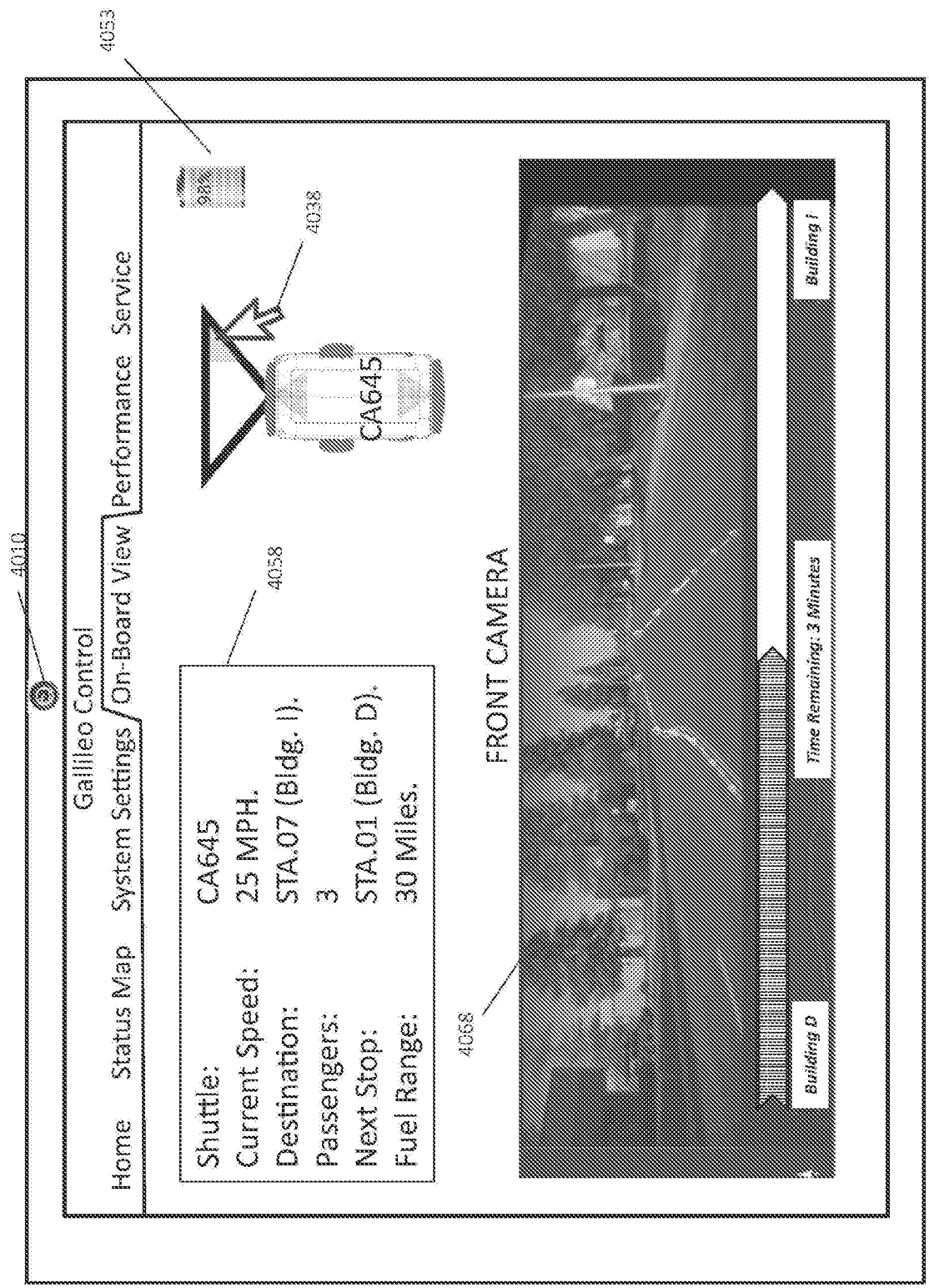
FIG. 14 shows an example Manager Client On-Board View Page—Front Camera Selected.

Manager Client preferably includes an On-Board view display, illustrated below in FIG. 14. Manager Client allows an operator to select the camera view to be displayed, either through mouse click on the user interface icon (4038) or voice-activated commands, such as "forward view, CA645" or "forward camera, shuttle 645." On Board View preferably displays a real-time view from the selected camera (4068), as well as shuttle parameters (4058) such as speed, destination, ETA, and number of passengers. ETA may be displayed as a progress bar, as illustrated in FIG. 14, or by a clock, digital readout, or similar display.

Figure 15:
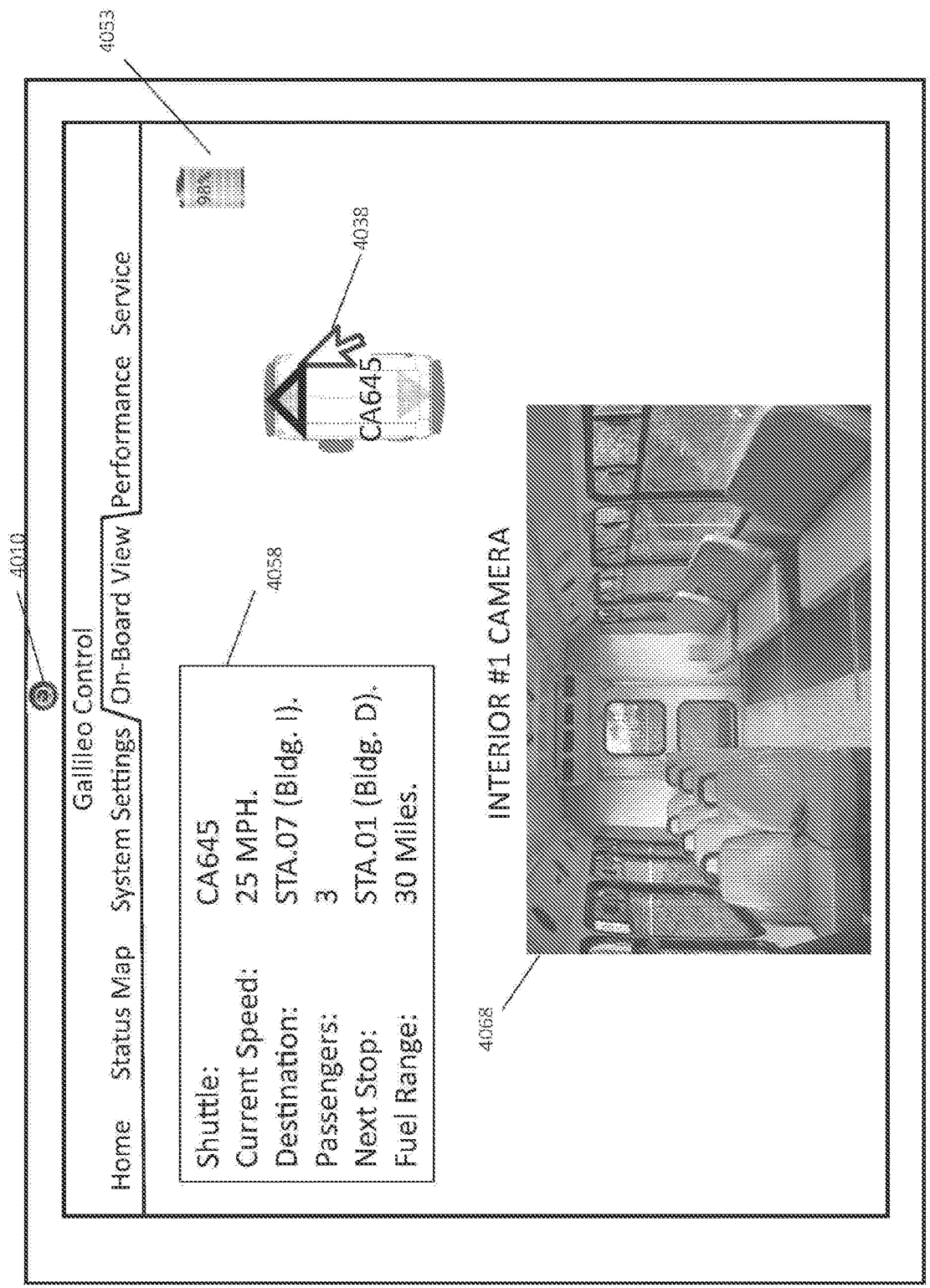
FIG. 15 shows an example Manager Client On-Board View Page—Interior Camera #1 Selected.

FIG. 15 illustrates another potential display of the Manager Client On-Board View. In FIG. 15, the operator has selected Interior #1 camera for display, showing the inside of the shuttle, viewing from the front. Using facial recognition and/or identifications associated with the traveler's mobile clients, On-Board View may identify the riders on-board.

Performance Metrics

Figure 16:
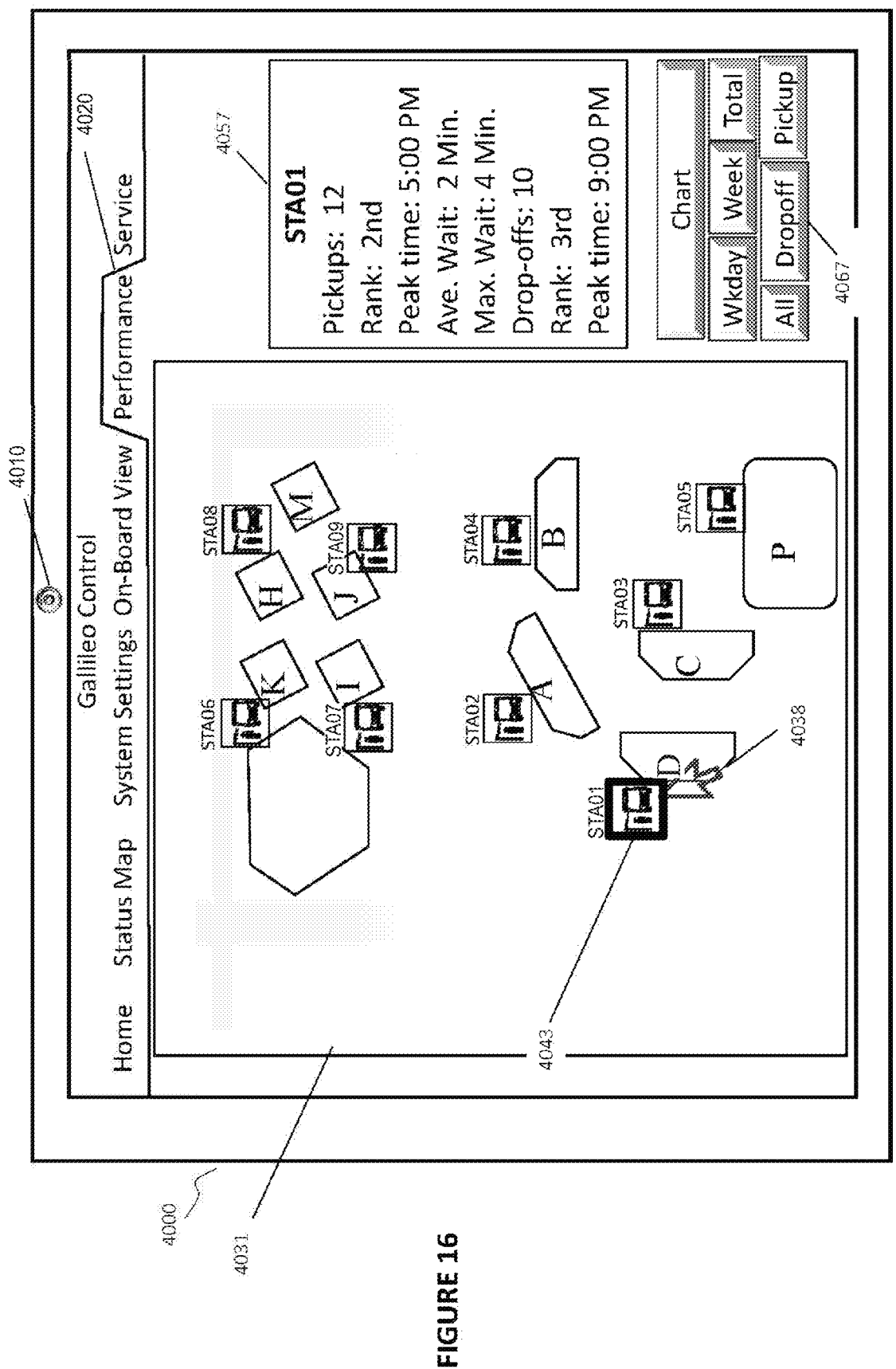
FIG. 16 shows an example Manager Client System Performance Page—Station Performance Selected.

Manager Client preferably includes a Performance display (4020) allowing the operator to view real-time and historical data regarding system performance and utilization. For example, FIG. 16 below illustrates an example display that illustrates the stations (STA01-STA09) in the selected area. Operator may select a station (4043) either by mouse click (4038) or by speaking the station's ID, e.g., "STA01" in the form of a voice command provided to microphone, or by lip reading of images through camera (4010). Alternatively, operator may issue a voice command such as "station nearest to building D" and system will interpret the spoken request, identify its meaning, perform the appropriate operations to fulfill the command, and provide the requested data. Once a station is selected, the Manager Client provides desired data (4047) such as, for example, passenger pickups, rank (compared to all stations in the system), peak time, wait times (average and maximum) and other desired information.

Figure 17:
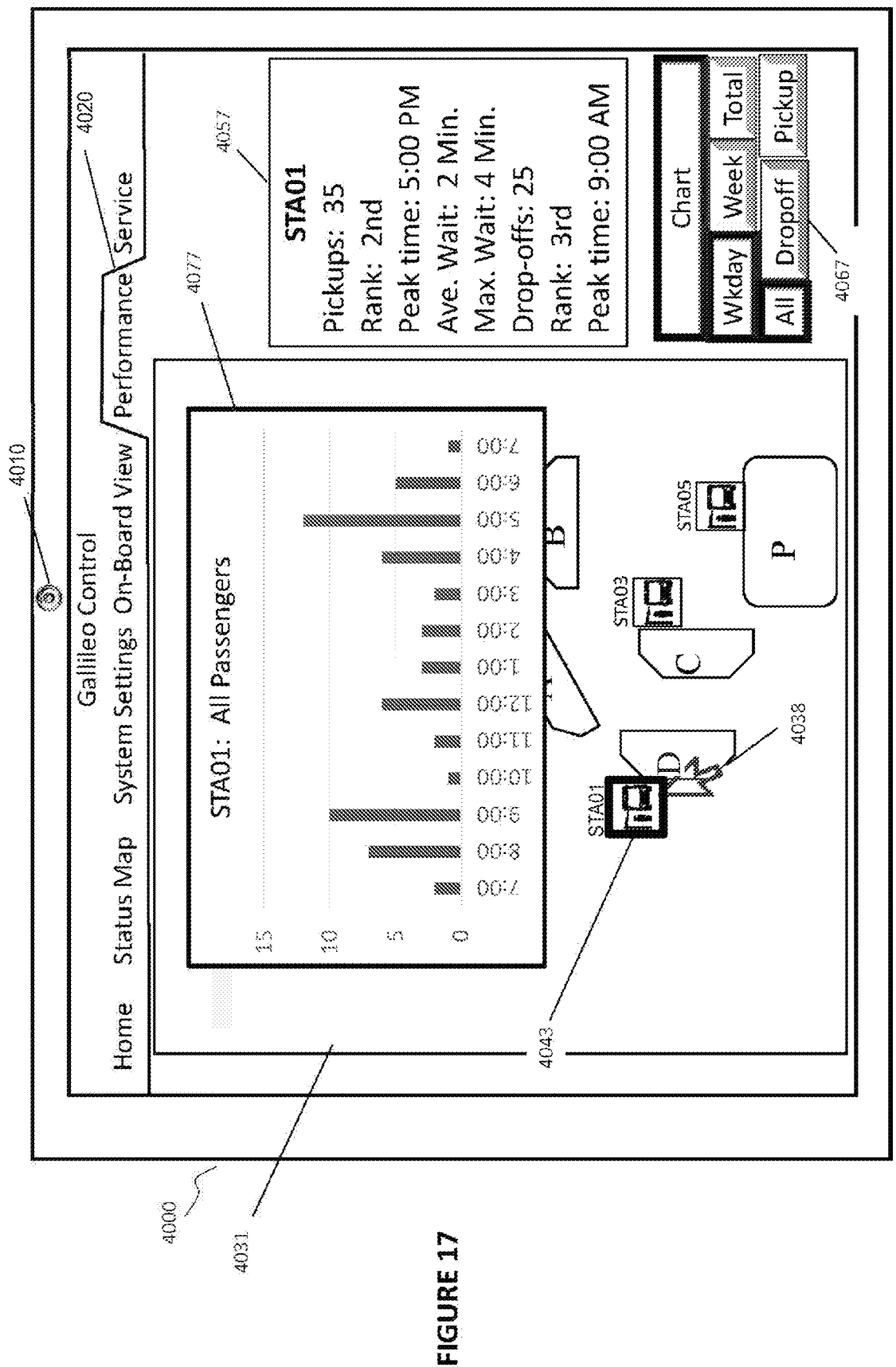
FIG. 17 shows an example Manager Client System Performance Page—Station Performance and Chart Selected.
Figure 18:
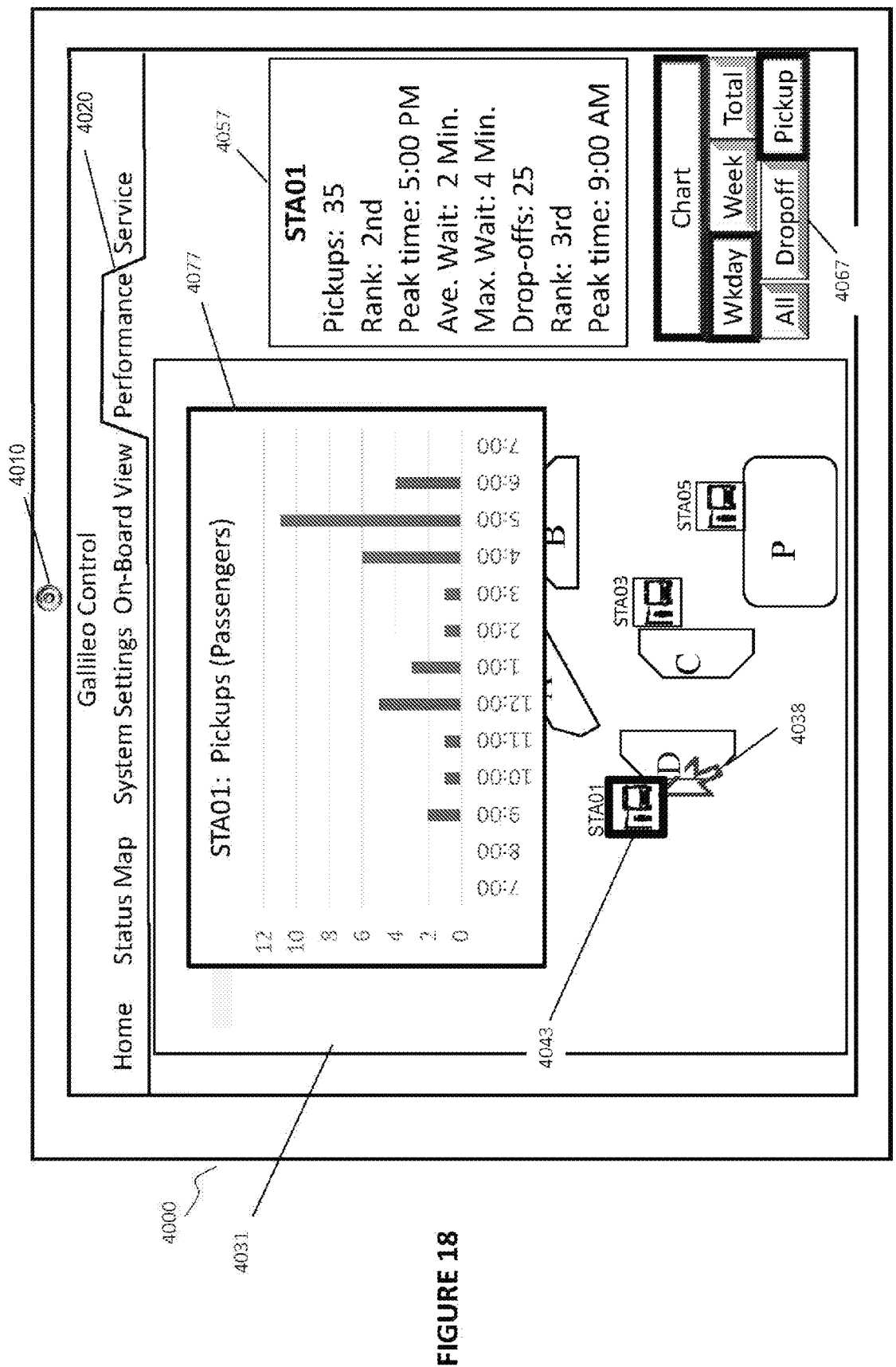
FIG. 18 shows an example Manager Client System Performance Page—Station Performance and Chart Selected.

Manager Client preferably allows the operator to select a graphical representation of the station performance (4067). In preferred embodiments, the Station Performance feature allows the operator to select from a variety of time periods (weekday, week, total or overall), and chart all travelers, drop-offs, or pickups. When the operator has made the selections, using the <chart> command results in a chart (4077) displaying the data selected by the operator at (4067). FIG. 17 illustrates one example of this capability. FIG. 18 depicts another setting on the System Performance page for chart selections <wkday> and <pickup>. With these settings, the system preferably displays a chart of pickups at the selected station.

Thus, Manager Client may demonstrate a wide variety of performance parameters selected by the operator, including: (1) total demand for each stop (number of passengers requesting pickup at a stop, waiting), (2) number of travelers seeking a ride to a particular destination, by time of day, (3) number of pickups at a station, by time of day, (4) average time waiting at each stop, by time of day. Manager Client may also display additional information on service running costs, such as total distance driven per day and energy costs (each shuttle and fleet). Such information may be used for predictive maintenance of the fleet.

Figure 19:
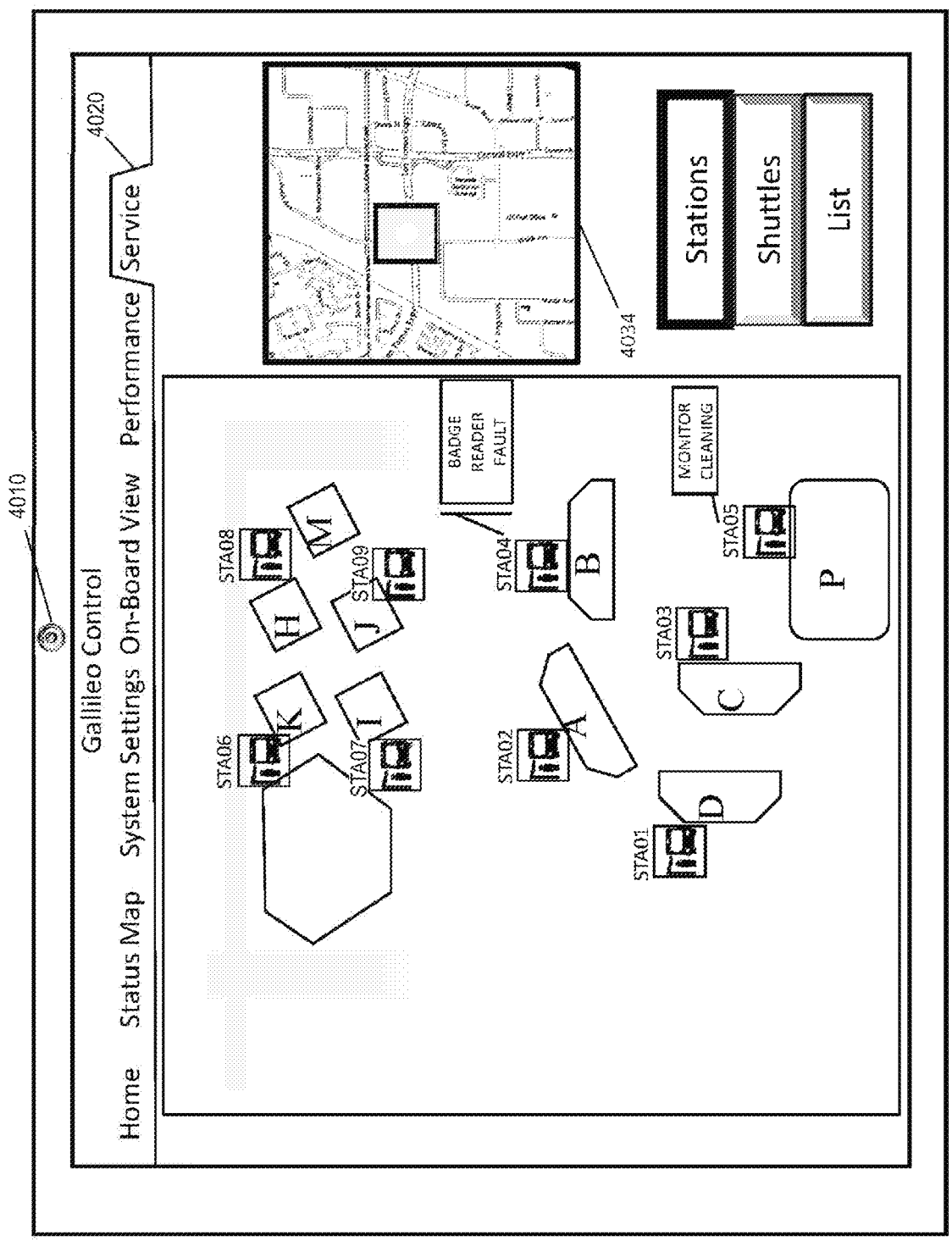
FIG. 19 shows an example Manager Client Service Page—Station Selected.

The Manager Client preferably allows the operator to view service information, as illustrated below in FIG. 19. The system allows the operator to view stations, shuttles, and lists. For example, FIG. 19 illustrates the <stations> view, which presents a view of each of the stations in the area of interest. Each station requiring service preferably includes a callout, indicting the type of service required—e.g., "monitor cleaning" or "badge reader fault."

Example Reservation and Ride Sequence

Figure 20:
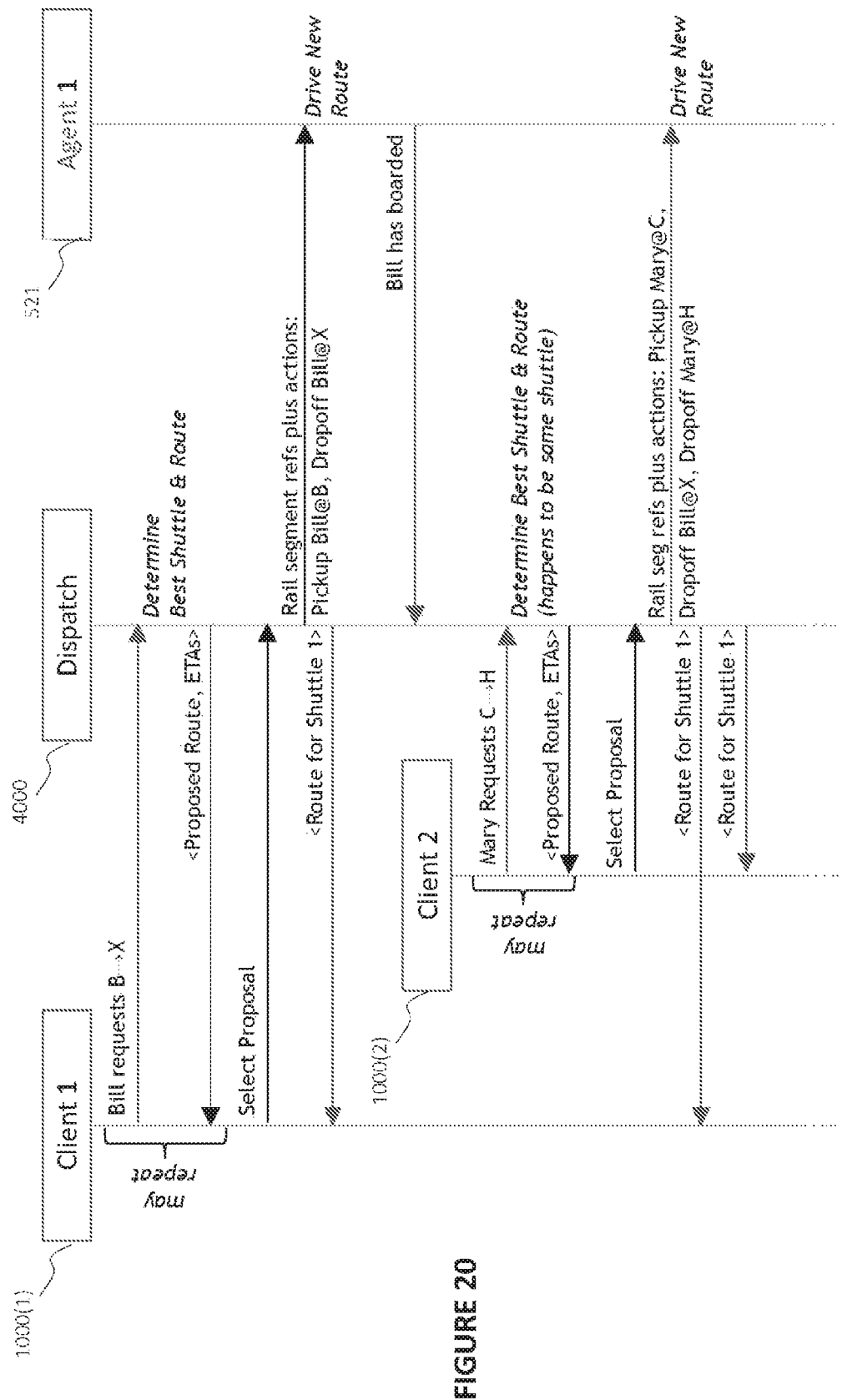
FIG. 20 shows Example Shuttle Reservation and Ride Sequence.

FIG. 20 illustrates one example of a reservation and ride sequence according to one embodiment. Client 1 requests a shuttle ride from pickup location B to destination A. Client 1 may be a mobile client, a kiosk, or a desktop client. The request, including pickup location and destination, is transmitted to AI Dispatch (5000), which determines the best shuttle and route. In making this determination, AI Dispatch (5000) may consider system settings that prioritize system parameters including (1) average wait time, (2) maximum (longest) wait time, (3) efficiency (cost per passenger mile), and (4) system cost (cost per hour). These preferences may be set by the system operator according to the operator's objectives. For example, an operator may make a commitment to riders that a shuttle may arrive no later than a maximum wait and set the parameter according. Alternatively, an operator may prefer the system to be efficient or have a lower total cost per hour. According to embodiments, the system determines the best shuttle and the best route in accordance with the operator's set preferences.

Having determined the best shuttle and the best route, AI Dispatch (5000) signals the proposed route and ETAs (both at pickup and destination) to Client 1. In determining the ETAs, AI Dispatch (5000) preferably recognizes that other Clients may request shuttle service and Shuttle 1, the selected shuttle, may be the best shuttle for other clients along the route. Thus, in determining the ETAs for Client 1, AI Dispatch (5000) preferably includes time that assumes that the shuttle will need to stop to pick-up or drop-off other passengers along Client 1's journey in the shuttle. AI Dispatch (5000) preferably determines this time based on a number of factors, including current system status, system parameters, time and date, and historical usage data for similar dates and times. In addition, certain passengers may be allowed to request Express Service, which is a non-stop service directly to the destination. Express Service may be provided for a fee, to certain individuals, or for specific purposes such as to attend approved meetings and/or events.

At this point, Client 1 may accept or reject the proposal, cancel the request, or submit a new request. When Client 1 selects a proposal, AI Dispatch notifies Shuttle 1 of the path and the proposed actions. In this case, the actions comprise picking up the requesting passenger, at location B, and dropping off Bob at location X. AI Dispatch sends the <Route for Shuttle 1> to Client1, and shuttle proceeds to location B, possibly making other pickups and drop-offs along the way.

When Shuttle 1 arrives at location B, AI Dispatch may send a notification to Client 1 indicating the arrival of Shuttle 1. Notification may include any means for notifying a mobile device, including text, email, and/or sound/vibration on mobile device. Shuttle 1 waits at location B for at least a predetermined time, and cameras on Shuttle 1 monitor for the presence of the requesting passenger (Client 1). Shuttle 1 may use facial recognition technology to identify the presence and arrival at Shuttle 1 of the requesting passenger and may open the shuttle door upon identifying Client 1. Alternatively, shuttle may include a badge reader, at the door frame, such as an RFID device that allows persons eligible to use the system to confirm their identity and entitlement or authorization to use the system. Suitable RFID technologies are known in the art, and include, for example, HID Multiclass RFID readers in 2 different frequencies (1) 125 kHz for proximity, and (2) 13.56 MHz for encrypted handshake/transmission. Shuttle 1 confirms the arrival and boarding of the passenger ("Bill") requesting shuttle service through Client 1, closes doors, and prepares to proceed to location B.

At this point or any other point in the sequence illustrated in FIG. 20, another traveler, "Mary", may also request shuttle service. In the sequence illustrated in FIG. 20, Mary requests a shuttle via Client 2 to travel from location C to location H. Client 2's request, including pickup location and destination, is transmitted to AI Dispatch (5000), which determines the best shuttle and route. AI Dispatch is aware of the presence and status of all shuttles in the system, including Shuttle 1, which is departing from location B, and preparing to take Bill to location X. AI Dispatch (5000) considers the different possible shuttles that may satisfy Client 2's request. Again, dispatch uses the system settings that prioritize system parameters, and the system determines the best shuttle and the best route in accordance with the operator's set preferences.

In the sequence illustrated in FIG. 20, AI Dispatch concludes that the best shuttle and route for Client 2 is Shuttle 1, the same shuttle that is already en route to location X with Client 1. AI Dispatch may also be able to modify or optimize the route previously planned for Bill to accommodate a new passenger Mary. Such modification in many cases should not degrade the service Bill receives, but a prioritization/optimization algorithm can be used to maximize the benefit to both passengers. If picking up Mary is likely to delay Bill's trip, AI Dispatch could send Bill a message (or use the on-board sensors, audio system, etc.) to inform Bill of the change and, in some embodiments, ask Bill if the modified route is acceptable. Bill may be fine with the modified route. For example, he may not be delayed significantly or at all, and he may want to help a fellow passenger. Alternatively, if there is a fare involved, Bill's fare may be discounted, and if he's not in a hurry, he may be perfectly happy with ride sharing. Still alternatively, the predefined conditions of travel may involve sharing the ride as needed so Bill can plan for delays that may be encountered if and when other passengers share the ride.

At this point, when AI Dispatch determines the optimal or most efficient solution may be to arrange a shared ride, Mary, through Client 2, may accept or reject the proposal, cancel the request, or submit a new request. When Client 2 selects a proposal, AI Dispatch notifies Shuttle 1 of the path and the proposed actions. In this case, the actions comprise following a new route to pick up Client 2 at location C, following a new route to drop off Client 1 at location X, and following a new route to drop off Client 2 at location H. AI Dispatch sends the revised <Route for Shuttle 1> to Client1, and shuttle proceeds to alter its route to head to location C.

Thus, example non-limiting embodiments provide a mobile application on a mobile device that allows a passenger to summon the vehicle so that the vehicle can transport the passenger to a desired destination. The mobile application may include a GPS or other geolocator that transmits the coordinates or other identifying information corresponding to the current location of the passenger. The mobile application may also provide facility for permitting the passenger to transmit her desired destination in the form of an address, GPS coordinates, building or structure name, or other geolocation information. A route planner receives this information and dynamically maintains a listing of all requested routes. Upon receiving a new requested route, the route planner optimizes the new requested route. One way to optimize the new route is to minimize the additional drive time relative to the other routes that have already been planned. Another way to optimize route planning is to take into account rush hour traffic and, in the case of for example an airport or train station shuttle, the predicted likelihood that on average workdays, many travelers will wish to leave for the same destination at around the same time (e.g., 5:00 pm to go to the train station). Such optimization can thus for example hold shuttle resources in reserve (or keep more shuttles in a given locality) in anticipation of later demand. Optimization can be performed based on various criteria such as minimizing wait time and prioritizing certain passengers and/or certain routes (e.g., so that a professor is delivered in front of her classroom before a student is delivered to his car in the student parking lot). The route planner uses such optimization to generate the route based on the passengers that are currently on board the vehicle, the ones that need to be picked up, and the ones that need to be discharged. The resulting new global route is then implemented, and the vehicle dynamically navigates along the new route. In some embodiments, computers in the cloud or in other vehicles can "shadow" the route planning to provide backup in case the vehicle's current route planning fails, to provide seamless recovery as well as a "second opinion."

Online planning can be used to modify the global routes based on new information including for example new passenger requests, changes in passenger destinations, and dynamic environmental conditions such as traffic. Such functionality is enabled by the development as discussed above of a custom map by the vehicle itself. Dynamic object detection is used both to develop the custom map and to avoid colliding with dynamic objects. The custom map and dynamic object detection are each performed using a sensor suite that can perceive the environment. Planning and control are used to effectuate the navigation of the vehicle along the planned route by for example actuating steering, braking, propulsion, and other aspects of the vehicle operation in order to cause the vehicle to drive the planned route. An incoming request handler is used to receive incoming requests from new passengers, dynamically generate new routes, optimize those routes, and provide them to the navigation system.

When performing route planning, the controller may or may not know the destination of a particular passenger. For example, in some context, a passenger may board the vehicle at a predetermined stop or at a stop at which the passenger hailed the vehicle. However, the passenger may not inform the vehicle of the passenger's desired destination if that destination is a predetermined stop on a predetermined route (e.g., bus stop 17). In other usage contexts, the passenger may have hailed the vehicle using a mobile application that specifies the passenger's pick-up location as well as the passenger's desired destination location. In usage contexts in which the vehicle is informed of the desired destination of each passenger, the vehicle is capable of performing route optimization to most efficiently get each of the passengers to their desired destination.

Shuttle Client Application Suite ("SCAS") and Shuttle Interior

In example embodiments, the shuttles preferably include a suite of software applications that communicate with the safety driver, passengers, and third-parties in the shuttle's vicinity. The software applications preferably include: (1) Safety Driver UX (for optional safety driver), (2) Passenger UX (to communicate with shuttle passengers), and External UX (to communicate with third-parties in the shuttle's vicinity).

1. Safety Driver UX

The Safety Driver UX provides an interface for the safety driver, and in some embodiments may not be visible to the shuttle passengers. The Safety Driver UX is designed to equip the shuttle with interactions designed to maximize the probability the safety drivers will prevent unintended and unsafe behavior. It is designed to be a clear and simple UX for the safety driver, with intuitive and simple interaction with all safety relevant features of the vehicle. The Safety Driver UX recognizes that the safety driver needs to be fully aware of the shuttle AV status at all time.

Safety Driver UX preferably includes a Safety/Confidence Display, which indicates the confidence that the autonomous vehicle has in its current circumstance. The Safety Driver UX can provide for multiple levels of safety driver involvement. For example, Safety Driver UX may include a setting that requires safety driver confirmation in certain scenarios (stop signs, traffic lights, unprotected turns, shuttle stops). For example, Safety Driver UX may indicate that the autonomous vehicle recognizes and is responding to a stop sign. Safety Driver UX may then require the safety driver to confirm the autonomous vehicle's detection of the stop sign. In still other embodiments, the safety driver is not "behind the wheel" but is able to exercise overall supervisory control over the vehicle through other means (e.g., voice commands, console commands, etc.) such as commanding "pull over" in severe weather or other potentially dangerous situations.

Figure 21:
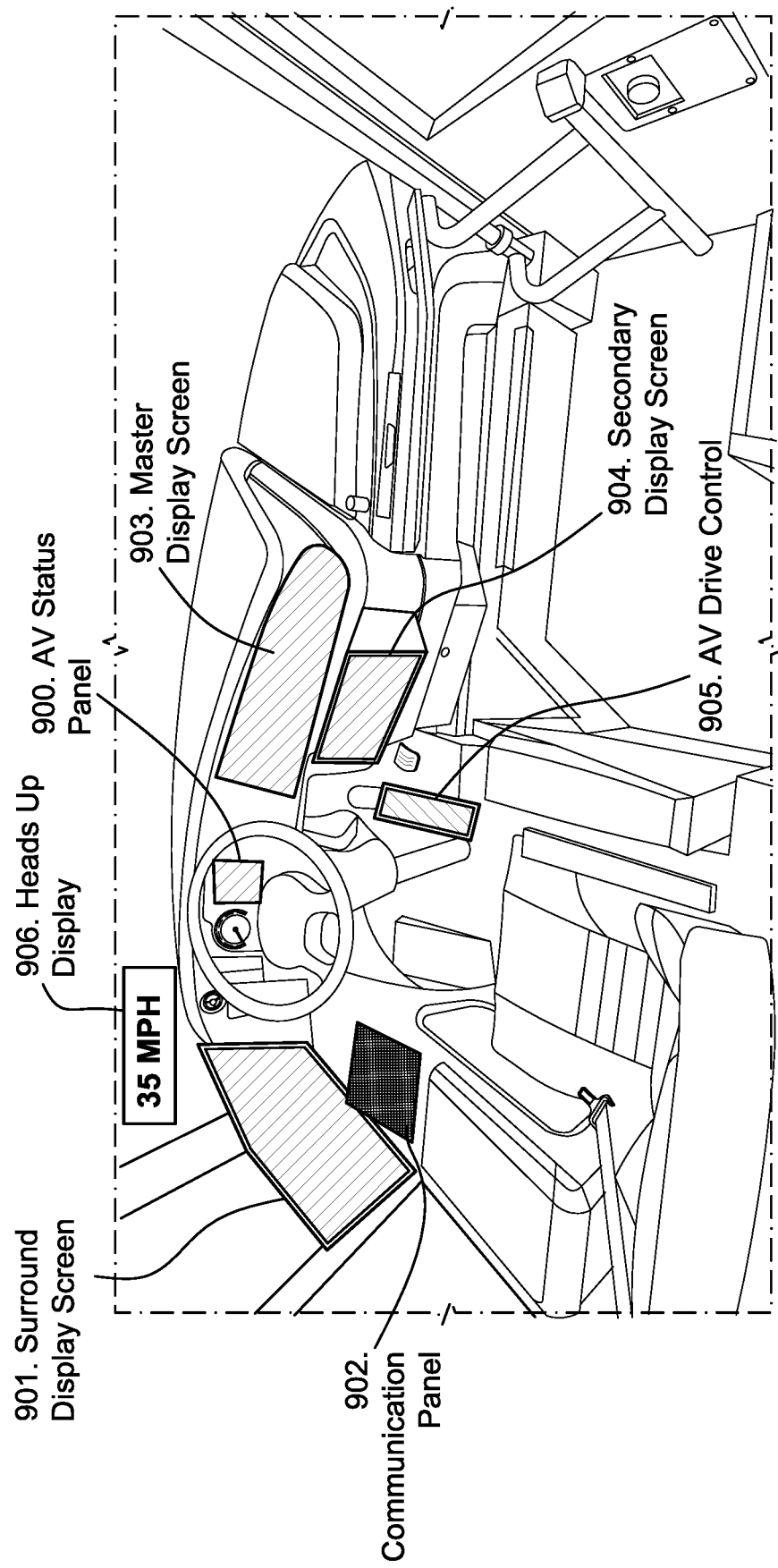
FIG. 21 shows an example Safety Driver UX-I/O.

In one embodiment, the safety driver sits in a seat behind a steering wheel with access to manually actuatable controls. In such embodiment, the safety driver activates and confirms the AV mode simply by pressing a foot pedal offset from the accelerator and brake. This foot pedal, AV Drive Control (905) in FIG. 21 is separate and distinct from the controls used for conventional driving. Nonetheless, pressing a foot pedal is a natural command for a driver. When the foot pedal is pressed, the shuttle activates and/or continues AV mode. In one embodiment, when the safety driver removes his or her foot from the pedal, the AV mode is transitioned to a safety procedure. If the safety driver provides immediate commands (braking, accelerating, steering) through interaction with other manually actuatable controls, via voice commands, etc., the shuttle follows those commands. If the safety driver removes his or her foot without assuming control over the shuttle, the vehicle slows to a safe stop, and the Safety Driver UX displays an "AV Mode Disengaged" message on the AV Status Display Screen. Other methods to engage/disengage the AV mode may be used. For example, in embodiments, safety driver can disengage the AV Mode by (1) applying steering wheel torque above a threshold, (2) applying braking pedal action above a threshold, (3) applying accelerator pedal action beyond a threshold, and/or (4) pressing an AV Mode disengage button, which may be located anywhere accessible to the safety driver, including the steering wheel. These commands are known and intuitive to experienced drivers, as they are already associated with disengaging cruise control systems in conventional automobiles.

According to some embodiments, the system can be configured according to operator preference. For example, the system can be configured to (1) require confirmation in certain scenarios (stop signs, traffic lights, unprotected turns, shuttle stops), (2) respond only to safety driver double button press (to avoid accidental interaction), (3) deactivate only with brake pedal, steering wheel and/or gas pedal operation, (4) allow button press only to engage or confirm AV mode, and/or (5) allow confirmation by voice command (recognized by speech recognition). In such embodiments, the AV mode may be clearly visible in the AV Status Display Screen and indicated with sound.

FIG. 21 illustrates one embodiment of the Safety Driver UX input/output and configuration. Safety Driver UX includes one or more display screens, including:

AV Status Panel (900),
Master Display Screen (903),
Secondary Display Screen (904),
Surround Display Screen (901), and
Communication Panel (902).

Figure 21C:
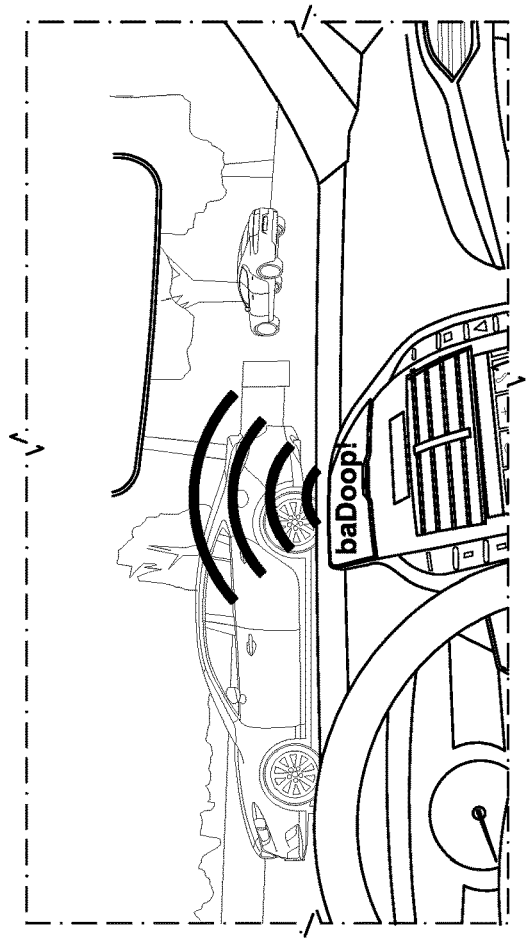
FIGS. 21B and 21C show example displays.
Figure 21B:

AV Status Panel (900) preferably is a small (for example and without limitation: 3.5", 4", or 5") display showing only key information for the safety driver to operate the vehicle. FIGS. 21A, 21B, 21C show additional options for providing such an AC Status Panel (900) in a limousine or other on demand vehicle. In FIG. 21A, a small display is used to augment the normal instrument cluster. This small display shows only key information for the safety operator to operate the vehicle. For example, an outer LED strip framing the display can show green when autopilot is active, not show green (e.g., be uncolored) when autopilot is not active, and flash orange or red when an error condition arises. The display content includes lateral engaged, longitudinal engaged, distance to vehicle, warning messages/alerts, and in some cases lane detection information. In one or more embodiments, the display is sufficiently small and unobtrusive that only the safety driver (not the passengers) can see it. In another example embodiment shown in FIG. 21B, a monitor/tablet device (or like-sized display) is visible to both passengers and the safety driver and is mounted as high as possible without blocking a windshield and shows simple information about the shuttle's perception and plans. For touch interaction, an application runs on an easy-to-reach in-vehicle infotainment (IVI) screen.

Passenger Confidence Displays

While some embodiments display current status information to a safety driver when a safety driver is present, other displays may be provided to provide confidence to passengers that the vehicle is actively assessing risks and taking rational actions to ensure safety. For example, in some exemplary embodiments, the vehicle provides the passenger with two basic things:

Confidence, and
Inflight scheduling.

Confidence provides reassurance to the passenger that the vehicle is being piloted safely by the artificial intelligence. This allows the passenger to relax and makes the passenger more comfortable concerning safety. The inflight scheduling functionality allows the passenger to control and understand what the overall plan is for route planning and destination. For example, a passenger will often want to know where the shuttle's destination is, where it goes after that, how much time it will take and whether she will be on time or late for her next meeting.

In a robo-taxi context, the passenger UX can be provided on a seat back display so a passenger in the rear seat can view the information. In a shuttle context, a smaller analogue of a "jumbotron" display may be provided at the front or other location of the passenger compartment. Such a display can in some embodiments be very large, placed in the front of the passenger compartment, and provide displays that are aimed at the passengers, as opposed to for example the safety driver.

During one mode of operation, such a large front display in the passenger compartment could display information about how the vehicle is currently being piloted. For example, the display may display LIDAR information, the safe space the vehicle is being piloted through, and other navigational information such as "slowing down for a stop sign," or "the way is clear, turning right." Such displays give the passengers confidence that the vehicle is not making random decisions but is doing things for good reasons. The display may display the reasons why the vehicle is doing what it is doing, making the passenger more comfortable with the vehicle's decisions.

The display may in some embodiments occasionally switch contexts. For example, it might display a list of the passengers on board (e.g., based upon facial identification that occurred when the passenger boarded the vehicle). It may also information pursuant to each passenger based on calendar or other database access (e.g., "passenger A has a morning dentist appointment, passenger B has a meeting beginning at 9:00 AM in building G"). The display can update to alert particular passengers when the vehicle has reached their particular destination.

Part of confidence relates to giving the passengers confidence that the shuttle will not harm other people on the road. For example, when in the passenger or rear seat of a conventional taxi cab, a passenger who sees a child playing with a ball on the side of the road may swivel their head to look at the driver, in order to make sure the driver has seen the child and will navigate (e.g., slow down) to ensure the child remains safe. In an autonomous shuttle, there is no driver to look at and no way to gauge whether the AI based controller has perceived, recognized, and will protect the safety of children playing on the side of the road, pedestrians crossing in front of the shuttle, bicyclists sharing the road with the shuttle, or other vehicles. Because the passenger cannot read the body language of an autonomous shuttle, example non-limiting embodiments replace a human driver's body language with a confidence display. For example, as shown in FIG. 22, a display visible to both the passengers and the safety driver if present (or same or similar presentations on different physical display devices, one for the passenger and one for the safety driver), can give all humans on board (including the passengers) confidence that the artificial intelligence controlling the vehicle has recognized risks and is taking appropriate action.

For example, when a bicyclist is on the road in front of the shuttle (see FIG. 22A), the controller may display a front view (e.g., based on cameras, LIDAR, etc.) showing that path before the shuttle and highlighting the risk or other activity that the artificial intelligence has recognized—in this case a bicycle. In the case of a bicyclist travelling in front of the shuttle, the display can display the bicyclist in a different color and/or within a bounding box, with legends such as "bicycle 42.5 feet ahead." In the case of a driver (580) exiting a car parked ahead on the side of the road (see FIG. 22), the confidence display can highlight the open car door and provide an appropriate legend to give the humans on board the shuttle confidence that the artificial intelligence has recognized the risk and will take appropriate action (e.g., slowing down, and swerving if necessary).

Figure 28:
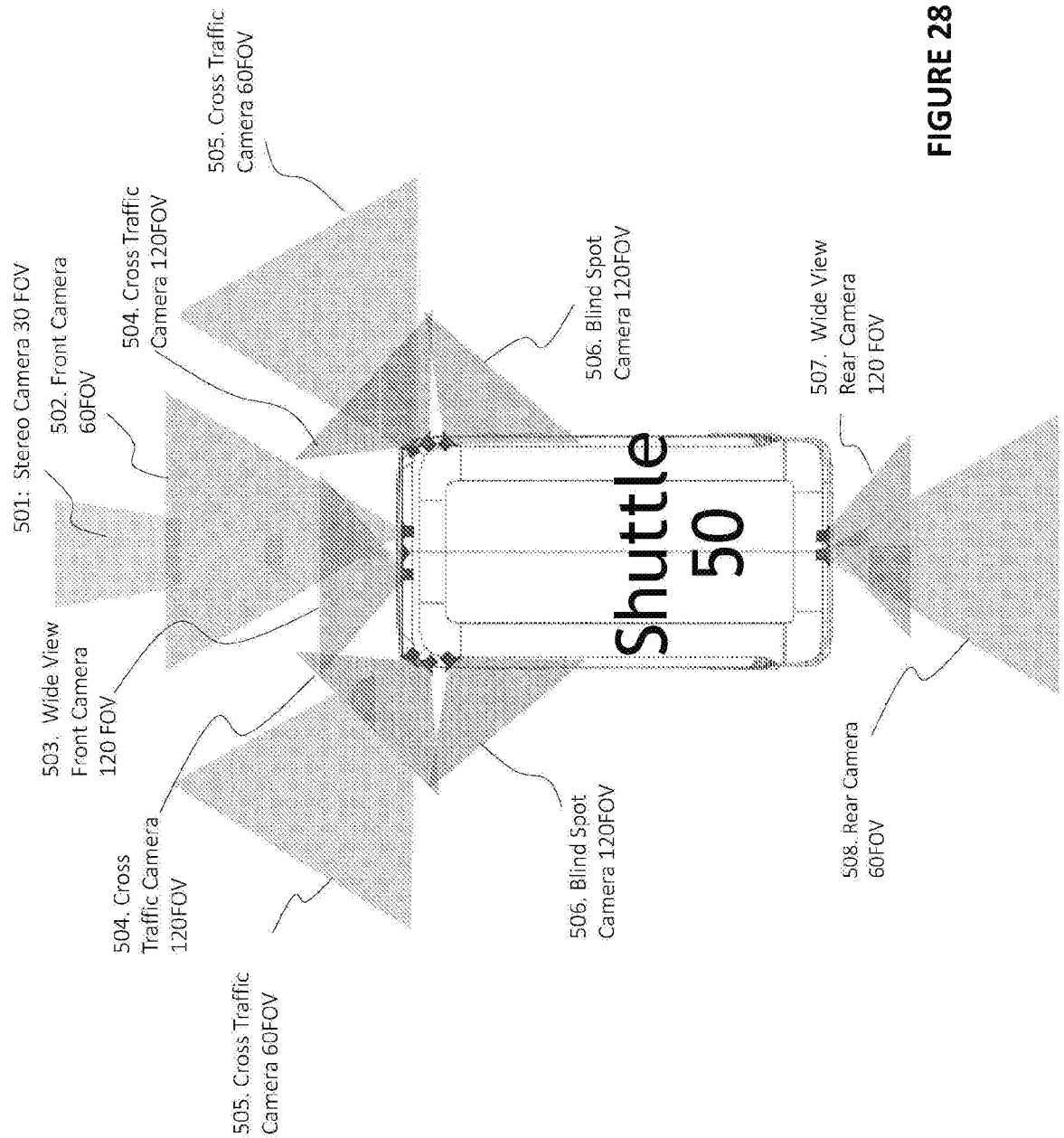
FIG. 28 shows Example Camera Types and Locations.

In more detail, referring again to FIG. 21, Surround Display Screen (901) and Secondary Display Screen (904) preferably display information from cross-traffic cameras (505 in FIG. 28), blind spot cameras (506 in FIG. 28), and rear cameras (507 and 508 in FIG. 28). In a preferred embodiment, Surround Display Screen (901) and Secondary Display Screen (904) are arranged to wrap around the safety driver as illustrated in FIG. 21. In alternative embodiments, the display screens may be combined or arranged differently than the embodiment shown in FIG. 21. For example, AV Status Panel (900) and Master Display Screen (903) may be consolidated in a single forward-facing panel. Alternatively, a part of Master Display Screen (903) may be used to show a split-screen view, or an overhead view of the shuttle, with objects around it. Alternatively, input/output may include a heads-up display ("HUD") (906) of shuttle parameters such as speed, destination, ETA, and number of passengers, or simply the status of the AV system (activated or disabled). Such a heads-up display can be embedded in the windshield (if one is present) as shown in FIG. 21C and can be accompanied by audio cues to indicate status during transitions.

Figure 22:
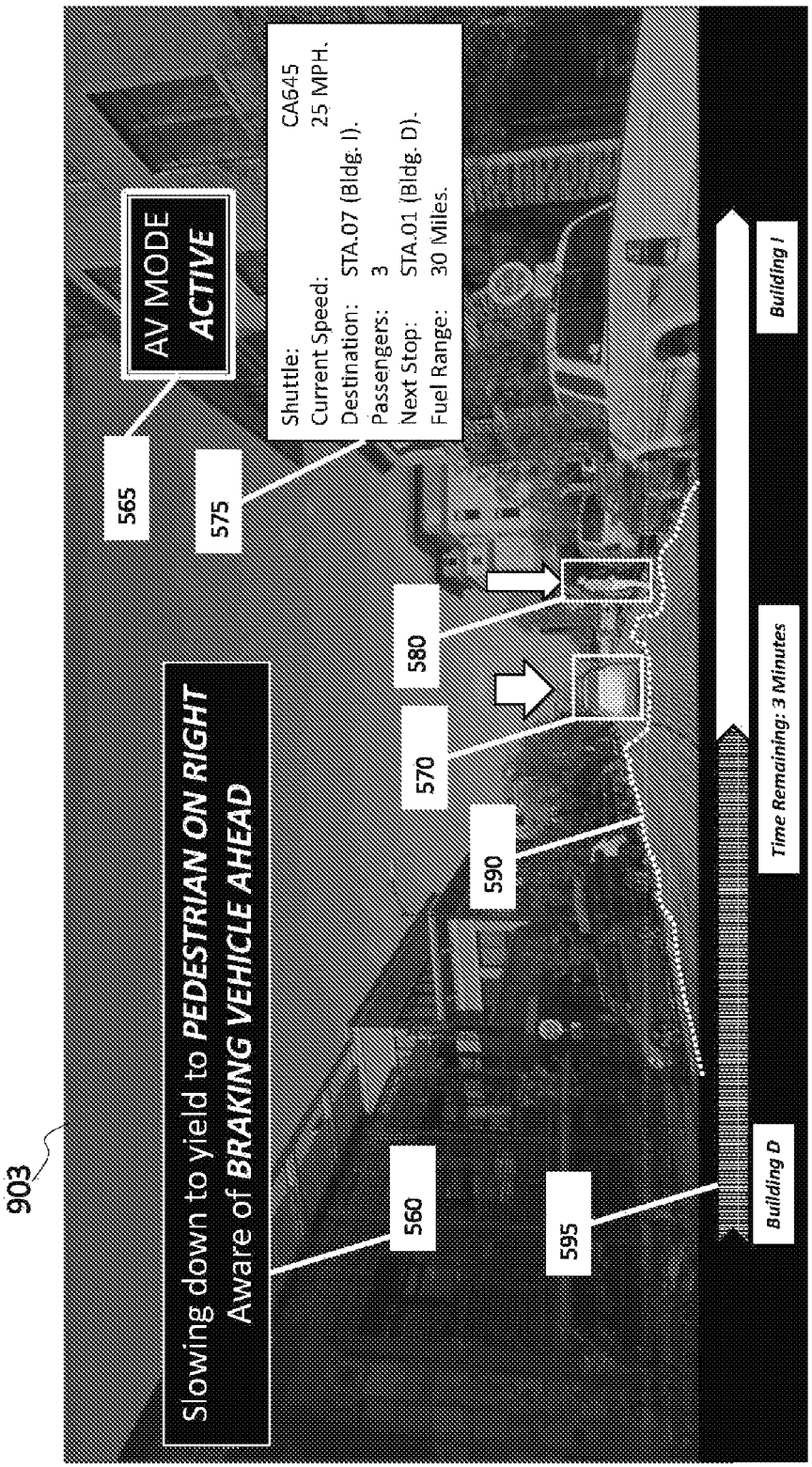
FIG. 22 shows an example Safety Driver UX—Exemplary Master Display Screen.

FIG. 22 illustrates an example master display screen (903) according to a preferred embodiment. Master display screen (903) preferably displays a real-time view from the forward camera (903), as well as shuttle parameters (575) such as speed, destination, ETA, and number of passengers. ETA may be displayed as a progress bar, as illustrated in FIG. 22, or by a clock, digital readout or similar display. Master display screen (903) may include AV Mode Status indicator (565). Master display preferably provides feedback regarding the performance of the autonomous AV system, including a map of drivable free space (590) and bounding boxes around vehicles (570), pedestrians (580), and any other objects of interest. These indicators inform safety driver that the AV is correctly identifying road hazards, vehicles, and other objects. Master display preferably also includes an Alert Display (560), which highlights the presence of significant obstacles and informs the safety driver of the vehicle's perception and response to them, for purposes of confidence as discussed above. In the example illustrated in FIG. 22, the Alert Display (560) indicates "Slowing down to yield to PEDESTRIAN ON RIGHT" and "Aware of BRAK-ING VEHICLE AHEAD". These alerts, combined with the free space (590) and bounding boxes around vehicles (570), pedestrians (580) give all humans on board the vehicle confidence that the autonomous shuttle not only has correctly identified the obstacles, but is taking appropriate action in response to them. If desired, Alert Display (560) may be displayed as a heads-up display on the front windshield.

Figure 22A:
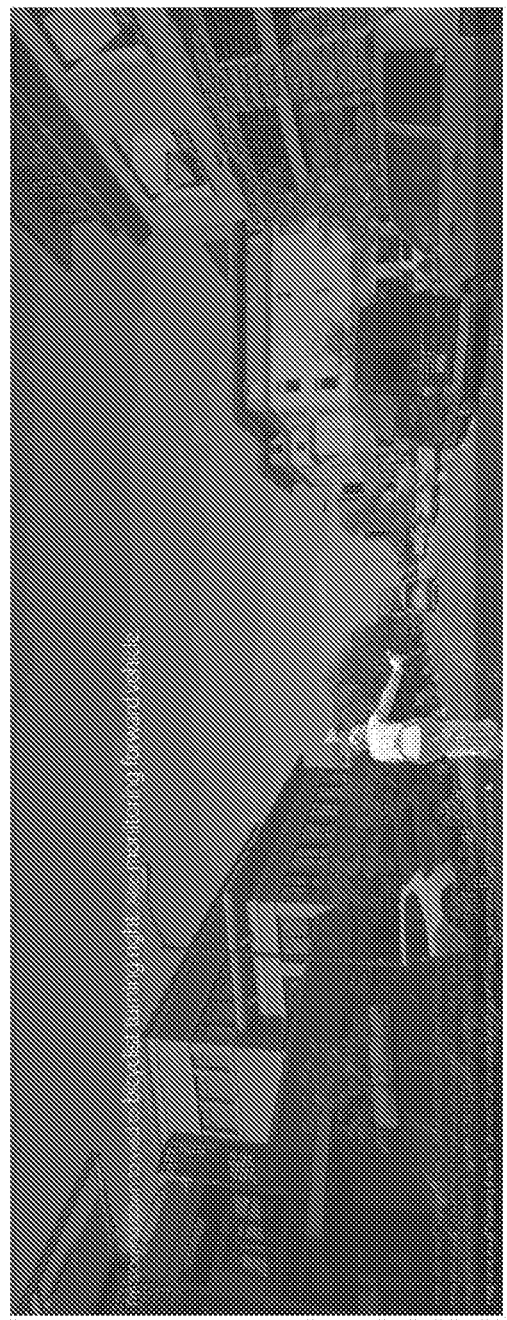
FIG. 22A shows an example passenger confidence display.

FIG. 22A shows an additional confidence visualization example of an augmented display indicating with color and a legend that the vehicle understands the potential situation associated with a bicyclist and is taking appropriate precautions. Such a confidence visualization can provide a visual feast showing the vehicle's brain. Such a display instills passenger confidence and acts as a demonstration showcasing AV technologies in the most beautiful and helpful way possible, with the following example characteristics:

Sensor Input—LiDAR, camera, and other inputs that the shuttle 'sees'.
Feature Detection—What the deep neural networks (DNNs) are detecting: lanes, pedestrians, vehicles, etc.
Localization—How the shuttle is using detections & HD maps to know where it is.
Decisions—Why the vehicle has chosen to perform an action, e.g.
"I am stopping because there is something in the road"
Route Progress—The vehicle route and ETA to each stop.

2. Passenger UX

The Passenger UX communicates with the shuttle passengers. In preferred embodiments, the Passenger UX provides audible and visual notification of the current AV status (LEDs, displays, sound), visualization of route information, text to speech interface, speech recognition, and external app integration (including integration with calendar applications such as Outlook). Passenger UX may also provide interaction by receiving express (explicit) and implied (implicit) inputs from and/or concerning passengers.

Figure 23:
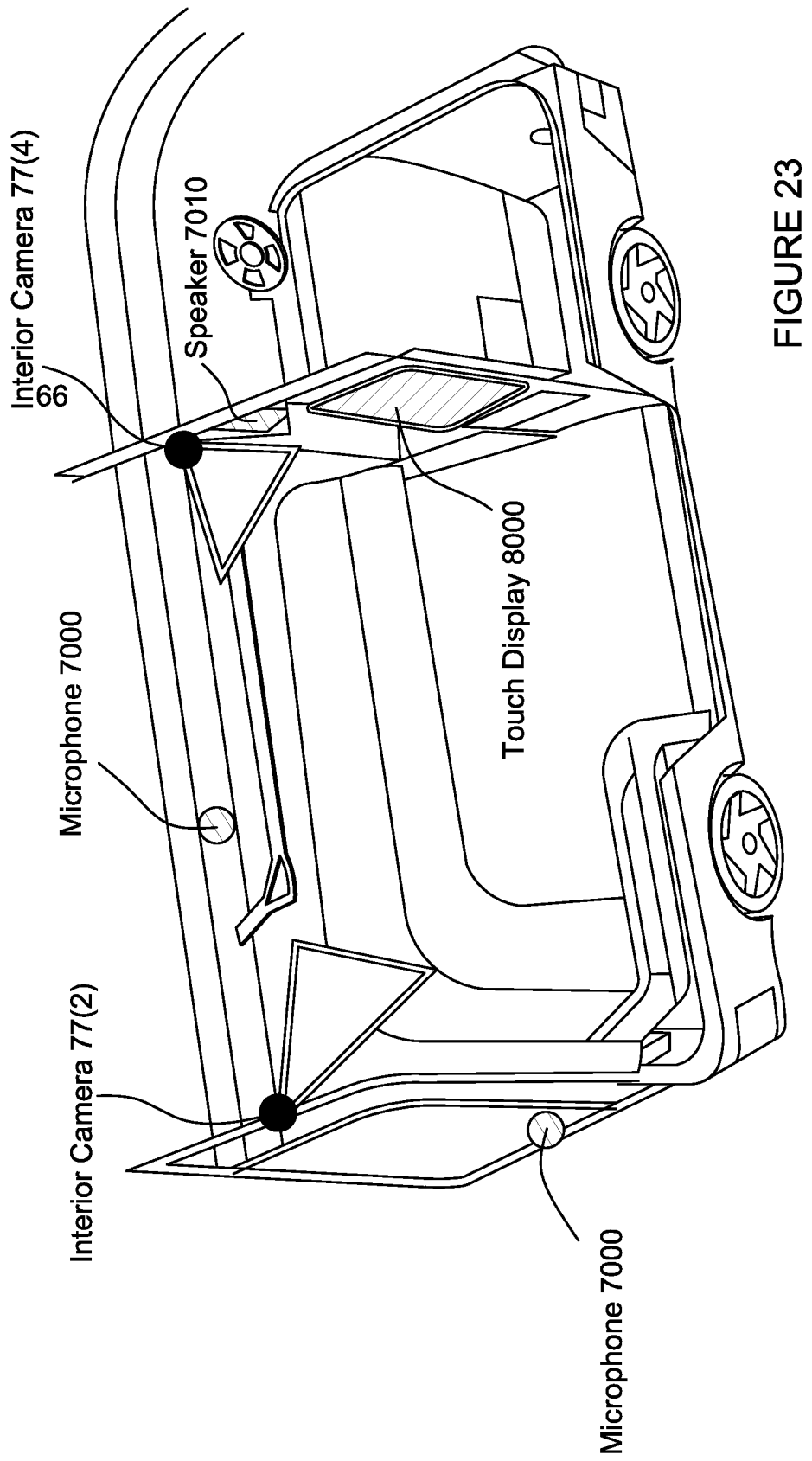
FIG. 23 shows an example Passenger UX—Shuttle Interior.

The Shuttle Client (520) controls the on-board displays in the shuttle interior, and preferably provides I/O capability for travelers. FIG. 23 illustrates an exemplary shuttle interior according to one embodiment. Shuttle interior includes one or more interior cameras (77), one or more interior microphones (7000), and one or more speakers (7010) for communicating with travelers. Shuttle interior also preferably includes touch display (8000) for I/O with Shuttle Client (520). In some embodiments, there may be several different displays within the shuttle interior for communicating different information with different passengers.

Shuttle Client (520) may comprise an on-board version of the Traveler Mobile Application (TMA) or Traveler Kiosk Application (TKA). Shuttle Client Application (SCA) may include additional functionality specific to the shuttle. Touch Display preferably provides touch points for passengers to interact with shuttle functionalities, easily accessible at the entrance, information display four current route planning and shuttle stops. For example, Touch Display may show routes and planned stops for all shuttles, highlight the shuttle's current route, and stop(s). In a preferred embodiment, the Touch Display also provides the ability for passengers to alter their destination or route, for example, if they receive a call/information that they suddenly need to go to another location (e.g., building) while en-route. Alternatively, or in addition, voice recognition can be used to recognize and act on passenger's oral commands, and the cameras (and/or motion detectors) can be used to recognize and act on passenger's gesture commands.

In a preferred embodiment, shuttle interior includes an overhead display (preferably without touch capability) showing an overview map and current route progress. Overhead display preferably includes AV driving information of interest, such as bounding boxes, path, identification of object type, size, velocity, and the like. In this manner, overhead display reassures travelers that the shuttle perceives the world around it and is responding in a safe and appropriate manner. In a preferred embodiment, overhead display is clearly visible for safety passengers. Information such as shown in FIGS. 21A-21C, and FIGS. 22-22A may be displayed on such overhead display in some embodiments.

3. External UX

According to embodiments, the shuttle is able to communicate its mission and status to other traffic participants to improve the overall traffic safety. The shuttle preferably has advanced sensing capabilities that it uses to assist departing travelers and other traffic participants. In embodiments, the shuttle's External UX provides external communications to assist third parties, including: (1) communication with pedestrians including at pedestrian crossings, (2) communication with other vehicles, including manual drivers and autonomous vehicles at intersections and including stop sign negotiations, and/or (3) communication with all other traffic participants of possible hazards.

Using the External UX, the shuttle can also provide confidence concerning the shuttle's operation to humans that are not onboard the shuttle but rather are external to the shuttle but within the shuttle's immediate environment. In typical manned driving, when two vehicles come to a four-way stop, the drivers may attempt to make eye contact with one another in order to communicate and understand their respective intentions. If the other driver appears to be inattentive, staring at their mobile phone or looking in the opposite direction, most drivers will stop and wait because they have no confidence the other driver is paying attention and they do not know what the other driver's intention is. If both drivers are paying attention and make eye contact, one of the drivers may use a "you go first" hand gesture or flash their headlights to signal to the other driver that it is safe for them to proceed into the intersection.

In example non-limiting embodiments, shuttles have external signaling mechanisms that allow them to communicate their intentions to other vehicles, pedestrians, etc. In prior technology, drivers use manual turn signals to let drivers of following vehicles intentions for turning left or right. Brake lights and sometimes headlights are used in similar ways as signaling devices to signal other drivers. In a world in which all other vehicles on the road are automated, the shuttle could communicate its intention using computer-to-computer networking or other digital electronic wireless data exchange. However even in such contexts, there will still likely be humans on the road either as pedestrians or bystanders. The example non-limiting shuttle embodiments provide more sophisticated external signaling of intention and knowledge.

For example, on a current city street, it is difficult for a driver to signal to a bicyclist pulling up alongside that the driver has seen the bicyclist, recognizes the bicycle is there, and will take appropriate action to ensure the safety of the bicyclist. Occasionally, a human driver may roll down the window and make eye contact with the bicyclist. Often however, the bicyclist does not know whether the human driver has seen her and will navigate accordingly.

One example display could include or provide a virtual representation of a human driver (e.g., a holographic head, doll, etc.) used to demonstrate something about the intentions of the vehicle to humans externally of the vehicle.

In example non-limiting shuttle embodiments, lighting or other displays around the vehicle can be used to communicate externally. Light displays could be positional (e.g., a band of light that follows the detected proximity of a pedestrian external of the vehicle with a color indication of warning or safety) and/or iconic (e.g., display an image of a pedestrian when a pedestrian is detected, display an image of a bicycle is detected, and so on). Some example non-limiting embodiments provide external displays that are much more informative than turn signals—such as a display that can be seen from outside the vehicle that displays iconically the type of turn the vehicle intends (e.g., left turn, right turn, etc.), plus distance and other information concerning the turn the vehicle has planned. In other embodiments, when the vehicle recognizes a bicycle has come alongside, the vehicle can use a laser projector to project an image of a bike path on the road surface ahead of the bicycle. Such a projected image may confirm to the bicyclist that the vehicle has recognized the presence of the bicycle and is taking it into account. The image may also help the bicyclist to maneuver in such a way that it is able to avoid the vehicle.

Alternatively, or in addition, the vehicle may use laser or other high intensity projection technology to project an image on the road surface showing its intention to pedestrians at a crosswalk. Such projection technology may be more effective at dusk or at night than during the day based on visibility. In yet other embodiments, the external surface of the vehicle could be a large display. Content precautions and display information structuring could be used to make such information easier to recognize at a glance. Such displays may be more informative and/or intuitive at a glance if they are iconic as opposed to literal, and simple as opposed to extensive.

The External UX is designed for Intent Communication—to display the shuttle's intent to the outside world. It provides a clear visual display of shuttle intentions to pedestrians, bicyclist and vehicles. It is intended to improve confidence in shuttle behavior and assist in stop sign negotiation. The External UX provides clear visualization of shuttle failure and hazard modes, including autonomous driving system failure, powertrain failure, battery failures. In preferred embodiments the External UX improves road safety by communicating potential hazards to unaware traffic participants, thereby using the shuttle's advanced detection capabilities to improve overall road safety.

Figure 24:
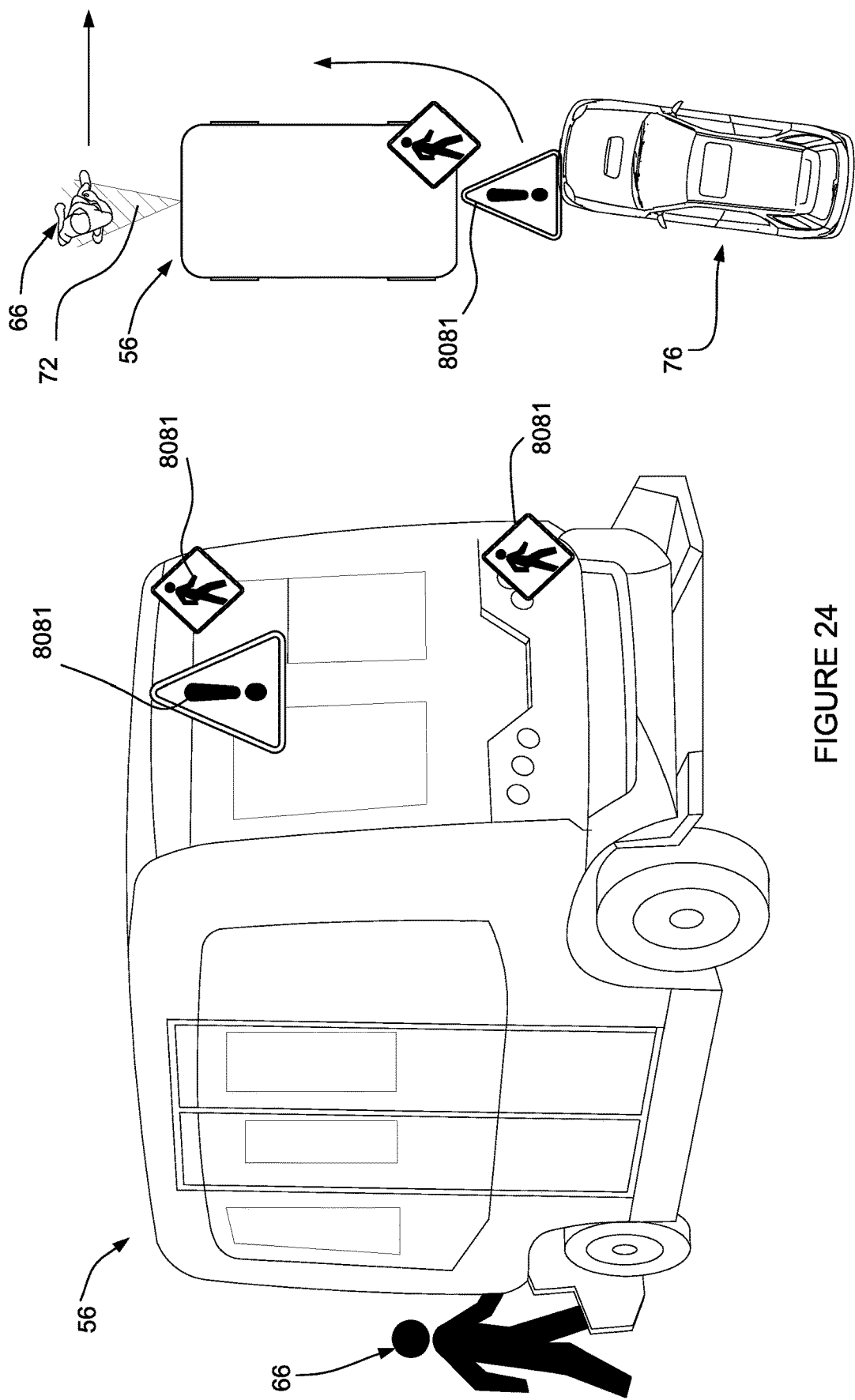
FIG. 24 shows an example External UX— Exemplary Pedestrian Safety Warnings.

The shuttle preferably includes displays for communicating with other drivers and persons outside of the shuttle, further enhancing safety. For example, one of the most dangerous conditions for bus-shuttle passengers is the period of time during which immediate departure or boarding occurs, when passengers outside the shuttle and other vehicles may be attempting to pass. In a preferred embodiment, as illustrated in FIG. 24, the shuttle uses its rear-facing camera to detect the presence of passenger (66) and its forward-facing camera to detect passing vehicles (76). The shuttle preferably notifies approaching vehicle (76) via flashing pedestrian warning signs (8081), indicating the presence of passengers and the side of the shuttle of the passenger. Similarly, the shuttle preferably notifies passenger (66) of the hazard (76) via flashing "wait" signs (known to pedestrians) or approaching automobile warning signs. Shuttle preferably notifies passenger through speakers, audibly declaring a warning such as "WARNING—VEHICLE APPROACHING." When the vehicle passes, the shuttle may indicate "Walk to Curb" or other command that it is safe for the traveler to proceed.

Figure 25:
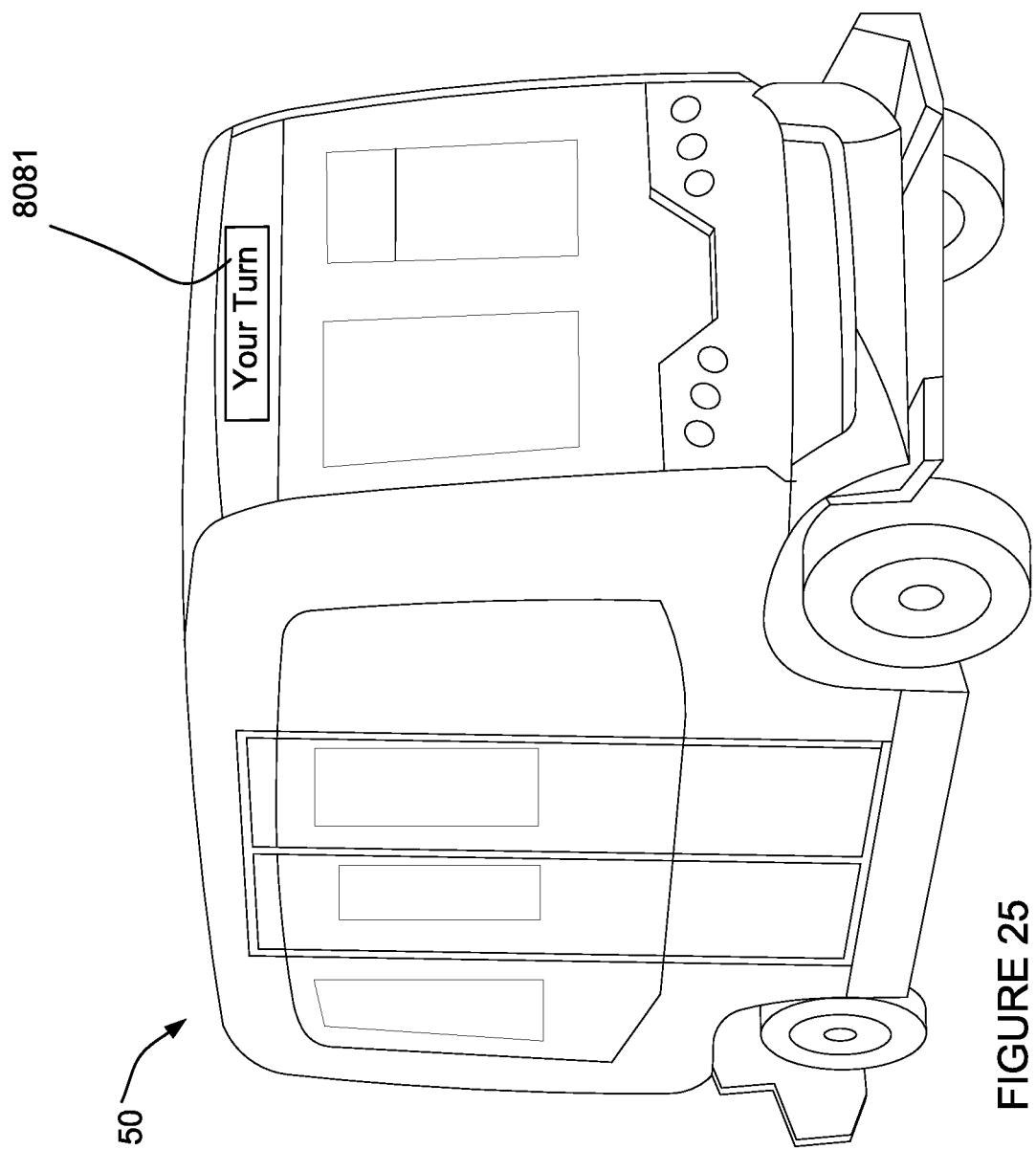
FIG. 25 shows an example External UX—Shuttle Waiting for Other Vehicle(s)
Figure 26:
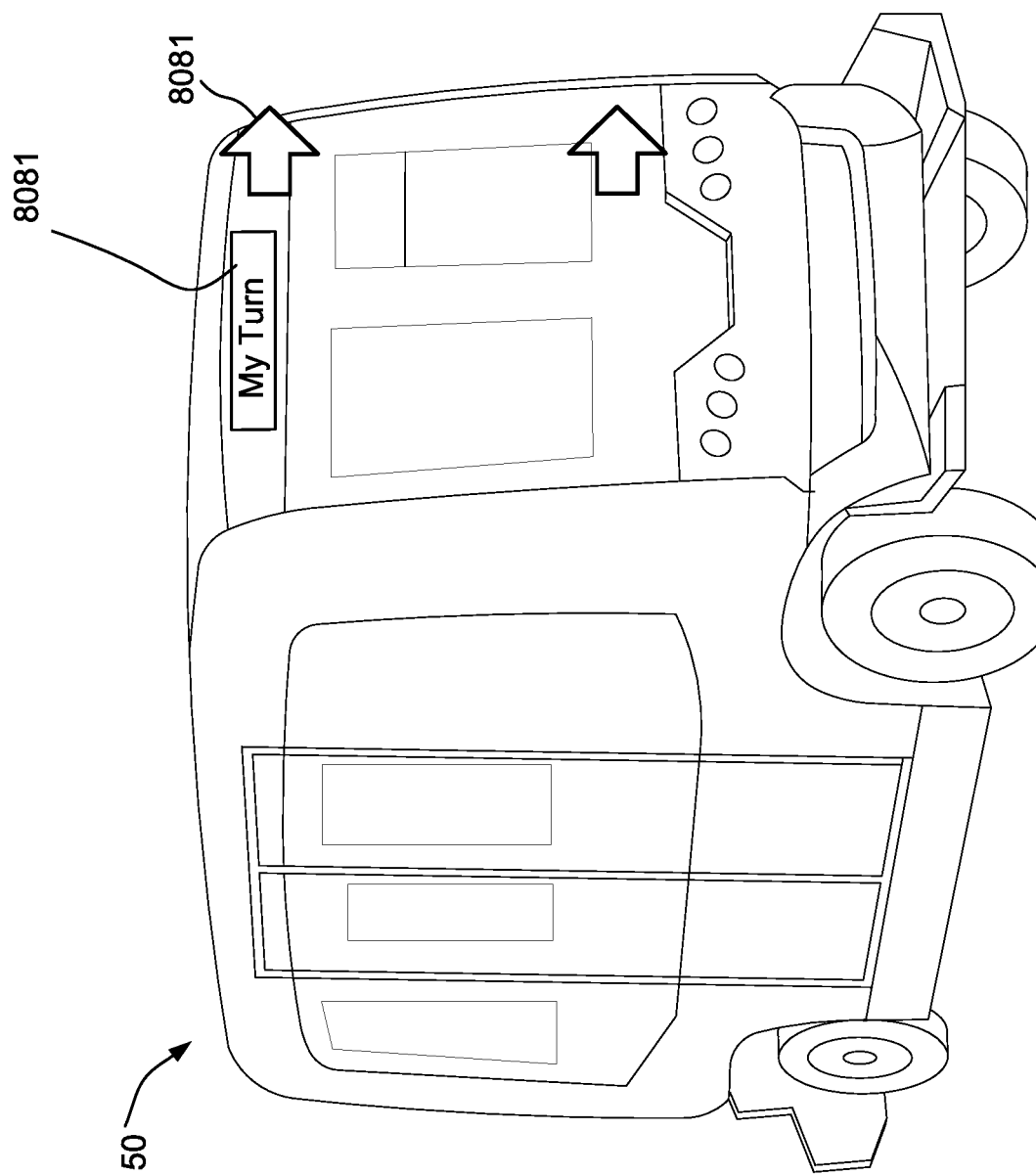
FIG. 26 shows an example External UX—Shuttle Taking Its Turn.

FIG. 25 and FIG. 26 illustrate another example functionality of External UX, displays for stop sign and intersection negotiations. In FIG. 25, shuttle (50) uses forward-facing display (8081) to signal other vehicles at the intersection that it is "Your Turn", indicating that the shuttle will cede priority to at least one other vehicle in crossing the intersection. In FIG. 26, shuttle (50) uses forward-facing display (8081) to signal other vehicles at the intersection that it is the shuttle's turn ("My Turn") and indicating a direction, signaling to traffic that the shuttle is proceeding into the intersection and identifying the direction the shuttle plans to turn.

Figures 26A, 26B:
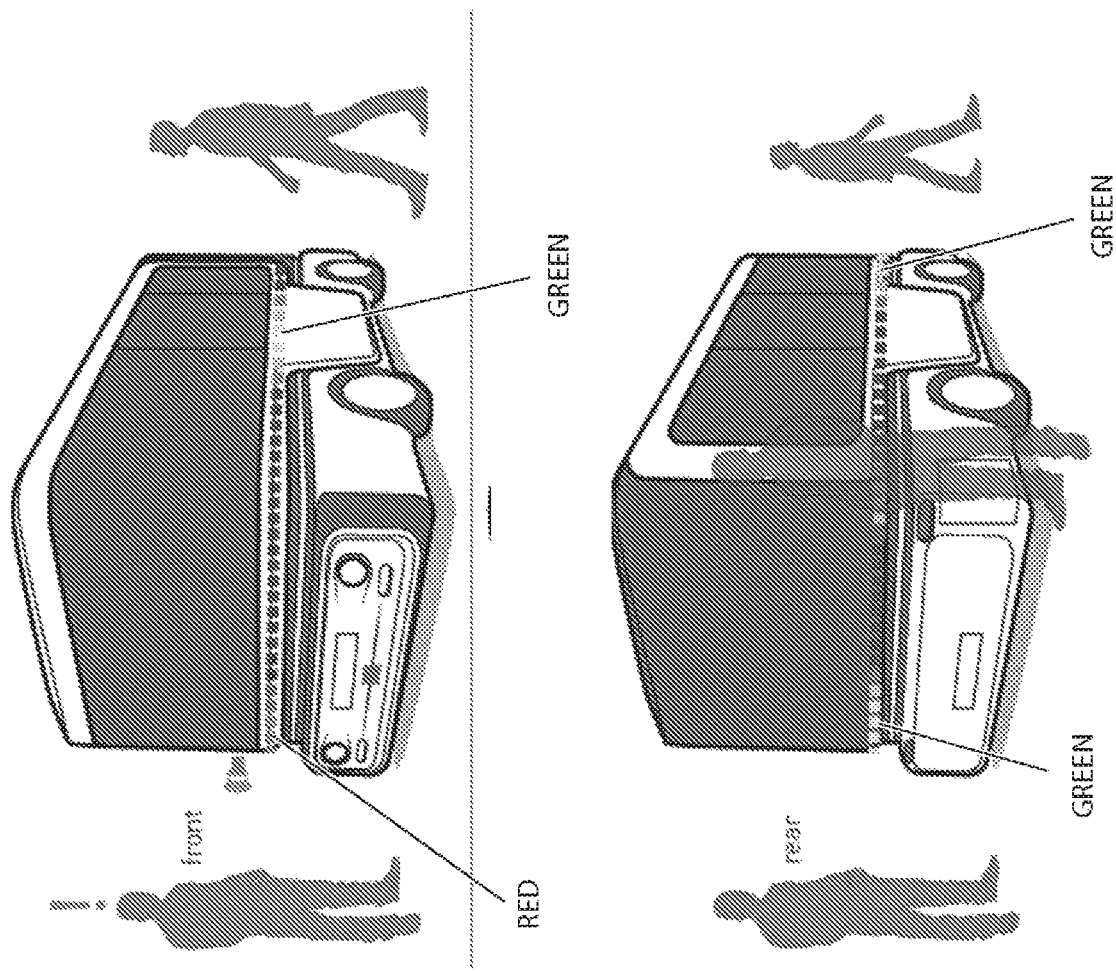
FIGS. 26A, 26B, 26C, 26D, 26E show an example alternative or additional external intention displays.

FIGS. 26A-62E show additional example outside displays the shuttle can use to signal its intention. Such external lighting, displays, and speakers inform outside motorists, pedestrians, and bicyclists of the shuttle's perceptions and intentions such as:

Pedestrian: "Does the shuttle see me? Is it going to let me use this crosswalk?"
Motorist: "Is the shuttle about to leave the stop sign, or is it waiting for me?"
Bicyclist: "Does the shuttle know I'm next to it? Is it about to turn right?"
Employee: "Is that my shuttle? Why didn't it pick me up?"
FIGS. 26A, 26B show an example LED light wrap showing perception and intent. In FIG. 26A, the left side (in the Figure) of the LED light wrap can display the color red and provide an audible warning (shown as a speaker icon) to signal "I see you and warn you to yield to me". The right side (in the Figure) of the LED light wrap can display the color green and indicate "I can see you and you are safe where you are". In each of these cases, the signals are provided based on the vehicle sensing a pedestrian external to the vehicle, sensing the position of the pedestrian relative to the vehicle, and in some embodiments, sensing the movement, body pose and/or gesture of the pedestrian(s).

FIG. 26B shows another example with the vehicle detecting pedestrians at the vehicle's rear. In this instance, the vehicle uses green light indications to signal "I can see you and you are safe where you are". The vehicle uses different portions of the LED wrap (i.e., the portions in nearest proximity to individual pedestrians outside the vehicle) to signal to different pedestrians.

Figure 26C:
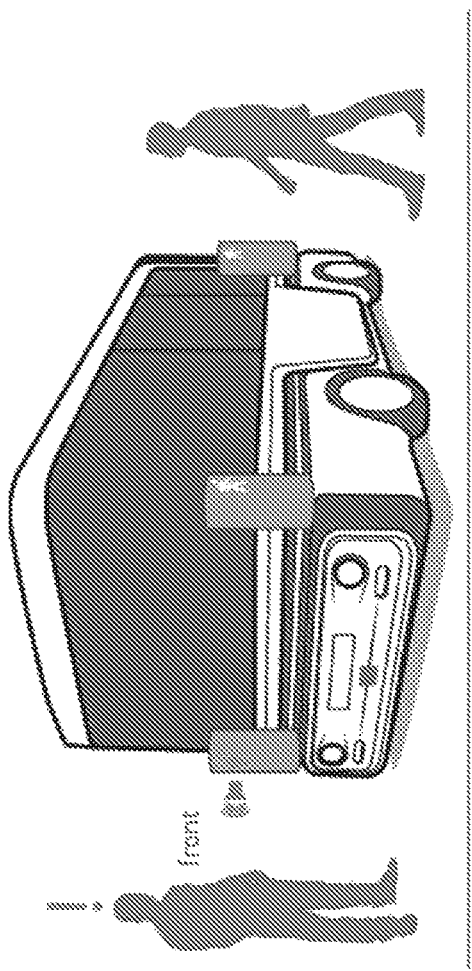
Figure 26D:
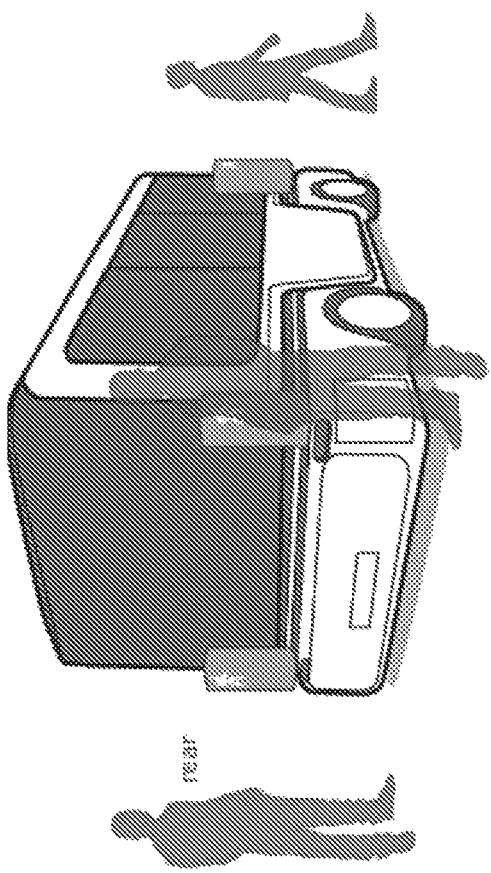

FIGS. 26C, 26D show different example non-limiting signaling arrangements using rounded displays at the vehicle's corners to signal intention and perception. In FIG. 26C, the information displayed at the left-hand display in the Figure can be red or orange, be accompanied by a voice announcement, and indicate "I see you, and warn you to yield to me." The information displayed on the right-hand side of the vehicle indicates to the pedestrian standing there: "I can see you and you are safe where you are". Similarly, the displays on the rear of the vehicle shown in FIG. 26D indicate to the pedestrians behind the vehicle "I can see you and you are safe where you are".

Figure 26E:
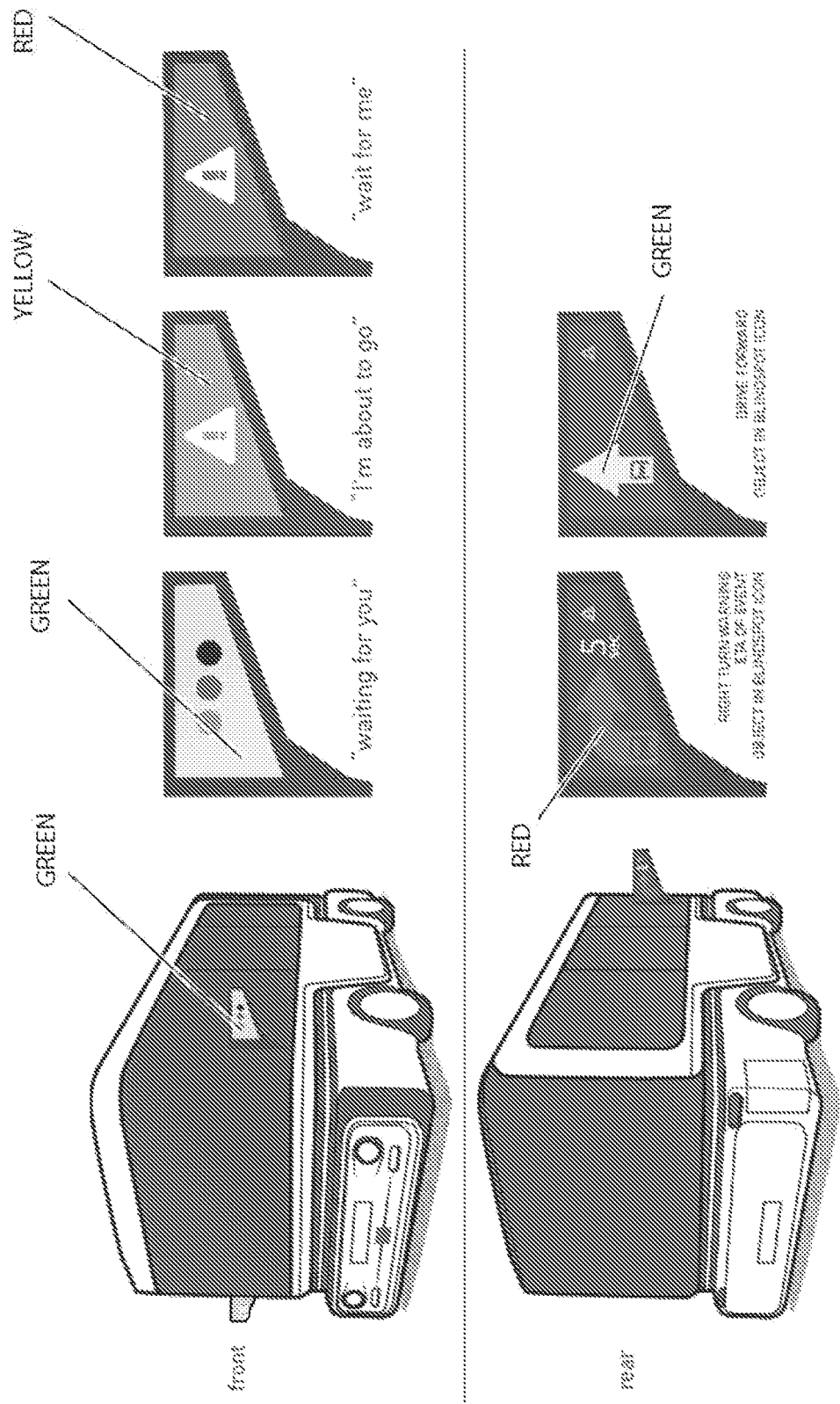

FIG. 26E shows yet another embodiment using side displays with different content facing forward versus rear. A forward-facing green ellipsis can indicate "I'm waiting for you", a forward facing yellow or orange exclamation point can indicate "I'm about to go", and a forward-facing red exclamation point can indicate "wait for me." A rear-facing red turn arrow with a text indication can signal a right turn warning with an estimated time the event will occur. A green forward arrow can indicate "drive forward." An exclamation point can indicate the presence of an object in a blind spot of the passengers and/or a safety driver.

In a preferred embodiment, the Shuttle's Object Perception (602), Wait Condition (604), Prediction Engine (608), and/or Behavior Planner (615) determine the presence of other vehicles at an intersection and determines the shuttle's turn.

Example Shuttle
1. Overview

Figure 27:
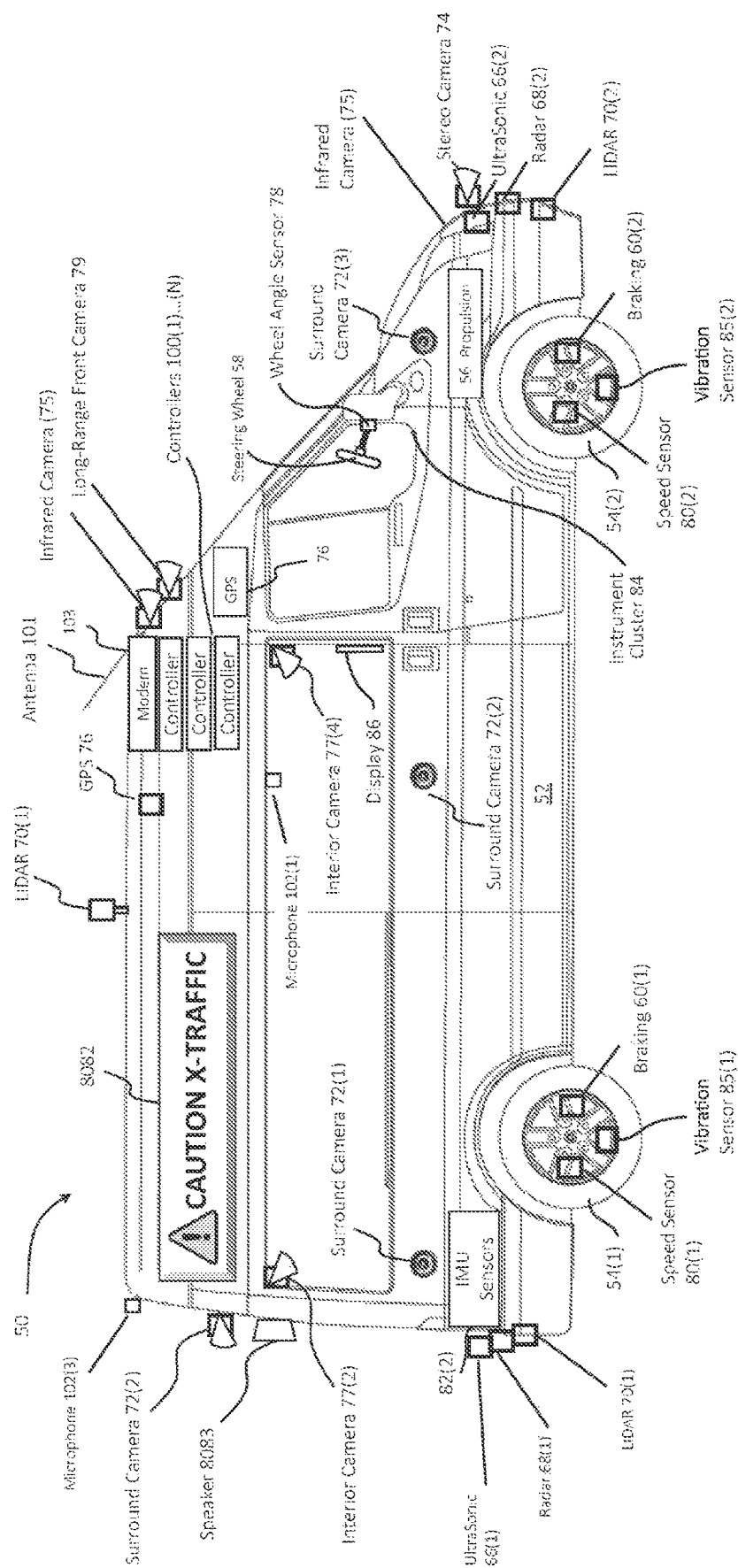
FIG. 27 shows an Example Self-Driving Shuttle.

FIG. 27 shows an example self-driving shuttle vehicle (50). Vehicle (50) in the example shown comprises a shuttle that can accommodate a human safety driver and a plurality of human passengers. In some embodiments, the vehicle (50) includes multi (e.g., 6-10) passenger capacity, fully autonomous capability, walk in doors, automated doors, and disability accessibility.

Vehicle (50) includes a vehicle body suspended on a chassis, in this example comprised of four wheels (54) and associated axles. The wheels 54 are in frictional contact with the surface of the earth, and when they turn, the vehicle goes. A propulsion system (56) such as an internal combustion engine, hybrid electric power plant, or all-electric engine is connected to drive wheels (54) via a drive train, which may include a transmission (not shown). A steering wheel (58) may be used to steer wheels (54) to direct the vehicle (50) along a desired path when the propulsion system (56) is operating and engaged to propel the vehicle. Steering wheel (58) or the like is optional depending on the context. Some designs may omit the windshield, although passengers may appreciate the ability to see forward even when the vehicle is completely autonomous. Alternatively, shuttle could include a joystick to control both lateral and longitudinal movements. One or more Controllers (100(1)-100(N)) provide autonomous self-driving capabilities in response to signals continuously provided in real time from an array of sensors, as described more fully below.

Each controller comprises one or more onboard supercomputers that can operate in real-time to process sensor signals and output autonomous operation commands to self-drive vehicle (50) and/or assist the human vehicle driver in driving. Each vehicle may have any number of distinct controllers for functional safety and additional features. For example, Controller (100(1)) may serve as a primary computer for autonomous driving functions, Controller (100(2)) may serve as a secondary computer for functional safety, Controller (100(3)) may provide artificial intelligence functionality based on in-camera sensors, and Controller (100(4)) may provide infotainment functionality and provide additional redundancy for emergency situations. In other embodiments, virtual machines hosted by the common high-performance processor(s) can provide isolation between functionality while reducing the number of controllers required.

Controller (100) sends command signals to operate vehicle brakes (60) via one or more braking actuators (61), operate steering mechanism via a steering actuator (62), and operate propulsion unit (56) which also receives an accelerator/throttle actuation signal (64). Actuation is performed by methods known to persons of ordinary skill in the art, with signals typically sent via the Controller Area Network ("CAN bus")—a network inside modern cars used to control brakes, acceleration, steering, windshield wipers, etc. The CAN bus can be configured to have dozens of nodes, each with its own unique identifier (CAN ID). The bus can be read to find steering wheel angle, ground speed, engine RPM, button positions, and other vehicle status indicators.

The functional safety level for a CAN bus interface is typically ASIL B. Other protocols may be used for communicating within a vehicle, including FlexRay and Ethernet. For one or more embodiments, an actuation controller, with dedicated hardware and software, may allow control of throttle, brake, steering, and shifting. The hardware provides a bridge between the vehicle's CAN bus and the controller (100), forwarding vehicle data to controller (100) including the turn signal, wheel speed, acceleration, pitch, roll, yaw, Global Positioning System ("GPS") data, tire pressure, fuel level, sonar, brake torque, and others.

Controller (100) provides autonomous driving outputs in response to an array of sensor inputs including, for example: one or more ultrasonic sensors (66), one or more RADAR sensors (68), one or more Light Detection and Ranging ("LIDAR") sensors (70), one or more surround cameras (72) (typically such cameras are located at various places on vehicle body to image areas all around the vehicle body), one or more stereo cameras (74) (in preferred embodiments, at least one such stereo camera faces forward to provide depth-perception for object detection and object recognition in the vehicle path), one or more infrared cameras (75), a GPS unit (76) that provides location coordinates, a steering sensor (78) that detects the steering angle, speed sensors (80) (one for each of the wheels (54)), an inertial sensor or inertial measurement unit ("IMU") (82) that monitors movement of vehicle body (52) (this sensor can be for example an accelerometer(s) and/or a gyrosensor(s) and/or a magnetic compass(es)), tire vibration sensors (85), and microphones (102) placed around and inside the vehicle. Other sensors such as microphones, proximity sensors, motion sensors, ultrasonics, gesture sensors, etc. may be used, as is known to persons of ordinary skill in the art.

Controller (100) also receives inputs from an instrument cluster (84) and can provide human-perceptible outputs to a human operator via human-machine interface ("HMI") display(s) (86), an audible annunciator, a loudspeaker and/or other means. In addition to traditional information such as velocity, time, and other well-known information, HMI display may provide the vehicle occupants with information regarding maps and the vehicle's location, the location of other vehicles (including occupancy grid) and even the Controller's identification of objects and status. For example, HMI display (86) may alert the passenger when the controller has identified the presence of a stop sign, caution sign, or changing traffic light and is taking appropriate action, giving the vehicle occupants peace of mind that the controller is functioning as intended.

Instrument cluster (84) may include a separate controller/supercomputer, configured to perform deep learning and artificial intelligence functionality, including the Advanced System-on-a-Chip described below.

Vehicle (50) collects data that is preferably used to help train and refine the neural networks used for self-driving. The vehicle includes modem (103), preferably a system-on-a-chip that provides modulation and demodulation functionality and allows the controller (100) to communicate over the wireless network (1100). Modem (103) may include an RF front-end for up-conversion from baseband to RF, and down-conversion from RF to baseband, as is known in the art. Frequency conversion may be achieved either through known direct-conversion processes (direct from baseband to RF and vice-versa) or through super-heterodyne processes, as is known in the art. Alternatively, such RF front-end functionality may be provided by a separate chip. Modem (103) preferably includes wireless functionality such as LTE, WCDMA, UMTS, GSM, CDMA2000, or other known and widely-used wireless protocols.

2. Cameras

Self-driving shuttle (50) as illustrated in FIG. 27 includes a plurality of cameras (72, 73, 74, 75, 76), capturing images around the entire periphery of the vehicle. Camera type and lens selection depends on the nature and type of function. The vehicle preferably has a mix of camera types and lenses to provide complete coverage around the vehicle; in general, narrow lenses do not have a wide field of view but can see farther. In a preferred embodiment, the vehicle includes 12 cameras, although a greater or lesser number may be used. All camera locations on the vehicle preferably support a low-voltage, differential, serial interface and Gigabit Ethernet. In addition, camera data may be shared between multiple controllers in self-driving shuttle, as described in application Ser. No. 16/273,707, filed Feb. 12, 2019.

FIG. 28 illustrates one example of camera types and locations, with 11 cameras (501)-(508). Front-facing cameras (501)-(505) help identify forward facing paths and obstacles and provide information critical to making an occupancy grid and determining the preferred vehicle paths. Front-facing cameras may be used to perform many of the same functions as LIDAR, including emergency braking, pedestrian detection, and collision avoidance. Front-facing cameras may also be used for ADAS functions and systems including Lane Departure Warnings ("LDW"), and Autonomous Cruise Control ("ACC"), and other functions such as traffic sign recognition.

A variety of cameras may be used in a front-facing configuration, including, for example, a monocular camera platform that includes a CMOS (complementary metal oxide semiconductor) color imager and CAN, FlexRay and Ethernet interfaces.

Front-facing wide-view cameras (503)-(504) may be used to perceive objects coming into view from the periphery (e.g., pedestrians, crossing traffic or bicycles). In the embodiment shown in FIG. 28, front-facing wide-view cameras (503)-(504) are multi-megapixel Cameras with a field of view. Other wide-view cameras and lenses may be used, as is known by persons of ordinary skill in the art.

In preferred embodiments, a long-view stereo camera pair (501) can be used for depth-based object detection, especially for objects for which a neural network has not yet been trained. Long-view stereo cameras (501) may also be used for object detection and classification, as well as basic object tracking. In the embodiment shown in FIG. 28, front-facing long-view cameras (501) has a 30-degree field of view. Stereo cameras for automotive applications are commercially available and may be obtained from any number of vendors.

Side or blind spot cameras (506) may be used for Surround View, providing information used to create and update the Occupancy Grid; as well as side impact collision warnings. In the embodiment shown in FIG. 28, blind spot cameras (506) are 2.3 MP Cameras with a 120-degree field of view. In other embodiments, wide/fisheye view cameras are used, positioned on the vehicle's front, rear, and sides. Alternatively, as illustrated in FIG. 27, the shuttle may use three physical surround-only cameras (72) (Surround Left, Right, Rear) and leverage the physical Front Wide camera (73) as a logical fourth surround view camera. In other configurations, wing-mirror assemblies, when used, are typically custom 3-D printed so that the camera mounting plate matches the shape of the wing mirror (71). An example, non-limiting design integrates a camera into a traditional mirror and provides a larger field of view. Side cameras may also be placed in the four pillars at each corner of the cabin.

Rear cameras (507)-(508) may be used for park assistance, surround view, rear collision warnings, and creating and updating the Occupancy Grid. In the embodiment shown in FIG. 28, one rear camera (507) is a multi-megapixel camera with a 120-degree field of view for shorter range detection, and another rear camera (508) is another multi-megapixel camera with a 60-degree field of view for longer range detection. A wide variety of other cameras may be used, including, for example, cameras that are also suitable as a front-facing camera. Rear camera may also be a stereo camera (74) of the type discussed above.

Additional cameras can be provided within the passenger compartment to detect safety and other information there.

The camera types provided herein are examples provided without limitation. Al most any type of digital camera may be adapted for use with the example vehicle. Preferably, the color filter pattern is RCCB, and Clear Pixel cameras are used to increase sensitivity. The vehicle can also include cameras installed to perform known ADAS functions as part of a redundant or fail-safe design. For example, a Multi-Function Mono Camera may be installed to provide functions including lane departure warning, traffic sign assist, and intelligent headlamp control.

Additionally, the autonomous vehicle (50) may include a camera module which can have multiple sensors installed and allow for interchangeable sensors as well. This module can be used in various configurations: (1) IR+IR (IR stereo vision), (2) IR+RGB (Stereo vision and pairing frames), (3) RGB+RGB (RGB stereo vision).

In a preferred embodiment, all cameras record and provide video information simultaneously. All cameras are preferably mounted in custom designed (3-D printed) assemblies to cut out not only stray light but also reflections from within the car, which may interfere with the camera's data capture (since reflections from the dashboard reflected in the windshield mirrors is a major concern). Typical camera functional safety levels are ASIL B. Streaming information from the cameras is in some embodiments processed using one or more computer vision hardware accelerators.

3. LIDAR

As illustrated in FIG. 27, the shuttle (50) preferably includes one or more LIDAR sensors (70), which are often used for object and pedestrian detection, emergency braking, and collision avoidance. Generally speaking, LIDAR sensors measure distances (ranges) by measuring the Time of Flight ("ToF") that it takes a short laser pulse to travel from the sensor to an object and be reflected back by the object, calculating the distance from the known speed of light in the particular environment (e.g., taking air humidity into account). LIDAR detects smaller and larger objects and is effective at detecting distance under relatively clear atmospheric conditions. However, LIDAR sometimes does not work well in adverse weather conditions and is not particularly effective at detecting non-reflective or highly light-absorbing objects, such as muddy or dusty objects. Thus, unlike RADAR, LIDAR sensors typically must have a clear unobstructed line of sight—the sensors usually cannot be obscured by dirt, dust, or other obstruction. However, LIDAR typically offers much more precision (e.g., 15 cms) in a much narrower azimuth/elevation direction while also typically requiring more time to process and map (for example, a tree being ranged by LIDAR can provide multiple reflections, and the LIDAR sensor may need to direct laser energy at the tree multiple times to map the entire tree).

LIDAR is thus well suited for lower speed vehicles such as shuttles operating in parking lots and on campuses. Because LIDAR performance can be degraded by precipitation, example embodiments also use other sensors that are not so subject to such degradation.

Figure 29:
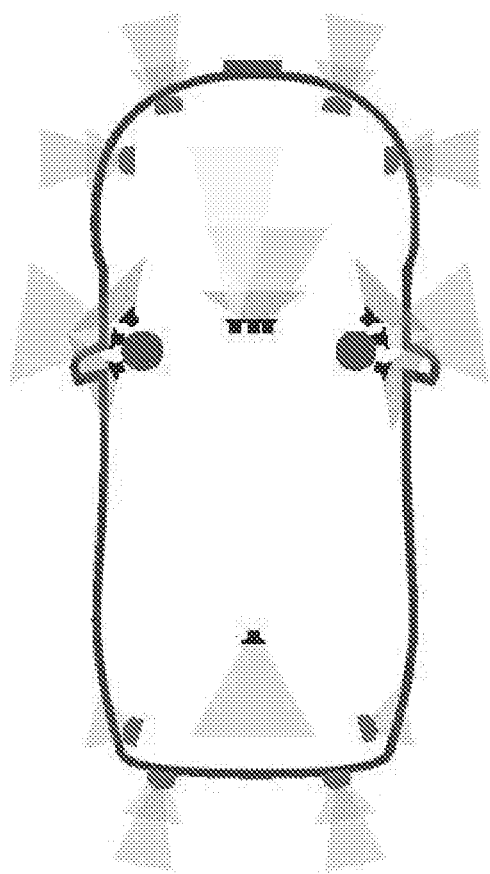
FIG. 29 shows an example combined perception model.

In the preferred embodiment illustrated in FIG. 29, self-driving shuttle (50) has multiple—in this non-limiting example, three—LIDAR sensors (511). The LIDAR sensors are preferably pre-wired for Ethernet, providing data to a Gigabit Ethernet switch, although a greater or lesser number of LIDAR sensors may be used.

Many different types of LIDAR technologies may be used. In one embodiment, the LIDAR is used to provide a list of objects and their distances for a 360-degree field of view. In an alternative embodiment, a LIDAR sensor may be used to provide 360 degrees horizontal field of view.

In yet another embodiment, non-protruding LIDAR sensors may be used. The LIDAR sensor may be implemented as a small device that is embedded into the front, sides, and corners of vehicles, with an automotive integrity safety level rating of ASIL B. In general, front-mounted LIDAR is preferably configured for a horizontal field of view between 45 and 135 degrees.

In another embodiment, newer LIDAR technologies, such as 3D Flash LIDAR, may also be used. 3D Flash LIDAR uses a flash of a laser as a transmission source, to illuminate vehicle surroundings with a range of approximately 200 m. A Flash LIDAR unit includes a receptor, which records the laser pulse transit time and the reflected light on each pixel, which in turn corresponds to the range from the vehicle to the objects. Flash LIDAR allows highly accurate and distortion-free images of the surroundings to be generated with every laser flash. In a preferred embodiment, four Flash LIDARs are deployed, one at each side of the autonomous vehicle. Available 3D Flash LIDAR systems include a solid-state 3D staring array LIDAR camera with no moving parts other than a fan—in other words, it is not a scanning Lidar device. Such a flash LIDAR uses a 5 nanosecond Class I (eye-safe) laser pulse per frame and captures the reflected laser light in the form of 3D range point clouds and co-registered intensity data. Because Flash LIDAR is a solid-state device, with no moving parts, it is less susceptible to motion blur, vibration, and shock. LIDAR functional safety levels are typically ASIL B.

4. RADAR

As illustrated in FIG. 27, the shuttle (50) preferably includes one or more RADAR sensors (68). RADAR (which works based on radio waves) is well-suited to long-range vehicle detection, while nearby car detection can be solved with sonar. In general, RADAR detects distance accurately, so it works under darkness and severe weather conditions. However, RADAR is sometimes subject to false positives, including manhole covers, large cans, drainage grates, and other metallic objects. In addition, RADAR does not in some instances provide any meaningful information regarding orientation and is sometimes inaccurate in lateral positions—a problem for curved highways and sharp turns.

In the preferred embodiment illustrated in FIG. 29, self-driving shuttle (50) has eight RADAR units: (509), (510), and (512).

A wide variety of RADAR sensors may be used. In the embodiment illustrated in FIG. 29, front (509) and rear (512) radar units are Long Range Radar units, and the side radar units (510) are Mid-Range Radar units.

The RADAR sensors preferably use CAN for control and to access the object tracking data, with optional Ethernet to access the raw data. The car (50) preferably also has side RADAR sensors and data from the RADAR sensors are provided via the CAN bus.

A number of other RADAR units may be used in other embodiments. Suitable sensors include, without limitation RADAR units that may be used for both front and rear RADAR coverage. The RADAR unit can be, in one or more embodiments, a Pulse Doppler RADAR operating at 76 GHz, with two configurations: a long-range of 175 meters and 20-degree horizontal field of view, and short range of 60 meters and 90-degree horizontal field of view, with accuracy of 0.5 meters.

In other embodiments, another RADAR unit is used to provide shorter range side coverage, and to provide object tracking and lane assignment functions.

Long-Range RADAR is often used for ACC functionality; short and medium-range RADAR is often used for cross-traffic alerts (for front-facing RADAR), blind spot detection, and rear collision warnings. Suitable long-range RADAR systems provide a broad field of view realized by two independent scans, with approximately 250 m range. Such embodiments preferably distinguish between static and moving objects and can be used in conventional ADAS for Emergency Brake Assist or Forward Collision Warning.

Other suitable long-range RADAR systems include, without limitation, a monostatic multimodal RADAR that has six fixed RADAR antennae and a high-speed CAN and FlexRay interface. The central four antennae create a focused beam pattern, designed to record the vehicle's surroundings at higher speeds, with minimal interference from traffic in adjacent lanes. The outer two antennae expand the field of view, making it possible to quickly detect vehicles entering or leaving the vehicle's lane.

Mid-range RADAR systems may use, without limitation, the 76-77 GHz frequency band, and have a range of up to 160 m (MRR) or 80 m (MRR rear) and a field of view of up to 42 degrees (MRR) or 150 degrees (MRR rear).

Suitable short-range RADAR systems include, without limitation, a 24 GHz RADAR sensor designed to be installed at both ends of the rear bumper. When installed at both ends of the rear bumper, the RADAR unit creates two beams that constantly monitor the blind spot in the rear and next to the vehicle. The RADAR unit can be used in a conventional ADAS system for Blind Spot Detection or Lane Change Assist. Typical RADAR functional safety levels are ASIL B.

5. Ultrasonic Sensors

As illustrated in FIG. 27, the shuttle (50) may include one or more ultrasonic sensors (66). Ultrasonic sensors, positioned at the front, back, and/or the sides, are most often used for park assist and to create and update an occupancy grid. However, the utility of sonar is both compromised at high speeds and, even at slow speeds, is limited to a relatively short working distance (e.g., about 2 meters). A wide variety of ultrasonic sensors may be used. A typical configuration would include four ultrasonic sensors in the front bumper, four ultrasonic sensors in the rear bumper, and two sensors mounted on each side of the shuttle. Suitable ultrasonic sensors include, without limitation, ultrasonic sensors designed for a 2.5-meter range and/or other ultrasonic sensors designed for a 4-meter range. In preferred embodiments, the sensors can stimulate an external transceiver and provide the reflected signal via 1-wire I/O interface to the ECU. Typical ultrasonic sensor functional safety levels are ASIL B.

6. Infrared (Thermal) Sensors

In certain embodiments, as illustrated in FIG. 27, the shuttle (50) may include one or more infrared or thermal cameras (75) to enhance the vehicle's ability to detect, classify and identify objects, especially in the dark, and through fog or precipitation. The shuttle can include an active infrared system, a passive infrared system or both. An active system uses an infrared light source to illuminate the area surrounding the vehicle with infrared light, using either a gated or non-gated approach. A gated active system uses a pulsed infrared light source and a synchronized infrared camera. Because an active system uses an infrared light source, it does not perform as well in detecting living objects such as pedestrians, bicyclists, and animals.

Passive infrared systems detect thermal radiation emitted by objects, using for example a thermographic camera. Passive infrared systems perform well at detecting living objects, but sometimes do not perform as well in especially warm weather. Passive systems generally provide images at less resolution than active infrared systems. Because infrared systems detect heat, they particularly enhance the vehicle's ability to detect people and animals, making the vehicle more reliable and enhancing safety.

A wide variety of infrared sensors may be used. Suitable infrared systems include, without limitation, a compact thermal imaging camera that creates a 320×240-pixel image with a 36-degree field of view, and an effective range of 300 m for people, and approximately twice that for larger, heat-emitting objects such as automobiles. For applications that require additional variations, including a zoom capability, infrared systems with longwave infrared ("LWIR") thermal camera cores may be used. Typical infrared camera functional safety levels are ASIL B. Additionally, such infrared sensors (and/or any of the sensors discussed above) can also be provided within the passenger compartment of the vehicle and used to monitor the presence, movement, body poses, gestures and other aspects of passengers on board the vehicle.

7. GPS

As illustrated in FIG. 27, the shuttle (50) preferably includes GPS sensors (76), including GPS and/or assisted GPS ("aGPS"), to assist in mapping, perception, Occupancy Grid, and path planning functions. Any number of different GPS sensors and connectors may be used, including without limitation, a GPS using a USB connector with an Ethernet to Serial Bridge. Other geolocation sensors (e.g., based on beacons, road mark recognition/tracking, radio signal detection/triangulation, etc.) may be employed instead or in addition to allow the vehicle to detect its position.

8. Inertial Measurement Units ("IMU")

As illustrated in FIG. 27, the shuttle (50) preferably includes inertial measurement unit sensors (IMU) (82) such as accelerometers, gyroscopes, as well as magnetometers. At least one IMU (82) is preferably located at the center of the vehicle's (50) rear axle. Other IMU sensors may be located in additional parts of the vehicle.

A variety of different IMU sensors may be used, without limiting the technological approach herein. Alternatively, rather than or in addition to using magnetometers, the IMU (82) may be a miniature, high performance GPS-Aided Inertial Navigation System (GPS/INS) that combines MEMS inertial sensors, a high-sensitivity GPS receiver, and advanced Kalman filtering algorithms to provide optimal estimates of position, velocity, and attitude, and which is capable of estimating heading without requiring input from a magnetic sensor by directly observing and correlating the changes in velocity from the GPS to the inertial sensors. Alternatively, IMU (82) and GPS (76) may be combined in a single integrated unit.

9. Wireless Connectivity and Network Access

As illustrated in FIG. 27, the shuttle (50) preferably includes wireless modem (103) and antenna (101) for wireless connectivity to the network, enabling communication with AI Dispatch (5000), outside networks, and even other vehicles. The data collected by each vehicle may be transferred via a cellular phone or other terrestrial network—such as LTE, where available, WCDMA, UMTS, CDMA2000, HSPA+, GSM or a satellite radio network—to a cloud-based infrastructure that includes deep-learning supercomputers. Alternatively, data may be transferred to the cloud via wireless hotspots with WiFi (802.11), including in parking lots, service stations, other vehicles and/or stop lights. For smaller packets, paging network infrastructure may also be used. Data provided by the vehicle (50) to the network may include, without limitation, camera images, LIDAR data, ultrasonic sensor data, and RADAR data.

10. Additional Sensors and Systems

In addition to the sensors described above, the autonomous vehicles may include other sensors, ADAS systems, and warning systems. Such systems include, without limitation, the Sumitomo Deflation Warning Systems, which automatically detect when the pressure decreases in a vehicle's tires. The Deflation Warning System uses simple sensors to measure the angular velocity of a tire (80), which increase as the tire deflates and gets smaller. The Deflation Warning System also measures the tire's vibration frequencies (85), which change as a tire's pressure decreases.

The vehicle (50) may incorporate other available systems for slippery road detection that use differences in drive shaft speed (80) and tire vibrations (85) to determine the presence of slippery roads. Available systems include slippery road detection systems that estimate the difference in the speeds of the drive shaft and freely rotating axles in various driving situations, which enables the level of friction to be deduced to identify icy or slippery roads. Similarly, other available solutions may compare data collected on a non-slippery road such as on a dry asphalt road with data collected on a slippery road. The sensors compare the rotation speed and vibration frequency with those measured for a dry asphalt road and identifies icy or slippery roads.

Software products may be used, that continuously monitor the road friction in real-time using signals from existing automotive grade sensors, such as the wheel speed, to determine the road friction and roughness, detect speed bumps, and make a damage assessment of a possible pothole impact. Other suitable and/or supplementary systems include a Tire Pressure Indicator ("TPI"), and indirect tire-pressure monitoring system ("TPMS") capable of detecting underinflation using both relative rolling radius information as well as wheel oscillation measurement. TPI and TPMS systems estimate tire pressure mainly from the signals of the wheel speed sensors that are part of the anti-lock braking system ("ABS") (60) and electronic stability control system ("ESC"). TPI uses signals already available in the vehicle and detects if one or more tires are under-deflated. The computations are based on vehicle models and numerous advanced signal processing and sensor fusion algorithms. A Loose Wheel Indicator ("LWI") detects when the wheel bolts/nuts have come loose on a wheel position, using information from the ABS and ESC systems and the Tire Grip Indicator ("TGI") constantly estimates the available friction between the road and the tires.

The technology herein may also be used with other safety systems, including systems for detecting slippery road conditions, such as a sensor (not shown) that measures the road reflectivity at a few infrared laser wavelengths, which are absorbed differently in ice and water.

These examples are only a few of the possible sensors and systems that may be used to achieve full Level 3-5 performance at ASIL D safety levels. An autonomous driving system must be able to process massive amounts of data from cameras, RADAR, LIDAR, ultrasonic, infrared, GPS, IMUs, and/or HD-Maps in real-time, and generate commands to control the car safely, reliably, and comfortably. An autonomous driving system must ensure that the vehicle reacts correctly in a fraction of a second to changing circumstances. This challenging task requires a new supercomputer platform that provides for advanced AI functionality, multiple neural networks, and advanced CPU, GPU, and hardware accelerator functionality.

System Architecture and Hardware for Autonomous Vehicles

1. AI Supercomputer Platform

As self-driving functionality requires a supercomputer able to perform numerous distinct functions rapidly, accurately, safely, and efficiently, no single processor can provide Level 3-5 autonomous vehicle functionality. Rather, an Advanced Platform and SoC preferably has multiple types of processors, providing the "right tool for the job" as well as processing diversity for functional safety. For example, GPUs are well-suited to higher precision tasks. Hardware accelerators, on the other hand, can be optimized to perform a more specific set of functions. Such hardware accelerators can include for example computer vision accelerators, deep learning accelerators, and real time ray tracing (RTX) accelerators. By providing a blend of multiple processors, an Advanced Platform and SoC includes a complete set of tools able to perform the complex functions associated with Level 3-5 autonomous vehicles quickly, reliably, and efficiently.

Figure 30:
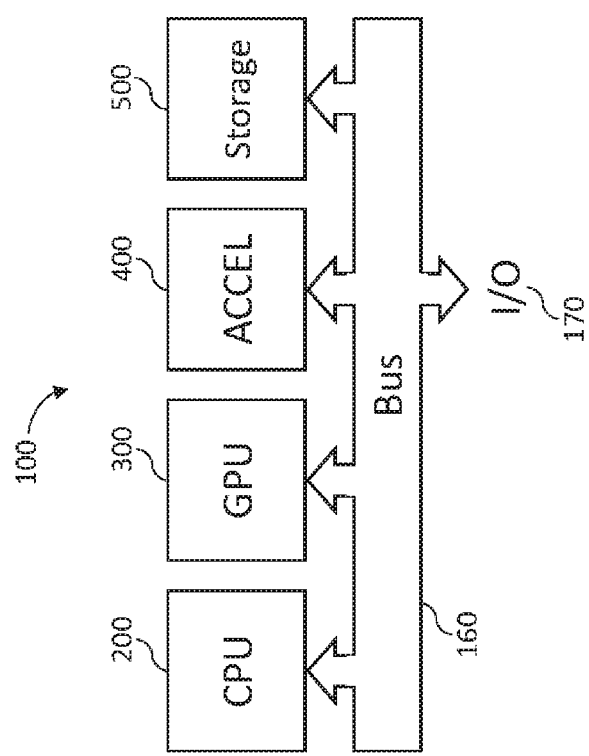
FIG. 30 shows an example Platform.

FIG. 30 is an exemplary high-level diagram of an Advanced Platform (100) that provides the computing processing capabilities necessary for autonomous and semi-autonomous systems.

Platform (100) can be implemented using separate discrete components for one or more of the components (200-500) shown in FIG. 30. Preferably, platform (100) is implemented with the components (200-500) being implemented on a single die, in a small, powerful, efficient SoC. Platform (100) and SoC an also include other components not shown in FIG. 30, as discussed more fully below.

At a high-level, CPU (200) can be one or more general purpose central processing units (CPUs), each comprising one or more CPU cores. GPU (300) can be one or more graphics processing units (GPUs), each comprising thousands of GPU cores. Each GPU can be used for any advanced processing task, especially complex tasks that benefit from massively parallel processing. Each GPU typically exhibits better performance per watt for such computer graphics and parallel processing than each CPU.

Platform (100) includes an Acceleration Cluster (400) can consist of a variety of different hardware accelerators, each optimized for a different function or category of functions.

Acceleration Cluster (400) may include a module for performing computer vision algorithms, for lane detection as well as redundant object detection at moderate distances. The module can include one or more embedded programmable vision accelerators ("PVAs"), which can be optimized for perception tasks from sensor data (e.g., data from cameras, RADAR, LIDAR) received from one or more sensors (e.g., cameras, RADAR, LIDAR) via I/O (170). Each PVA typically exhibits better performance per watt for such perception data processing than each CPU or GPU. Acceleration Cluster (400) may also include one or more deep learning accelerators ("DLAs"). Each DLA may be designed to run a specific neural network with better performance per watt performance than the same network would have if executed on a general-purpose CPU, GPU, or FPGA. For example, one or more DLA can be designed specifically to process a convolutional neural network ("CNN" or "RCNN") to detect features in perception data (e.g., data from cameras, RADAR, LIDAR) received from one or more sensors (e.g., cameras, RADAR, LIDAR) via I/O (170). For example, such DLAs can accelerate one or more neural networks that may be trained to identify pedestrians, one or more automobiles, bicyclists, motorcyclists, the pose of an obstacle, one or more physical dimensions of an obstacle, and/or a bounding box representing the obstacle.

Platform (100) further includes Storage (500), which may be comprised of one or more storage elements including RAM, SRAM, DRAM, VRAM, Flash, hard disks, and other components and devices that can store at least one bit of data. Storage (500) preferably includes on-chip storage and may comprise L2 or L3 caches for use with the CPU (200) and/or the GPU (300).

Input/Output (170) can be one or more input/output (I/O) interfaces (and/or components that implement such interfaces) for communicating data (e.g., commands, responses, info) to one or more input and/or output devices including displays, sensors, keyboard, and user interface devices.

Bus (160) can be one or more links that allow components (200-500) to exchange data (e.g., commands, responses, info) with each other as well as with input and/or output devices via I/O (170). Bus (160) can comprise one or more bus standards, switches, and networks, including but not limited to Ethernet, CAN, 12C buses, or PC Express buses.

2. Advanced System-On-A-Chip

In a preferred embodiment, Platform (100) comprises an Advanced SoC. The Advanced SoC is preferably purpose built for self-driving cars; not a mobile chip or a desktop repurposed for automotive. Rather, the SoC is an AI supercomputer, designed for use in self-driving cars with specific features optimized for L3-5 functionality. The SoC preferably is designed to be meet critical automotive standards, such as the ISO 26262 functional safety specification. In a preferred embodiment, the Advanced SoC has at least an ASIL C functional safety level.

Figure 31:
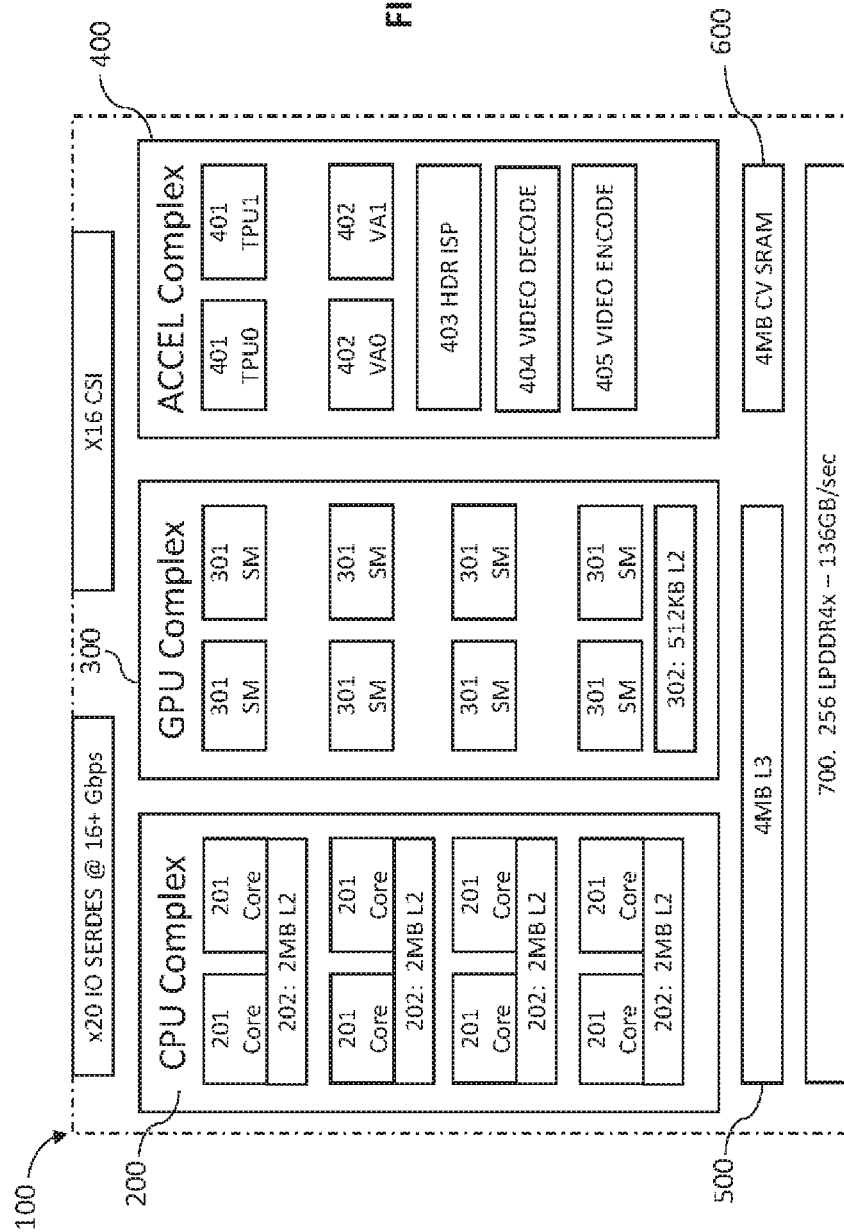
FIG. 31 shows Exemplary Advanced SoC for L3-L5 Architecture, with DLA Accelerators.
Figure 32:
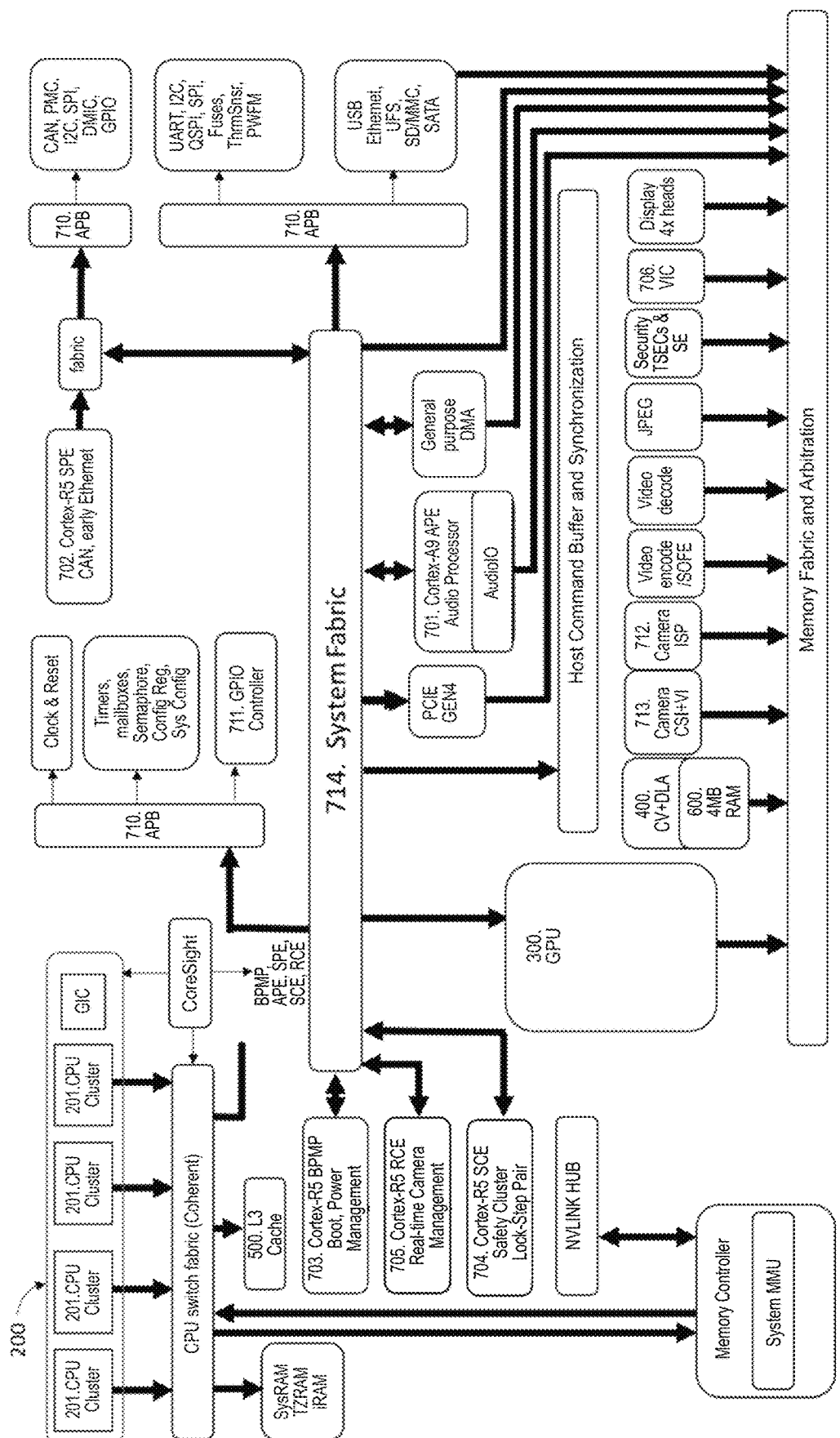
FIG. 32 shows Exemplary Advanced SoC for L3-L5 Architecture, with DLA Accelerators.

FIG. 31 and FIG. 32 below, are a high-level diagram of an Advanced SoC (100) for preferred embodiments.

The AI supercomputer (100) can run networks specifically intended to recognize certain objects and features, including, without limitation, (1) LaneNet (for detecting lanes), (2) PoleNet (for detecting traffic poles), (3) WaitNet (for detecting wait conditions and intersections), (4) SignNet (for detecting traffic signs), (5) LightNet (for detecting traffic lights), (6) DriveNet (for detecting cars, pedestrians, cyclists and potentially other objects). One embodiment of DriveNet is described, for example, in U.S. Provisional Application No. 62/631,781, filed Feb. 18, 2018, and/or in co-pending U.S. patent application Ser. No. 16/277,895, filed Feb. 15, 2019, both incorporated by reference.

Figure 33:
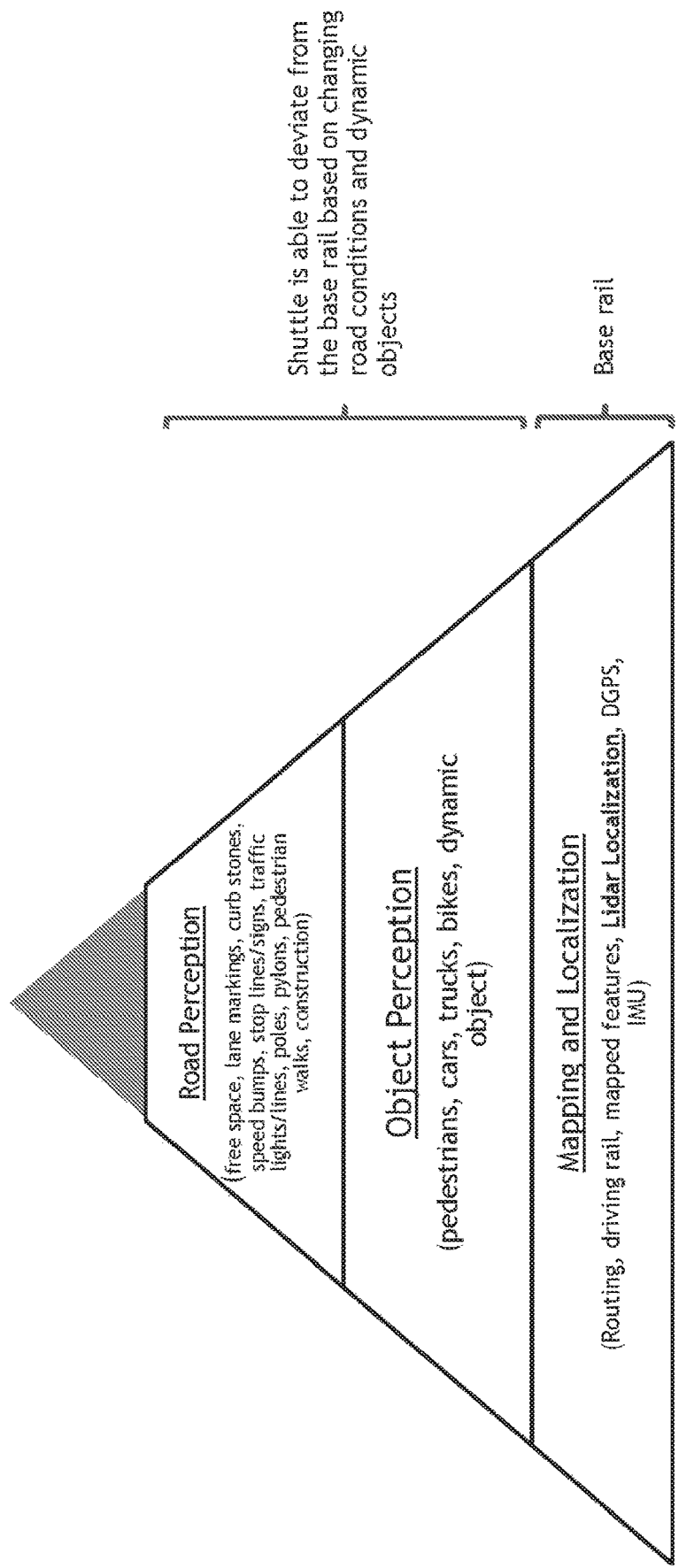
FIG. 33 shows Exemplary Software Stack for Embodiment with Driving Rail.

FIG. 33 illustrates an exemplary software stack for a simplified embodiment that includes the driving rail. In this embodiment, the base rail functionality of mapping and location are performed by the lower layer in the stack, which provides for Mapping and Localization, including routing, driving rail, mapped features, LIDAR Localization, DGPS, and IMU. Functionality. According to the embodiment shown in FIG. 33, the shuttle is able to deviate from the base rail based on changing road conditions and dynamic objects.

For example, software running on AI supercomputer (100) detects obstacles such as pedestrians, cars, trucks, bikes, or other dynamic objects, the shuttle (50) may deviate from the rail. Likewise, Road Perception software detects available free space, lane markings, curb stones, speed bumps, stop lines/signs, traffic lights/lines, poles, pylons, pedestrian walks, construction, any of which may justify a departure from the rail. Curbs are a special challenge. If the vehicle remains on the virtual rail, it is unlikely to strike a curb. On the other hand, when the vehicle needs to deviate from the virtual rail to avoid a dynamic object, this is when it may be more likely to strike a curb. Even at low speed, going over a curb is undesirable for passenger comfort and may also eventually lead to tire damage. Some example embodiments include sensors specifically mounted and structured to detect curbs to minimize such situations. Such a curb detector can for example use artificial intelligence to detect the structural profile of curbs (which are not all necessarily the same) and/or detect the changes in vehicle inertia and orientation when the vehicle's tires encounter a curb.

Figure 34:
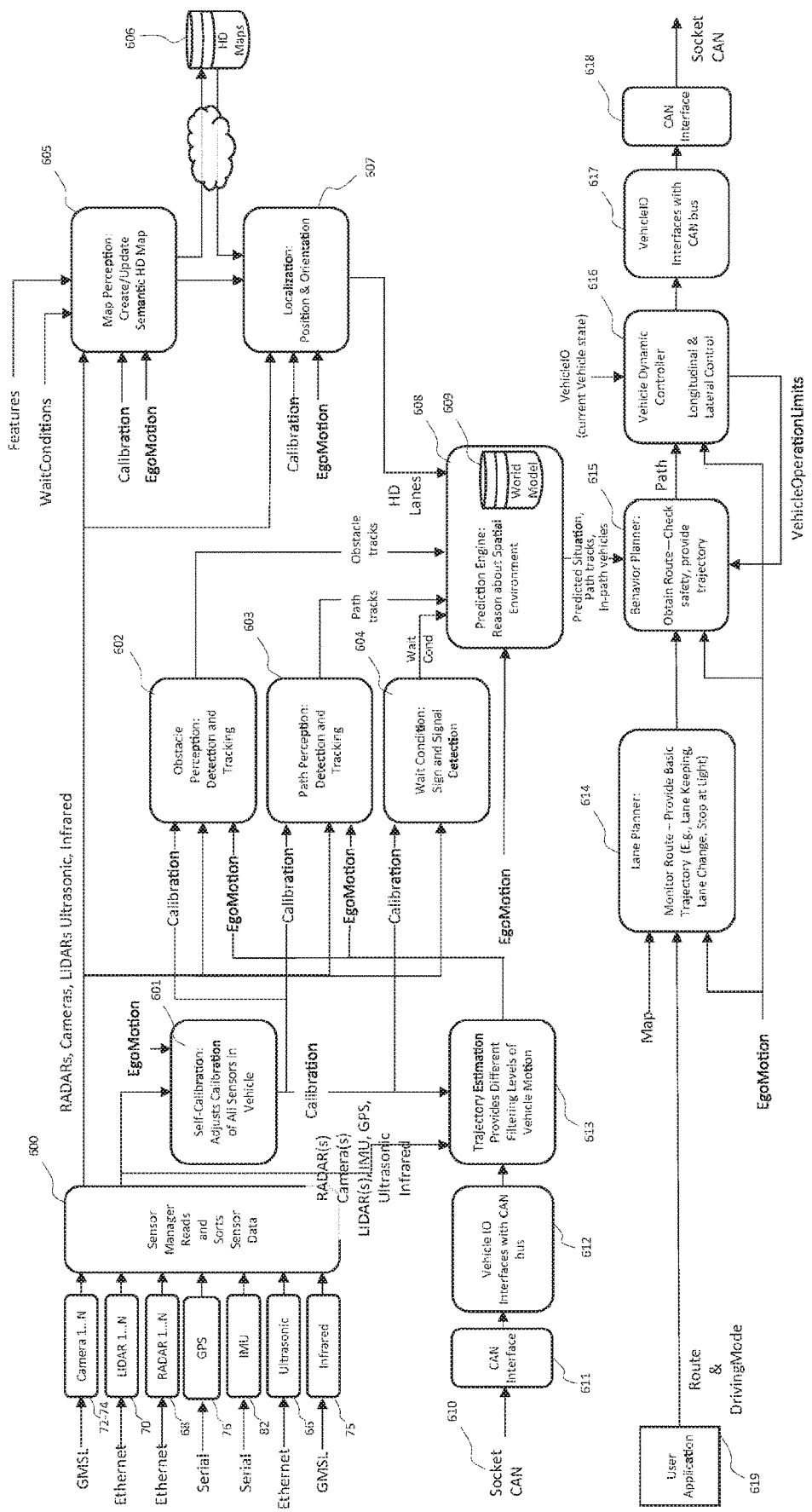
FIG. 34 shows Exemplary System Architecture.
Figure 35:
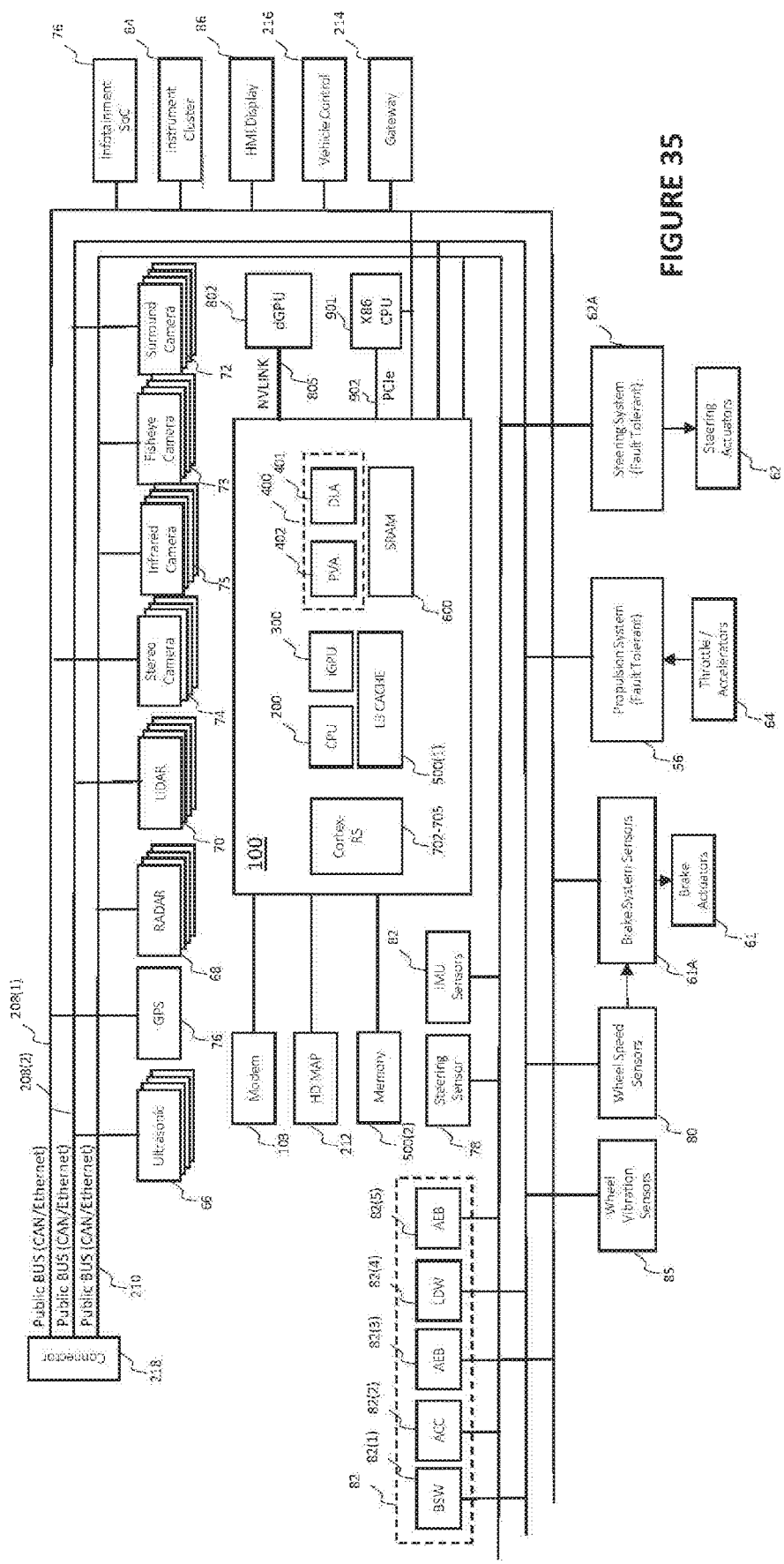
FIG. 35 shows example Advanced SoC Controlling an Autonomous Vehicle.

FIG. 34 below shows an exemplary system architecture suitable for practicing embodiments. Various sensors such as cameras 72, LIDARs 70, RADARs 68, GPS 76, IMUs 82, ultrasonics 66 and infrared 75 are processed by a sensor management block 600. Self-calibration 601 adjusts calibration of all sensors within the vehicle. Obstacle Perception (602) running in the AI supercomputer (100) can run networks specifically intended to recognize certain objects, obstacles, and features, including, without limitation, networks for detecting lanes, traffic poles, wait conditions and intersections, traffic signs, traffic lights, and others. Path perception 603 provides detection and tracking. In some embodiments, trajectory estimation receives such inputs as well as other vehicle sensor inputs via the CAN bus 611, 612, and provides different filtering levels of vehicle motion (block 613) to assess vehicle speed, inertia, etc. Wait conditions 604 performs sign and signal detection. A prediction engine 608 reasons about the spatial environment and generates (with map perception 605 and localization 607) a localized world model 609. Based on the high definition map, a behavior planner 615 obtains a route, checks its safety and provides trajectories. The behavior planner 615 may be informed by a lane planner 614 that develops the virtual rail and monitors the route to provide basic trajectory (e.g., lane keeping, lane change, stop at light). A vehicle dynamic controller 616 may provide longitudinal and lateral control for vehicle stability, and vehicle input/output 617 sends actuation signals via a CAN bus interface 618.

3. Embodiment Using an Advanced SoC

One or more Advanced SoC (100) can be used to control an autonomous vehicle in a variety of platforms and systems. In a first exemplary embodiment, shown in FIG. 35, one or more Advanced SoC (100) is combined in a system with HD Map system (212) which may obtain map refreshes/updates from the cloud via gateway (214) or modem (103) and e.g., a wireless transceiver.

Vehicle control (216) (e.g., turn on/off headlights, turn on/off windshield wipers, etc.) as well as other functions may also be provided by actuator controllers known in the art. Connectors (218) provide access by other equipment for expansion and/or debugging.

The system includes one or more of the sensors described in above, including ultrasonic sensors (66), GPS (76), RADAR (68), LIDAR (70), stereo cameras (74), fisheye or wide-view cameras (73), infrared cameras (75), and surround cameras (72), positioned to provide 360-degree coverage around the vehicle.

The system further includes both on-chip storage (500(1)) and off-chip storage (500(2)), which may be comprised of one or more storage elements including RAM, SRAM, DRAM, VRAM, Flash, hard disks, and other components and devices that can store at least one bit of data. On-chip storage (500(1)), may be comprise L2 or L3 caches for use with the CPU (200) and/or the GPU (300).

Advanced SoC (100) preferably includes the components described in more detail in connection with FIG. 32, including CPU complex (200), GPU complex (300), L3 Cache connected to CPU and GPU complex, Hardware Acceleration Complex (400) including a PVA (402) and DLA (401), and Additional Embedded Processors, including one or more of Cortex R5 processors (702)-(705) as described above. The Advanced SoC (100) is connected to the various sensors and sub-systems (e.g., a fault operable/fault-tolerant braking system (61A) and a fault-operable/fault-tolerant steering system (62A)).

In one embodiment, Advanced SoC's CCPLEX (200) and one or more of the GPU complexes (300), or hardware accelerators (401), (402) independently perform somewhat or entirely redundant processing. In the example non-limiting embodiments, the "redundant" functionality provided by the different processors encompasses the same overall functions but is not exactly-identical. Rather, algorithms and software that perform the same or equivalent functions are designed and implemented differently to provide intentionally non-identical processing, while still performing essentially the same task in order to provide—when the system is operating correctly—essentially the same result. For example, GPU complex (300) may execute a neural network to perform an object detection functionality, while hardware accelerator PVA (402) may execute a computer vision algorithm to identify the same objects. Furthermore, the inputs to the different processors may differ—in the example above, GPU complex (300) may execute a neural network to perform an object detection functionality using input information from a stereo camera, while hardware accelerator PVA (402) may execute a computer vision algorithm to identify the same objects from a monocular camera or infrared camera. The system may also include one or more ADAS sub-systems (82), providing redundancy and enhancing functional safety, including BSW, ACC, AEB, LDW, and AEB systems. The system may optionally include a discrete GPU, dGPU (802), coupled to the Advanced SoC through a high-speed interconnect such as, without limitation NVLINK (805). dGPU (802) can provide additional AI functionality, execute redundant or different neural networks, and even train and/or update neural networks based on input from the system's sensors. The system may also optionally include a discrete CPU (901), such as an X86 processor, connected to the Advanced SoC (100) through a high-speed interconnect such as, without limitation, PCIe (902). Discrete CPU (901) may be used to perform a variety of functions, including arbitrating potentially inconsistent results between ADAS sensors (82) and Advanced SoC (100), and/or monitoring the status and health of vehicle control (216) and infotainment system (76).

Figure 36:
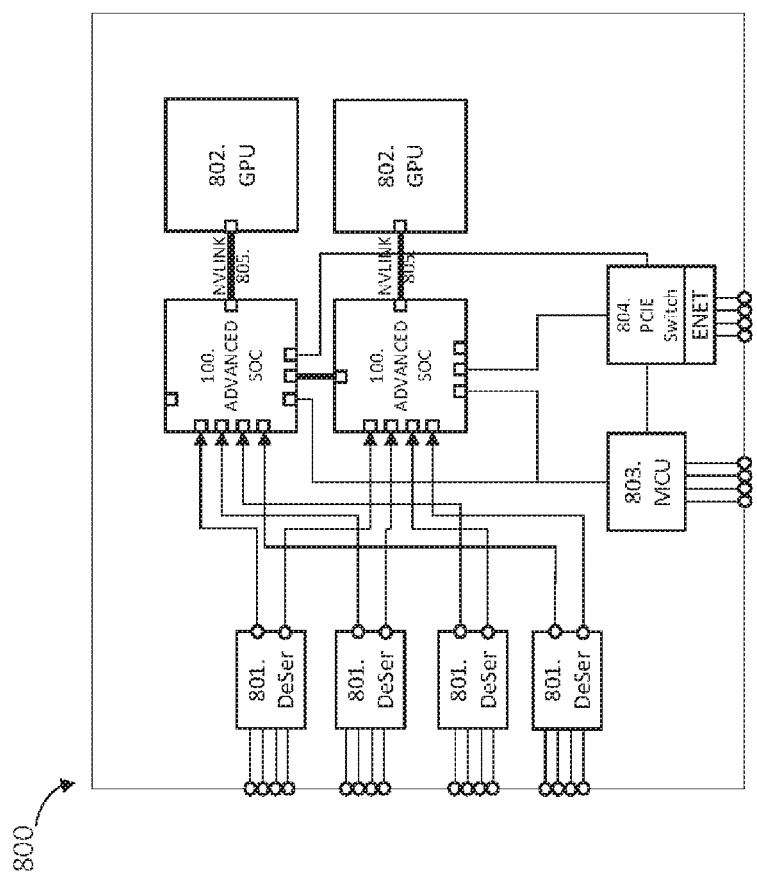
FIG. 36 shows Exemplary Platform Architecture for L3-L5.

In a preferred embodiment, a plurality of the Advanced SoCs shown in FIG. 31 and FIG. 32 are included in an overall system platform (800) for autonomous vehicles, shown in schematic form in FIG. 36. FIG. 36 shows two Advanced SoCs (100) connected by a high-speed interconnect (805) to discrete GPUs. The high-speed interconnect (805) is preferably NVIDIA's NVLINK technology.

As illustrated in FIG. 36, the Advanced SoCs (100) are each connected to a Microcontroller ("MCU") (803). MCU may comprise an SoC, stand-alone ASIC, or another processor. In a typical embodiment, the MCU is designed for an ASIL D functional safety level.

The MCU (803) operates as a master controller for the system. It can reset the two Advanced SoCs (100), switch the display between the two Advanced SoCs, and control the camera power. The MCU and the Advanced SoCs are connected through a PCIE Switch (804).

As illustrated in FIG. 36, the Advanced SoCs (100) are capable of Chip-to-Chip ("C2C") communication. Such communication may be either through PCIE Switch (804) or direct, through a secure message layer connecting two distinct Advanced SoCs. The Advanced SoCs may be paired with each other directly through the high-speed NVLINK. When configured for C2C communication, the system of two Advanced SoCs functions to some extent as if it were a single unified system. When configured for C2C communication, each Advanced SoC can address the other Advanced SoC's DRAM and SysRAM.

In addition, in the preferred embodiment illustrated in FIG. 36, each of the Advanced SoCs (100) are each paired with a discrete GPU (dGPU) (802). The system is thus able to use a single computer for an autonomous self-driving system, with redundancy provided through the independence of redundant computation on the plurality of Advanced SoCs. In example non-limiting embodiments, much of the functionality required to provide autonomous operation is duplicated in software or firmware between the different processors. Thus, in some implementations, similar algorithms are run in both Advanced SoCs, or even in all four processors, including the SoCs and dGPUs. In either case, all relevant inputs gathered by sensors are fed into each of the processors. Each of the processors may independently process the sensor data, and independently provides actuation information and/or control signals that may be used to control the vehicle actuators. MCU (803) receives the actuation information and/or control signals from the processors and evaluates them for consistency. In a typical embodiment, the dGPU has an ASIL B functional safety level.

If one of the Advanced SoCs fails for any reason, the other Advanced SoC continues to operate. Because the Advanced SoCs are performing operations that are redundant to the operations that would have been performed by the failed Advanced SoC, autonomy and its associated critical functions can still be maintained when any one of the processors fails.

In some example non-limiting implementations, both Advanced SoCs receive the same inputs or at least have access to the same inputs. For example, both Advanced SoCs may be connected to a common bus such as the CAN bus (or an arrangement of multiple redundant buses) and are thereby able to access the same information. On the other hand, due to the independent processing performed by the three different processors, there is no requirement that each of the Advanced SoCs must use the same inputs that the other processor(s) are using to calculate a result. For example, in one possible implementation, a first Advanced SoC may make decisions based on RADAR input only, whereas another Advanced SoC may make similar decisions based on a fusion of both RADAR and LIDAR or based on input from a stereo camera. In another possible implementation, the Advanced SoCs may each receive RADAR and LIDAR information.

The Advanced SoCs (100) and dGPUs (802) may use deep neural networks to perform some, or all, of the high-level functions necessary for autonomous vehicle control. As noted above, the GPU complex (300) in each Advanced SoC is preferably configured to execute any number of trained neural networks, including CNNs, DNNs, and any other type of network, to perform the necessary functions for autonomous driving, including object detection and free space detection. GPU complex (300) is further configured to run trained neural networks to perform any AI function desired for vehicle control, vehicle management, or safety, including the functions of perception, planning and control. The perception function uses sensor input to produce a world model preferably comprising an occupancy grid, planning takes the world model and produces the best plan, and control takes the plan and implements it. These steps are continuously iterated.

Each Advanced SoC may offload some, or all, of these tasks to the discrete GPUs (802). The dGPUs (802) may perform redundant operation of one or more networks running on the GPU clusters on the Advanced SoCs, enhancing functional safety. Alternatively, the dGPUs (802) may run additional neural networks to perform any AI function desired for vehicle control, vehicle management, or safety. In a preferred embodiment, dGPU (802) may be used to train a network, or to run a shadow network different from the network run on GPU cluster (300), providing further functional safety.

In the example shown, components (100), (802), (803), are mounted to a common printed circuit board and disposed within the same enclosure or housing, thus providing a "one-box" controller solution. The one-box computer solution preferably includes a system for efficiently cooling the processors and circuit board. In one embodiment, cooling system includes an active hybrid heat transport module adapted to be integrated with a fansink. In this embodiment, fansink includes, without limitation, a fan, walls, and a bottom plate. In one embodiment, system also includes a heat sink lid, which, among other things, prevents particles and other contaminants from entering fan and air blown from fan from escaping system. The Heat sink lid, together with walls and bottom plate of fansink, define a plurality of air channels. The hybrid heat transport module comprises both a fluid channel and an air channel adapted for transporting heat. The hybrid heat transport module and the fansink may be used alone or in combination to dissipate heat from the processor.

Figure 37:
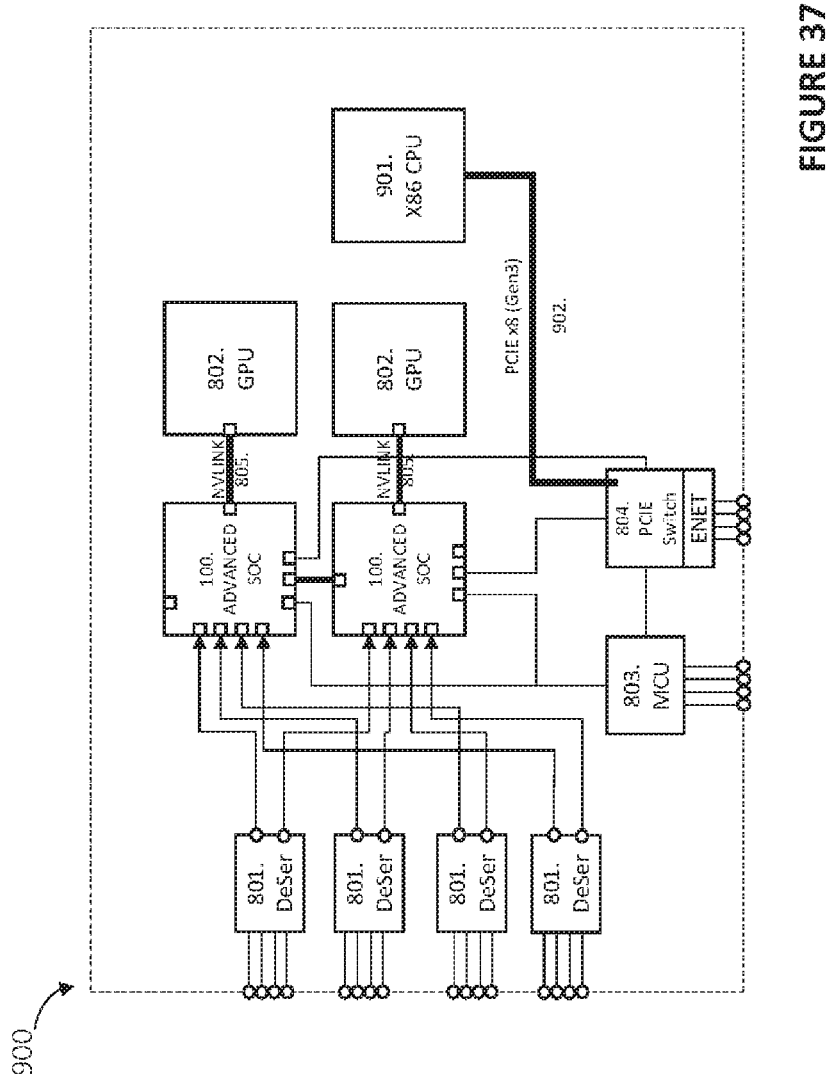
FIG. 37 shows Second Exemplary Platform Architecture for L3-L5 (with X86 CPU)

FIG. 37 illustrates a further embodiment of the platform architecture, (900). The embodiment is identical to the embodiment shown in FIG. 36, with the addition of an X86 CPU (901), connected to the PCIE Switch (804) through a PCIE x8 Bus, (902).

Figure 38:
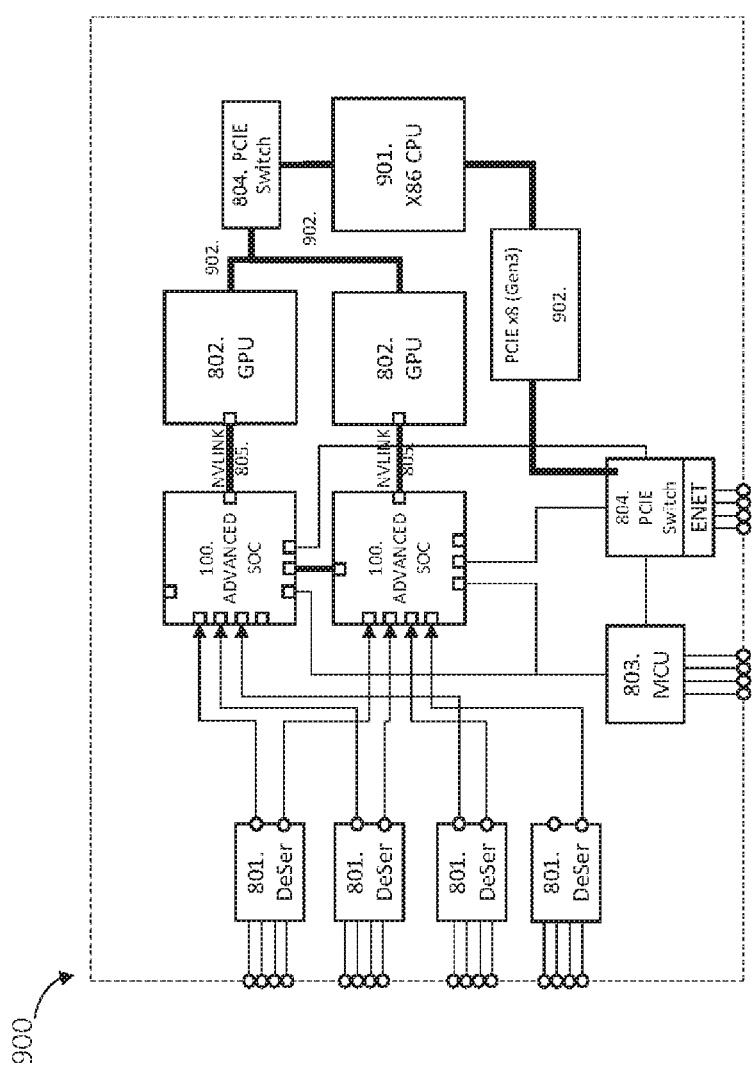
FIG. 38 shows example Third Exemplary Platform Architecture for L3-L5.

FIG. 38 illustrates another embodiment of the platform architecture, (900). The embodiment is identical to the embodiment shown in FIG. 37, with the addition of a second PCIE Switch (804) that allows the X86 CPU (901) to communicate with the GPUs (802) through a PCIE x8 Bus, (902).

Figure 39:
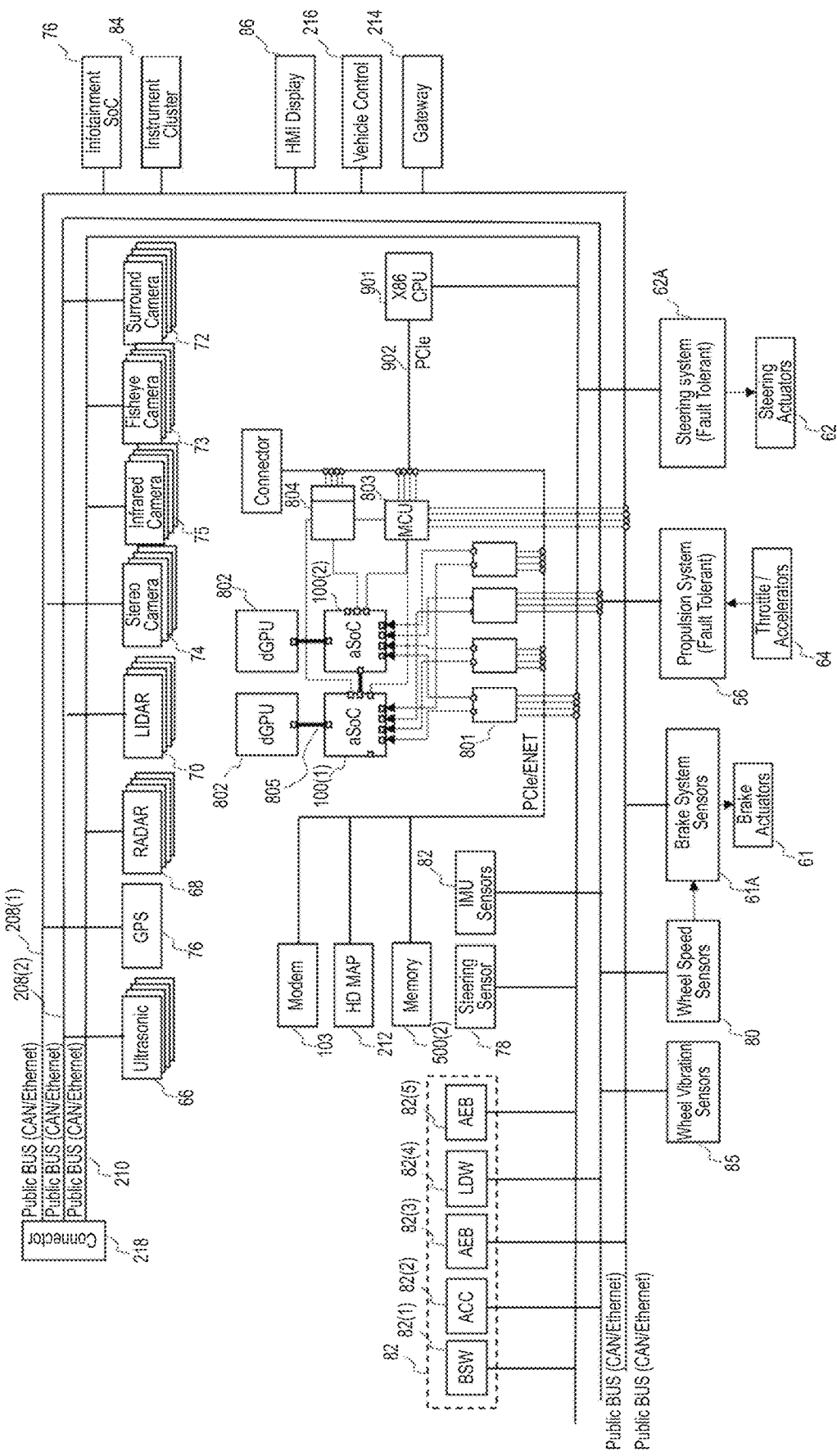
FIG. 39 shows example Multiple Advanced SoCs for Controlling an Autonomous Vehicle.

FIG. 39 illustrates an embodiment in which multiple Advanced SoCs (100(1) and 100(2)), in a platform as illustrated in FIG. 36, FIG. 37, or FIG. 38, control an autonomous vehicle. As discussed above, the Advanced SoCs (100) and dGPUs (802) may use deep neural networks to perform some, or all, of the high-level functions necessary for autonomous vehicle control. As noted above, the GPU complex (300) in each Advanced SoC is preferably configured to execute any number of trained neural networks, including CNNs, DNNs, and any other type of network, to perform the necessary functions for autonomous driving, including object detection, free space detection. MCU (803) arbitrates in the event of inconsistent results from any of the Advanced SoCs (100(1) and 100(2)) and ADAS systems and functions (82). The system illustrated in FIG. 39 is presented without limitation; different numbers and combinations of sensors may be used within the spirit of the present disclosure. Furthermore, the ADAS systems (82) are optional; all, some, or none of the ADAS systems and sensors may be used as part of a system for Level 3-5 autonomous driving.

Figure 40:
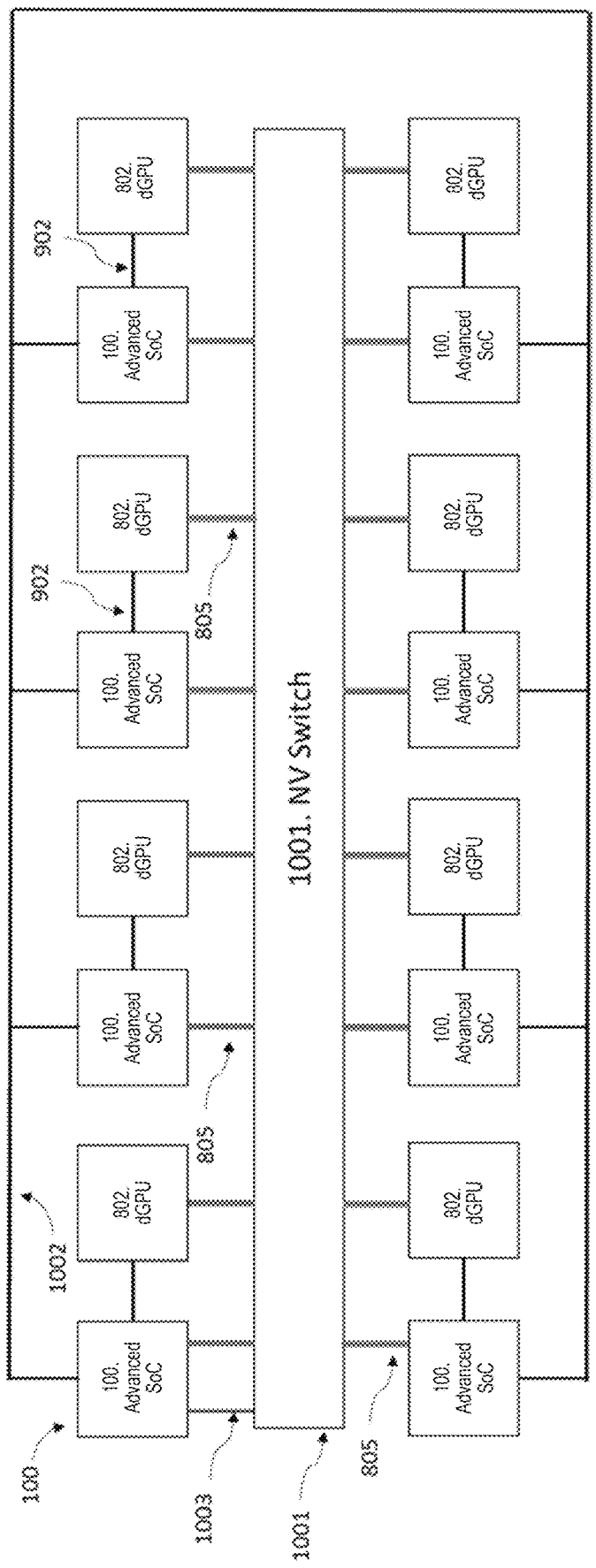
FIG. 40 shows Exemplary Architecture with Eight Advanced SoCs and dGPUs.

FIG. 40 illustrates a further embodiment including a complex platform intended for autonomous driving capabilities, with up to eight Advanced SoCs (100) paired with eight dGPUs (802), using another NVIDIA off-chip SoC called NVSwitch (1001).

The NVSwitch (1001) configuration uses a PCIe link (1003) from one of the Advanced SoCs (100). The eight Advanced SoCs (100) may be paired with eight dGPUs (802) through eight PCIe links (902), though alternatively, NVLINK may be used. The eight Advanced SoCs (100) and the eight dGPUs (802) are connected to NVSwitch (1001) using NVLINK connections (805). In addition, the eight Advanced SoCs (100) communicate directly with each other using the I2C bus (1002). Alternatively, the Advanced SoCs (100) may be paired with each other directly through the high-speed NVLINK. Each Advanced SoC can address the other Advanced SoC's DRAM and SysRAM.

NVSwitch (1001) is a network switch that provides point-to-point communications between various Advanced SoCs (100) and dGPUs (802) using NV Link. NV Link is a point-to-point communications protocol that provides data transfer rates greater than 20 Gbit/s. In an alternative embodiment, NV Switch (1001) may be substituted with or supplemented with one or more other switches, hubs, or other networking devices that utilize one or more communications protocols to allow communications to occur between the various Advanced SoCs (100) and dGPUs (802).

In operation, the eight Advanced SoCs may each have networks trained and focused on specific tasks like pedestrian detection, sign detection, distance estimation, lane detection, collision avoidance, current occupancy grids, predicted occupancy grid, and steering control. Alternatively, the technology herein allows for joint training of a single network to handle multiple tasks, such as object detection, lane detection, free-space, distance estimation.

Figure 41:
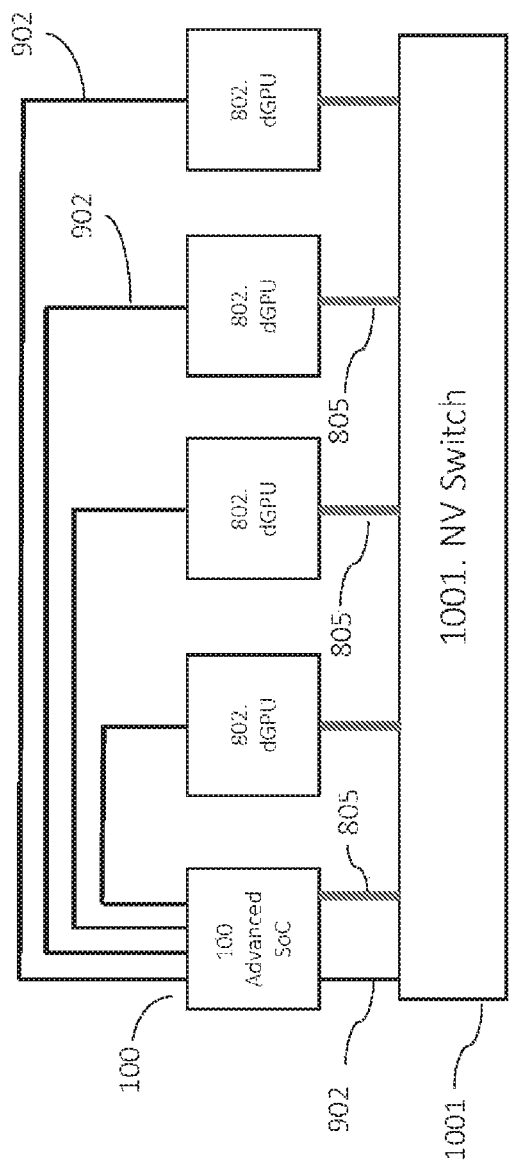
FIG. 41 shows Exemplary Architecture with one Advanced SoC and Four dGPUs.

Although the previous examples illustrate one discrete GPU (802) for each Advanced SoC (100), the SoC is designed and configured to work with any number of discrete GPUs, connected through PCIe links (902) and through NVLINK (805) and NVSWITCH SoC (1001), as illustrated below in FIG. 41.

Additional platform embodiments suitable for achieving functional safety at ASIL D levels are described in co-pending application Ser. No. 16/186,473, filed Nov. 9, 2018. In determining the safest route in the presence of pedestrians, cross-traffic, and other obstacles, self-driving shuttle (50) may employ one or more of the techniques described in co-pending application Ser. No. 16/265,780, filed Feb. 1, 2019, and application Ser. No. 16/269,921, filed Feb. 7, 2019. Furthermore, system shuttle (50) may employ the turning and navigation techniques described in application Ser. No. 16/241,005, filed Jan. 7, 2019.

AI Dispatch ("AID")

1. Dispatch Infrastructure and Communication with Shuttles

AI Dispatch receives information from shuttles (50) via wireless network. In a preferred embodiment, the cloud-based, deep learning infrastructure uses artificial intelligence to analyze data received from vehicles and incorporate it into up-to-date, real-time neural networks for real-time intelligent inferencing. Neural networks may be trained for use herein as is known by persons of ordinary skill in the art.

Figure 42:
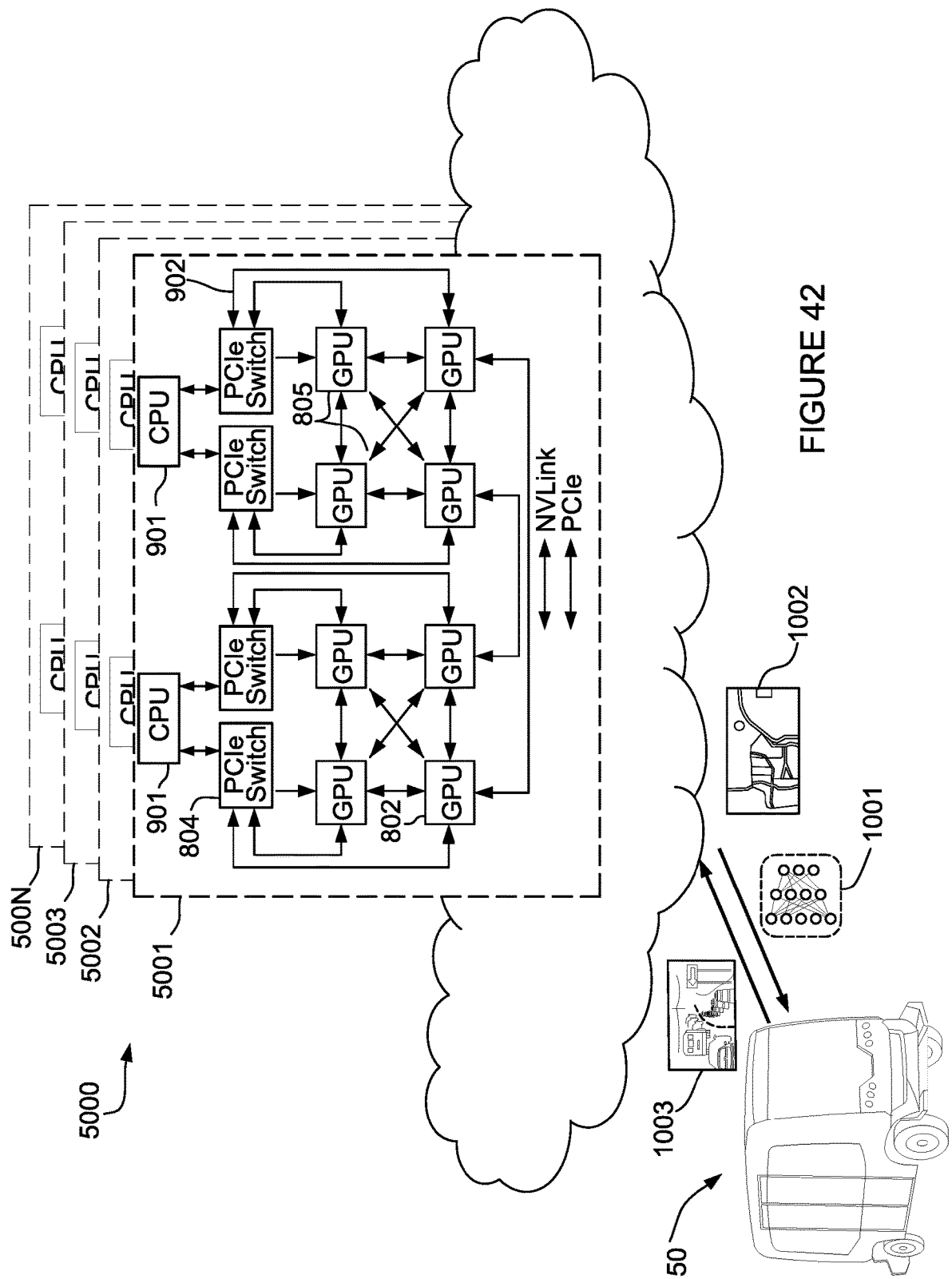
FIG. 42 shows example AI Dispatch Communication with Autonomous Vehicle.
Figure 43:
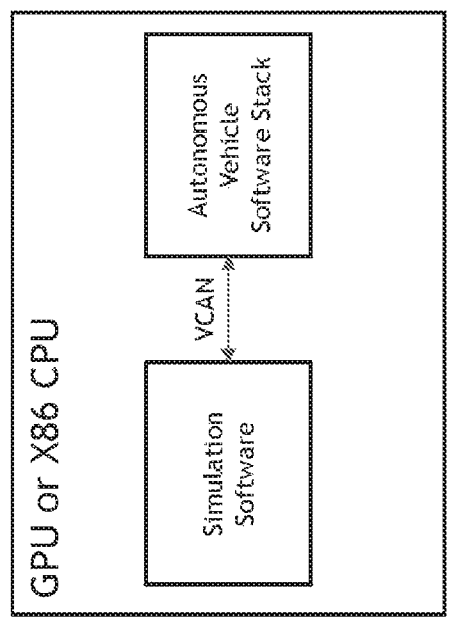
FIG. 43 shows example AI Dispatch—Hardware in the Loop.
Figure 44:
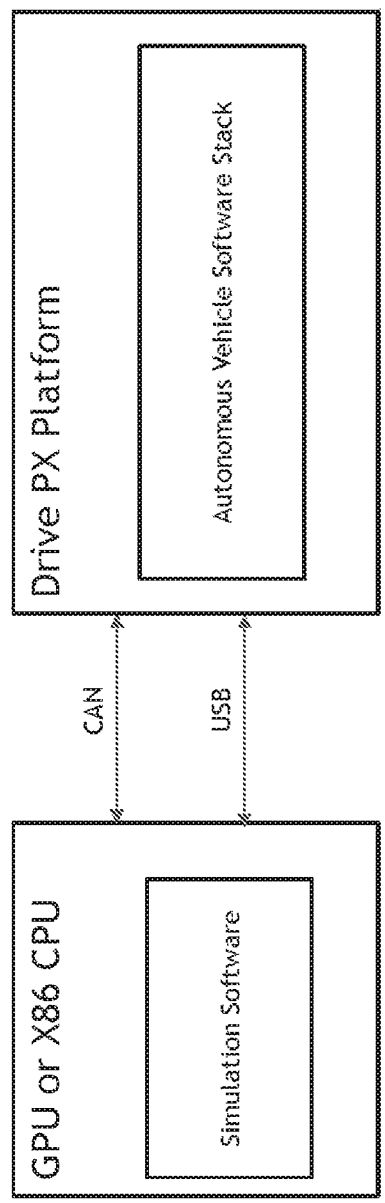
FIG. 44 shows example AI Dispatch—Software in the Loop.

In a preferred embodiment, the network infrastructure uses a datacenter with GPUs for deep learning, including, by way of example, NVIDIA Tesla boards with NVIDIA Pascal, Volta, or Tesla GPUs, as illustrated in FIG. 42.

The cloud-based, deep-learning infrastructure provides updates to self-driving vehicle (50) through the wireless network uplink (1101) and downlink (1102), as illustrated in FIG. 42. Updates provided to vehicle (50) may include updates to high-definition or HD maps (1002), and revisions to one or more neural networks (1001) loaded in memory in the Controller (100), which may include updates resulting from new training and experiences received from other vehicles in the field, or training performed in the network datacenters. Map updates (1002) may further include updated HD map information, which may include information regarding construction sites, potholes, detours, flooding, and other obstructions.

The data collected by each Level 3-5 vehicle should be transferred via a cellular or other wireless network—such as LTE, where available—to a cloud-based infrastructure that includes deep-learning supercomputer servers. The deep learning infrastructure uses artificial intelligence to analyze the data and incorporate it into up-to-date, real-time neural networks for real-time intelligent inferencing.

The deep-learning infrastructure preferably includes GPU technology. The deep-learning supercomputers preferably include servers powered by the NVIDIA® Tesla® P100 or V100 GPUs. For example, the Tesla V100 offers the performance of 100 CPUs in a single GPU—but the technology herein may also be practiced with deep learning infrastructure that uses only CPU-powered datacenters. Alternatively, the training may occur on NVIDIA DGX and DGX Station AI computers.

The deep-learning infrastructure is capable of fast, real-time inferencing, and may use that capability to evaluate and verify the health of the processors, software, and associated hardware in Vehicle (50). For example, deep-learning infrastructure preferably receives periodic updates from Vehicle (50) including a sequence of images and the objects that the Vehicle (50) located in that sequence of images. Deep-learning infrastructure runs its own neural network to identify the objects and compare them with the objects identified by Vehicle (50); if the results do not match and the infrastructure concludes that the AI in the Vehicle (50) is malfunctioning, it can send a signal to Vehicle (50) instructing the fail-safe computer to assume control, notify the passengers, and complete a safe parking maneuver.

For inferencing, the infrastructure preferably includes servers powered by GPUs and NVIDIA's TensorRT 3 programmable inference accelerator. The combination of GPU-powered servers and TensorRT inference acceleration makes real-time responsiveness possible. Alternatively, when performance is less critical, servers powered by CPUs, FPGAs, and other processors may be used for inferencing, though they are disfavored as their performance falls short of that provided by the GPU/TensorRT 3 solution.

FIG. 42 illustrates one embodiment wherein Vehicle (50) provides and receives information via wireless network. Cloud-based infrastructure (5000) includes a plurality of GPU powered servers (5001, 5002, . . . 500N). In the preferred embodiment shown in FIG. 42, each GPU-powered server comprises a plurality of GPUs (802), PCIe switches (804), and CPUs (901), interconnected with high-speed NVLink interconnects (805), and PCIe connections (902). In other embodiments each server could comprise sixteen GPUs, or thirty-two GPUs, connected with a high-speed interconnect such as NVLink and/or an NVSwitch SoC. On the wireless uplink (1101) vehicle (50) uploads images showing unexpected or changed road conditions (1003), such as recently commenced road-work. On the wireless downlink (1102) vehicle (50) downloads updated neural networks (1001) and map information (1002), including information regarding traffic and road conditions. The neural networks (1001) downloaded to shuttle may be pruned networks according to application Ser. No. 16/246, 414 filed Jan. 11, 2019.

2. AI Simulation and Route Selections

The overall design and configuration of the system considers a number of parameters, which may include: (1) location and number of stations and (2) number and type of shuttles. According to embodiments, the design and configuration of the system may be optimized by a Setup Utility, using AI simulation.

For example, in an embodiment suitable for a corporate campus, the Setup Utility may receive some or all of the following information to assist in its simulation: (1) employee office information, (2) historical employee badging information (to show times that employees badge in and out of each building), (3) employee meeting/calendaring information (from outlook or another calendar utility), (4) head-count projections, (5) weather, and the like. Historical employee badging information allows the Setup Utility to understand where employees have traveled throughout the campus. Employee meeting/calendaring information allows the Setup Utility to understand where employees typically need to travel, especially standing/recurring meetings. Head-count projections allow the Setup Utility to project additional employees for a given group and include the demand from those future employees in the system design and setup. Weather information allows Setup Utility to consider weather conditions and patterns in the service area.

Setup Utility then performs AI-based simulations to determine the optimal location, number of stations, and number and type of shuttles.

According to embodiments, the system creates a model of stationary and moving obstacles, using an AI agent for each obstacle. The obstacles may include pedestrians, bicyclists, motorcycles, and cars. Where the obstacles are not near the shuttle of interest, the system models obstacles as represented in a simple form such as, for example, a radial distance function, or list of points at known positions in the plane, as well as their instantaneous motion vectors. The obstacles are thus modeled much as AI agents are modeled in a videogame engine. AI pedestrians, bicyclists, motorcycles, and cars are trained to behave much as they would in the real world. For example, pedestrians might suddenly jay-walk (especially at night or in rainy conditions), bicyclists may fail to heed stop signs and traffic lights, motorcycles may weave between traffic, and cars may swerve, change lanes suddenly, or brake unexpectedly.

Autonomous agents may be modeled as "hardware-in-the-loop" (HIL), "software-in-the-loop" (SIL), a combination of both, or AI. There are several notions of what it means to be "hardware-in-the-loop" or HIL. For example, hardware-in-the-loop includes using a real platform with hardware, such as any of the platforms disclosed in FIG. 36, FIG. 37, FIG. 38, FIG. 39, FIG. 40, FIG. 41, or an NVIDIA Drive PX. Stated differently, HIL is a simulation setup that involves running certain software components with some hardware component including (optionally) sensors. Usually, this involves running an autonomous vehicle driving software stack on the hardware described above, and running a Simulator on a separate computer, such as for example an x-86 box. One embodiment of this configuration is illustrated below in FIG. 43. In one embodiment, simulation is shown running on X86 or any other CPU hardware. In another embodiment, the simulation software may also run on GPU hardware, including, for example, an NVIDIA DGX system or cloud-based NVIDIA Tesla servers.

HIL simulations typically require the same interfaces that the hardware would include in the real world. In the embodiments discussed above, the sensor interfaces would typically include: (1) CAN interface, including a PCAN Adapter, (2) Ethernet interfaces, including RAW UDP sockets, with IP address, origin, vlan, source IP all preserved, (3) Serial interface, with a USB to serial adapter, and (4) camera interfaces. These interfaces are exemplary—other interconnects may also be used.

Using HIL in an Auto Simulator provides a scalable solution to simulate/emulate various driving conditions for autonomous software and hardware systems, such as NVIDIA'S Drive PX Pegasus platform. The key benefits of HIL simulation include being able to: (1) Test networks faster-than-realtime, (2) Scale verification with computing resources (rather than vehicles or test tracks), (3) deterministic regression testing (real world is never the same twice), (4) "Perfect" ground truth/labelling (no hand-labelling required), (5) Test scenarios difficult to do in real world, (6) Rapid generation of test permutations, and (7) Test a larger space of permutations in simulation as compared to the real-world.

"Software-in-the-loop" ("SIL") is basically a simulation setup that involves only software components modeling the objects or components being tested. SIL includes using a compatible software stack running on Ubuntu, for example. In a typical embodiment, the SIL setup consists of a separate computer, such as an x-86 box that runs the Simulator. The simulator consists of the virtual environment, traffic objects, and the principal car whose behavior and experience are being modeled, commonly referred to as the "ego car." In a preferred embodiment, the ego car could be modeled as a game object in the UE4 engine and comprises of various virtual sensors which are further interfaced using sockets with the ego car's autonomous driving software stack. The autonomous driving software stack communicates with the ego car via middleware—over a virtualized CAN (VCAN) bus, for example—providing a continuous feedback loop with the software stack driving the ego car and receiving inputs from the virtual sensors. One embodiment of this configuration is illustrated below in FIG. 44. In one embodiment, simulation and autonomous vehicle stack are shown running on X86 CPU hardware. In another embodiment, the simulation software and autonomous vehicle stack may also run on GPU hardware, including, for example, an NVIDIA DGX system or cloud-based NVIDIA Tesla servers. Furthermore, SIL may be multiple computers as well. For example, in one embodiment the autonomous vehicle stack could be running on a computer coupled to, but distinct from, the final production computer. In preferred embodiments, the AI Simulation provides for easier testing, a programmable environment, and scalability. Testing is easier because the simulation may include per-module regression testing (e.g., detection and labeling, sign and lane detection, localization, path planning) and unit test style methodologies (changes yield finite measured results and test for regressions in other systems).

The simulation environment is programmable. Programmability is an advantage because deterministic regression testing is not possible in the real world, due to variations in weather, time-of-day, etc. Moreover, programmability allows for edge cases to be more easily created, and specific failure scenarios to be re-created. The programmable simulation environment allows the system designer to author dangerous scenarios virtually instead of in the real world (e.g., a toddler in an intersection). The programmable simulation environment allows the system to be tested on all of the roads of interest, even in remote locations where the shuttle service may operate, using data incorporated from map providers. The programmable simulation environment further provides for easier "localization" than real-world testing, as simulation environments may be easily amended and changed.

The simulation environment is also scalable. The scalability allows the system designer to test various scenarios and permutations in parallel. Tests can occur faster-than-real-time, and the system can scale with compute power, not test tracks and man-hours. Furthermore, the simulation environment's scalability facilitates regression testing (automate testing against known problem cases).

Figure 45:
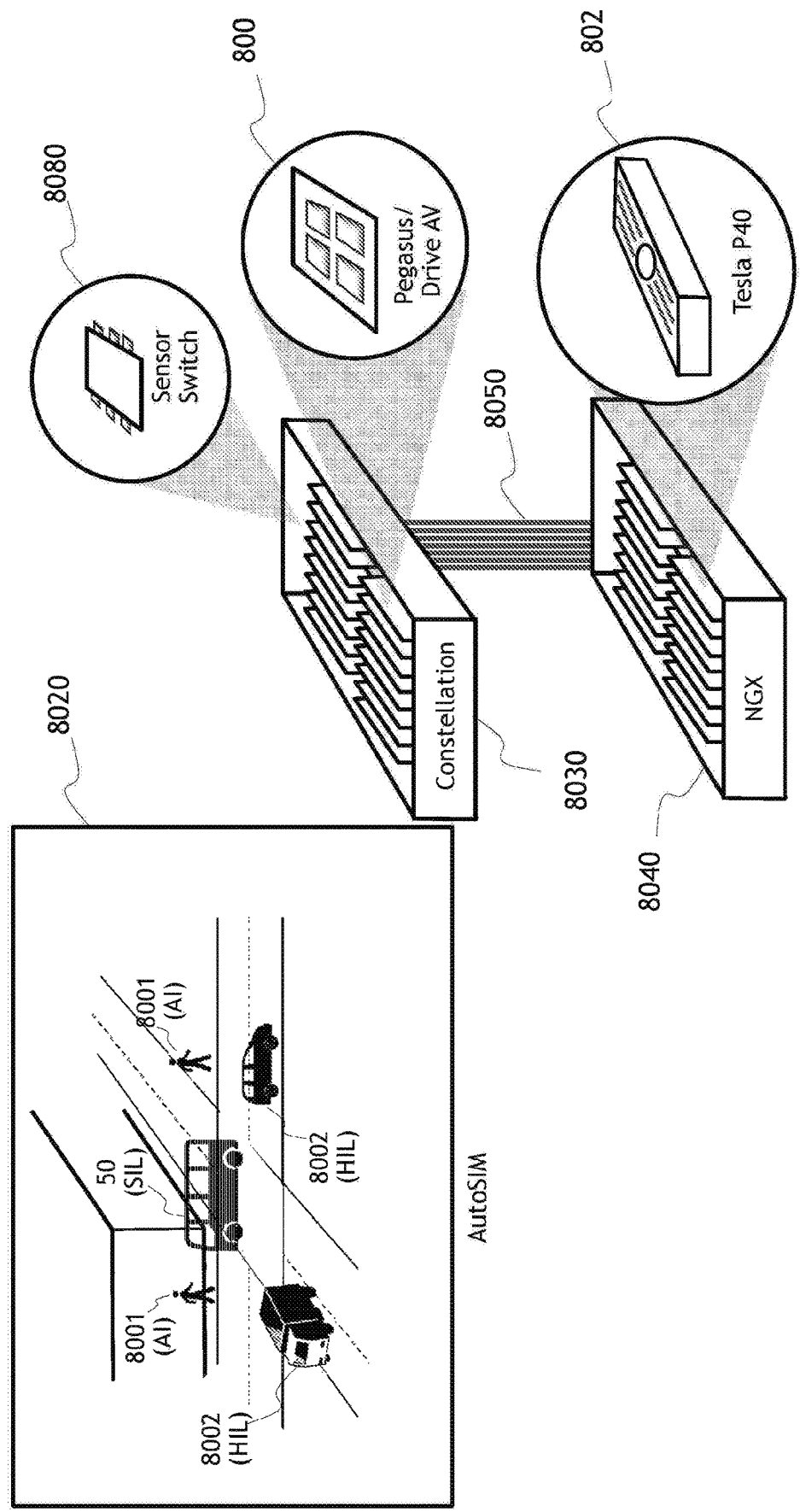
FIG. 45 shows example AI Dispatch—Simulation System Overview.

FIG. 45 illustrates the AI-based simulations suitable for use herein. The simulations use a virtual world (8020) that includes artificially intelligent obstacles such as pedestrians (8001), third-party vehicles (8002) and shuttles (50). The simulations also preferably include a wide variety of street signs, which may vary depending on location. The simulated street signs may be damaged or defaced, as they often are in the real-world. The virtual world models each third-party vehicle using an autonomous driving platform (800) in system comprised of a plurality of driving platforms (8030). Each shuttle (50) in the virtual world is also controlled by an autonomous driving platform (800). Each autonomous platform may comprise a platform with multiple SoCs as illustrated in any of FIG. 36, FIG. 37, and FIG. 38.

In one embodiment, each sensor in each shuttle (50) corresponds to a GPU (802) in server (8040). Suitable GPUs include the NVIDIA Tesla P40 Inferencing Accelerator, a purpose-built GPU designed to deliver maximum throughput for deep learning deployment. Other embodiments may simulate multiple sensors per GPU as an optimization, enhancing scalability.

Each GPU creates the inputs for one or more sensors on each shuttle (50). In this way, each shuttle (50) receives virtual world input from multiple cameras, LIDAR, RADAR, and all other sensors, each represented by data from one GPU (802). Each shuttle (50) responds to requests received from Manager Client (4000), drives through the virtual world, and makes pickups and drop-offs accordingly. Server (8040) communicates with driving platforms (8030) via HDMI cable (8050) to sensor switch (8080), which provides GMSL output. In a preferred embodiment, the simulation is optimized to simulate as many sensors per GPU as possible. The simulation may also span multiple compute nodes (computers), interconnected to ensure synchronization of world state.

Figure 46:
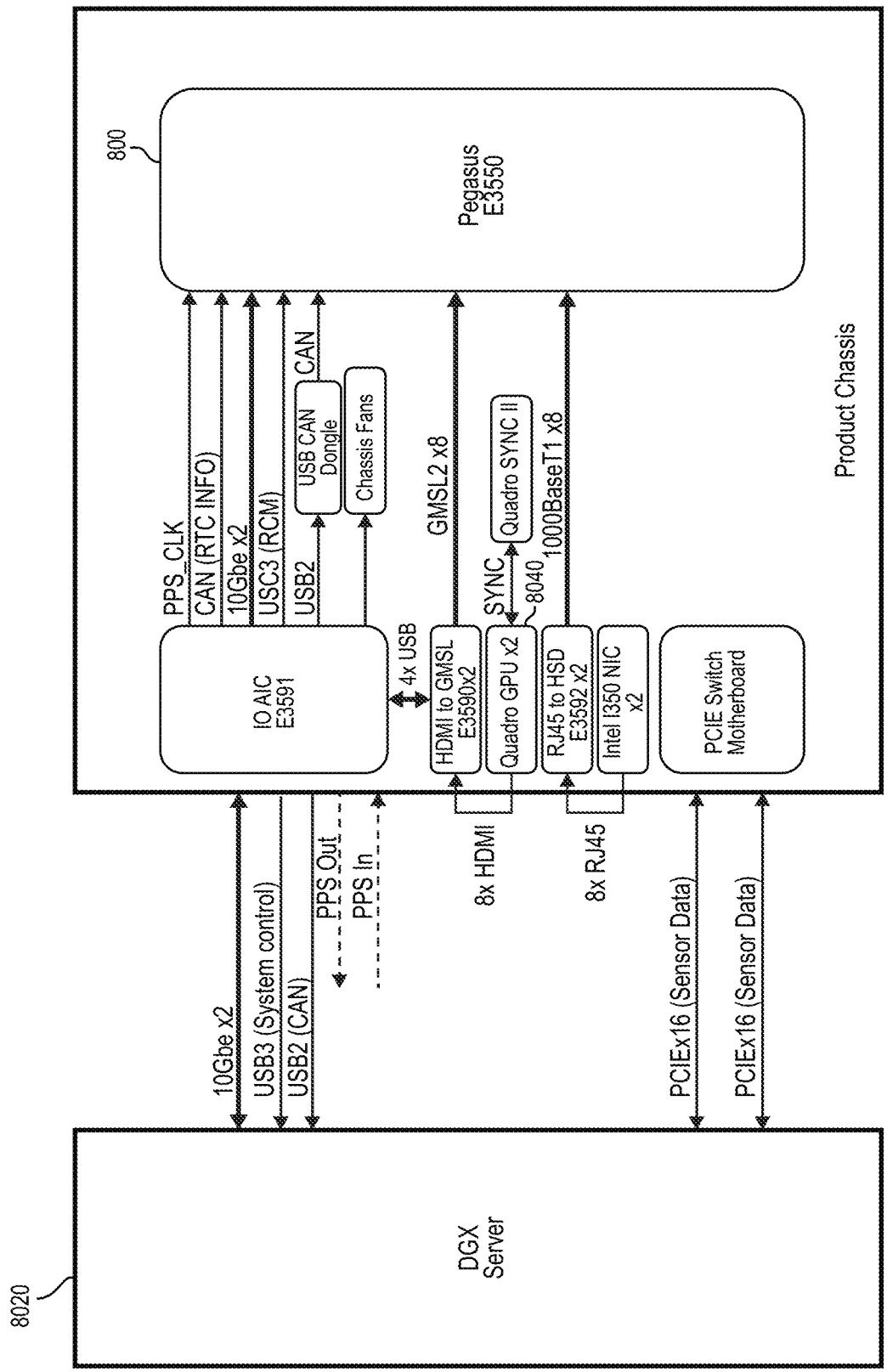
FIG. 46 shows Example Hardware in the Loop Implementation.

FIG. 46 illustrates one embodiment of a simulation system using a HIL approach. In the example illustrated in FIG. 46, the system uses two separate boxes solution to reduce space and external cables in data center. Box (8020) may be a DGX server, such as the DGX-1 from NVIDIA. In other embodiments, multiple DGXs or other computers, including NVIDIA Tesla servers, may be used for the simulation. Autonomous driving platform (800) is in a separate chassis, independently cooled by a chassis fan or alternatively water-cooled. The chassis preferably includes two Quadro GPUs that provide 8 DP/HDMI videos stream, synchronized through a Quadro Sync II card. The chassis also preferably includes two NICs to provide 8 Gigabit ports with PTP support to emulate RADAR/LIDAR/IMU.

Figure 47:
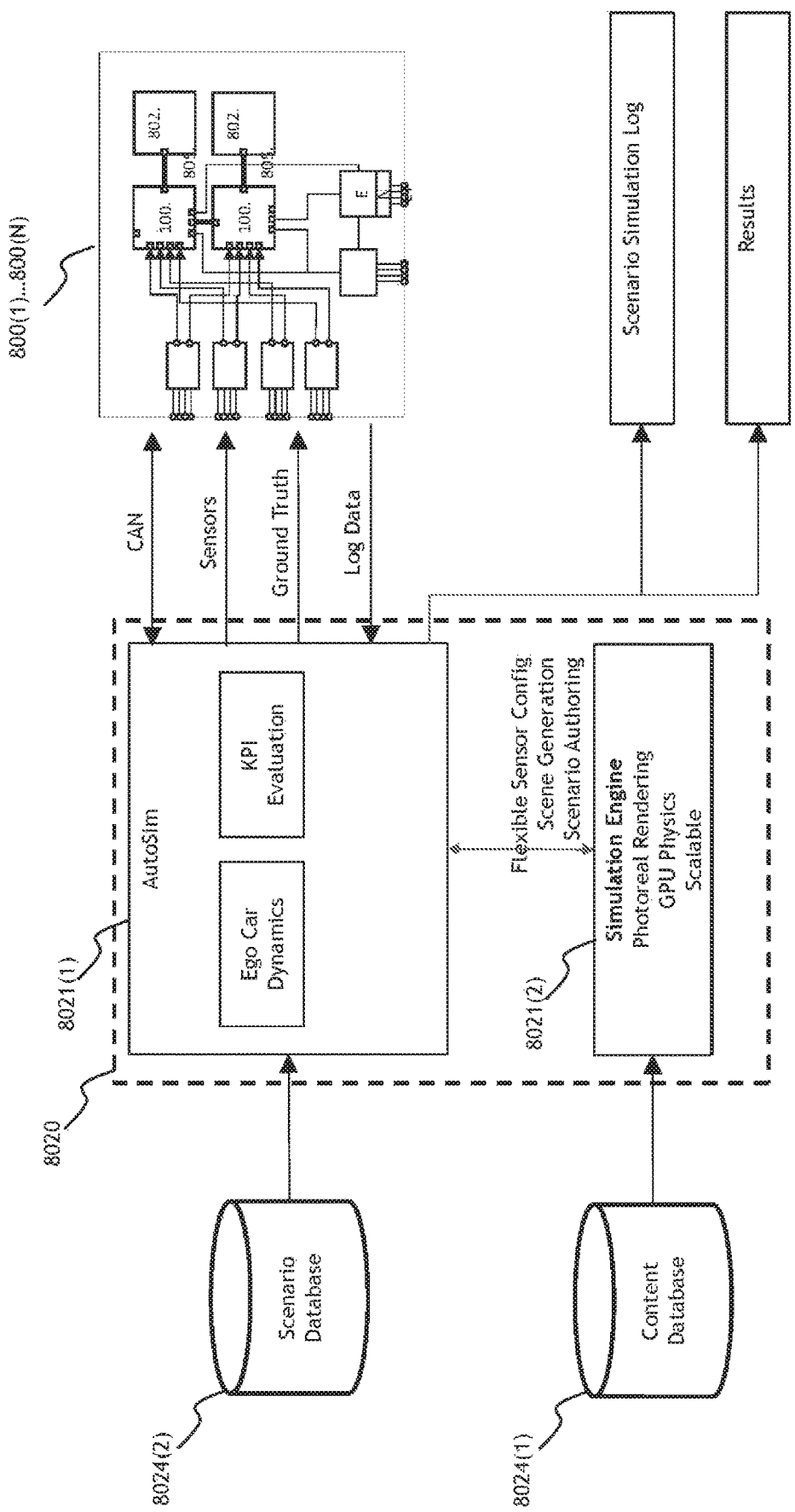
FIG. 47 shows example AI Dispatch—Simulation System Overview with HIL.

FIG. 47 illustrates another embodiment suitable for AI simulation, with hardware in the loop (800(1)-800(N)). In this embodiment, content database (8024(1)) contains detailed content information for modeling cars, trucks, people, bicyclists, signs, buildings, trees, curbs, and anything else that a shuttle might encounter. Scenario database (8024(2)) contains scenario information, including dangerous scenarios that could not be tested in the real world (e.g., a toddler in an intersection).

The virtual world is modeled by the components in (8020), including shuttle simulation engine (8021(1)) and world simulation (8021(2)). Hardware-in-the-loop (801(1)-(N)) controls up to N virtual shuttles. HIL exchanges information in the same manner in which the HIL would operate in a real-world environment. The HIL does not recognize that it is operating in a virtual world and engages in perception, path planning, and autonomous driving as it would in the real world. Software-in-the-loop and AI executing in simulation engine (8021(1)) controls one or more cars, trucks, people, bicyclists, and/or animals that the simulated shuttles might encounter. SIL vehicles may be controlled using instances of the same autonomous vehicle software illustrated in FIG. 33 or FIG. 34. Alternatively, SIL vehicles may be controlled by more basic software, moving the SIL vehicles on a simple rail according to a pre-determined pattern.

Figure 48:
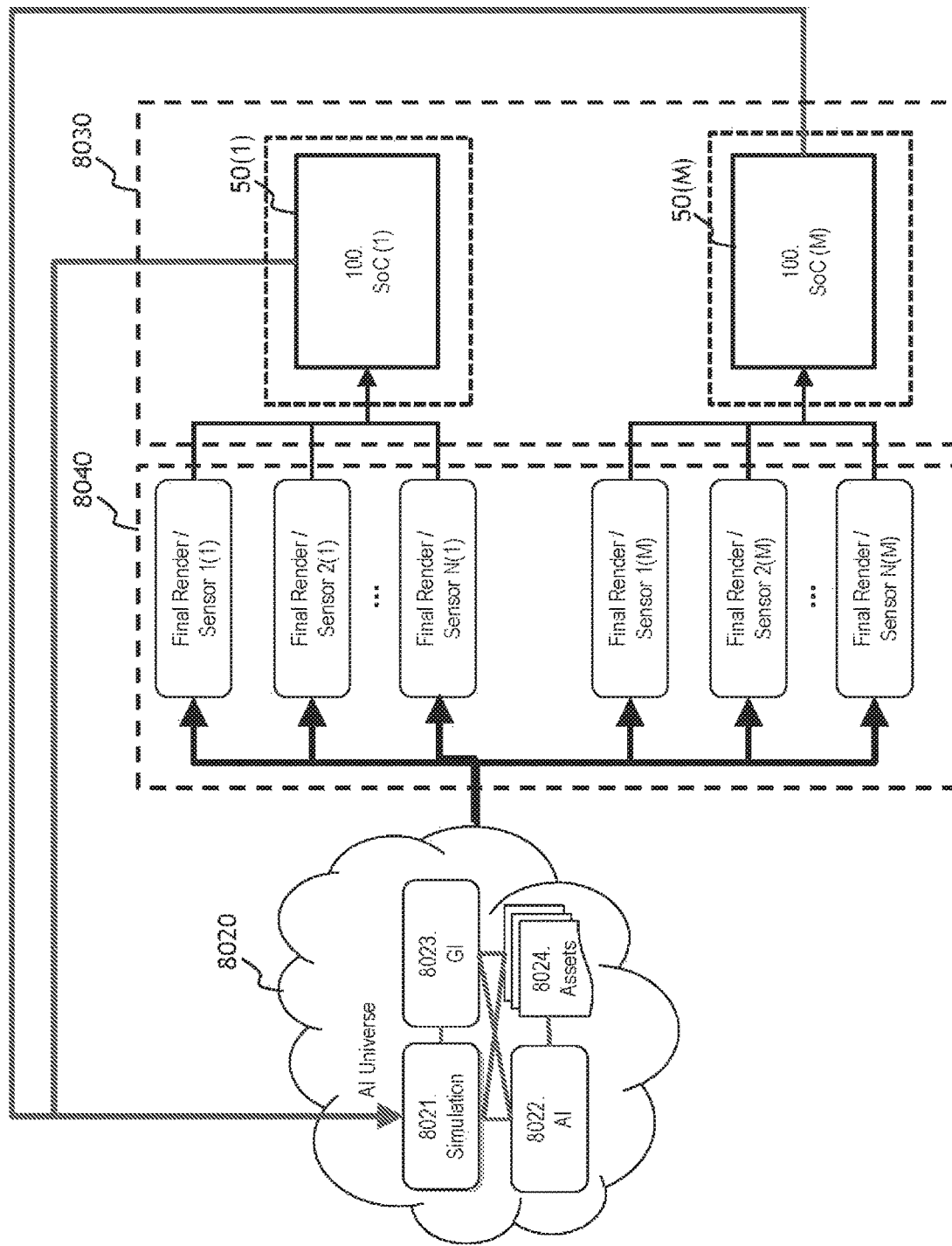
FIG. 48 shows example AI Dispatch—Simulation Architecture.

FIG. 48 illustrates an architecture for performing the simulations suitable for use herein. Virtual world (8020) is modeled by interconnected components including, in a preferred embodiment, simulation engine (8021), AI agents (8022), Global Illumination (8023), and Object Data and Characteristics, or Assets (8024). These components model the virtual world much as the world would be modeled in a virtualized interactive platform such as a Massive Multiplayer Online (MMO) game environment. Global Illumination ("GI"), for example, is one example of "view independent" simulation that can be calculated once and shared by the final rendering nodes. Furthermore, the simulation can include graphics (e.g., Global Illumination) as well as physics, traffic simulation, weather simulation, and others. Virtual world is an AI Universe that provides data to the GPU servers (8040) that create the final rendering for each of the sensors on each shuttle (50) in the system. For example, GPU server (8040) receives data from AI Universe (8020) and creates sensor inputs 1-N for each of the N sensors on each of the M virtual shuttles in the universe. Those sensor inputs are provided to Advanced SoCs (100(1)-(M)), which processes the input exactly as they would process sensor inputs in the real world.

Advanced SoCs (100(1)-(M)) produce commands for each of the virtual shuttles 1-M, which are provided to simulation engine (8020). Simulation engine (8021) updates the behavior of AI agents (8022) as well as the virtual shuttles (1-M) in the system. Simulation engine (8021) further updates the Object Data and Characteristics, or Assets (8024) for the objects in the virtual world, updates the Global Illumination (8023), and updates the sensor input to be sent to GPU server (8040).

Any of the virtual shuttles (1-M) or AI agents may be replaced by a person-in-the-loop (PIL), able to travel through the virtual world and participate in it, much as a player would participate in an MMO environment. When present, a PIL may elect to use a virtual reality headset or may view the system from the perspective of a safety driver at the Safety Driver UX.

Figure 49:
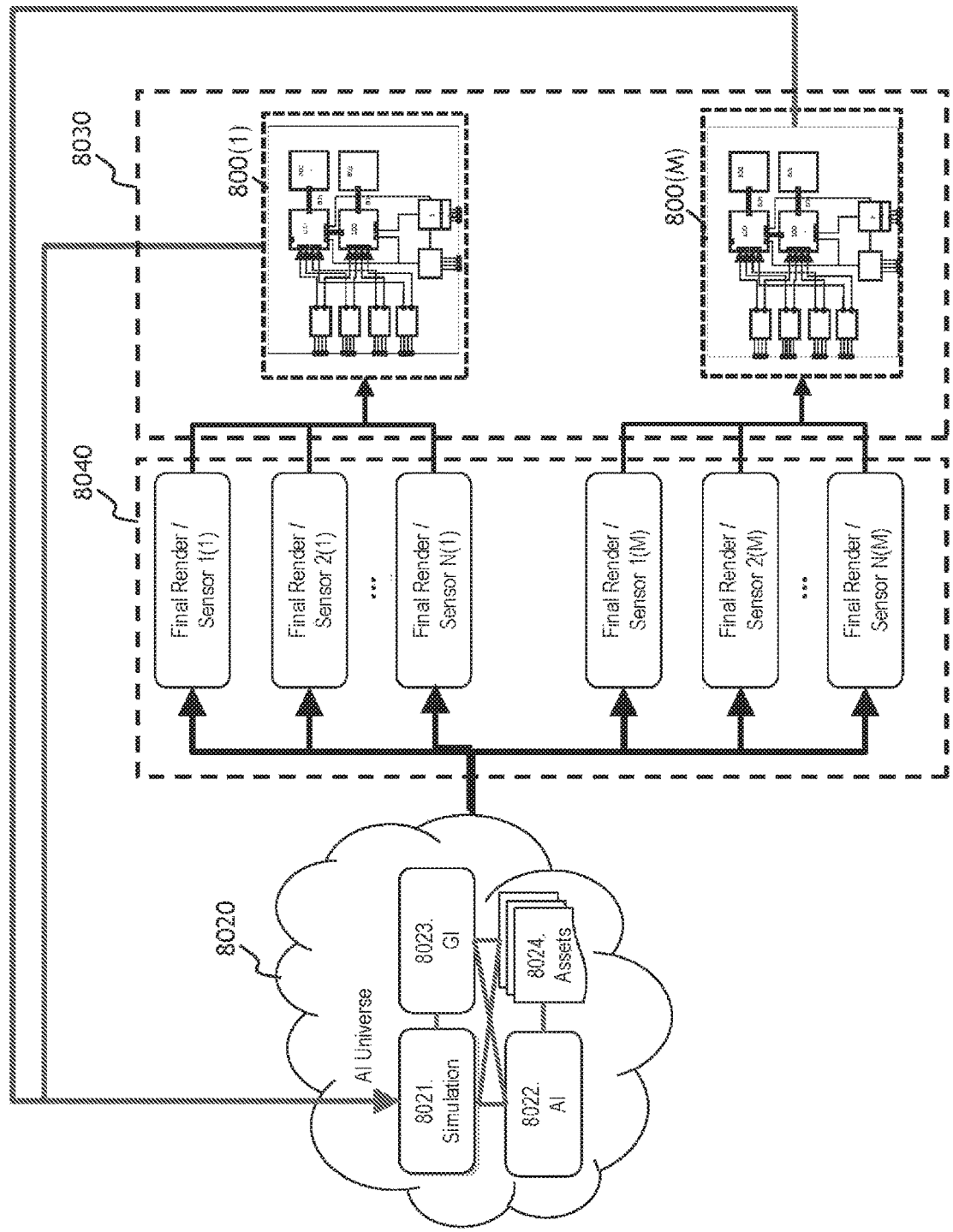
FIG. 49 shows example AI Dispatch—Simulation Architecture with AI Supercomputer Platform.

FIG. 49 illustrates another embodiment of the simulation architecture, in which each of the virtual shuttles (1-M) may also be commanded by platform (800). Platforms (800) may include one or more advanced SoCs, one or more discrete GPUs, and one or more MCUs, according to any of the embodiments illustrated in FIG. 36, FIG. 37 and/or FIG. 38. Platforms (800) preferably include hardware and software stack meeting ASIL D functional safety standards.

Figure 50:
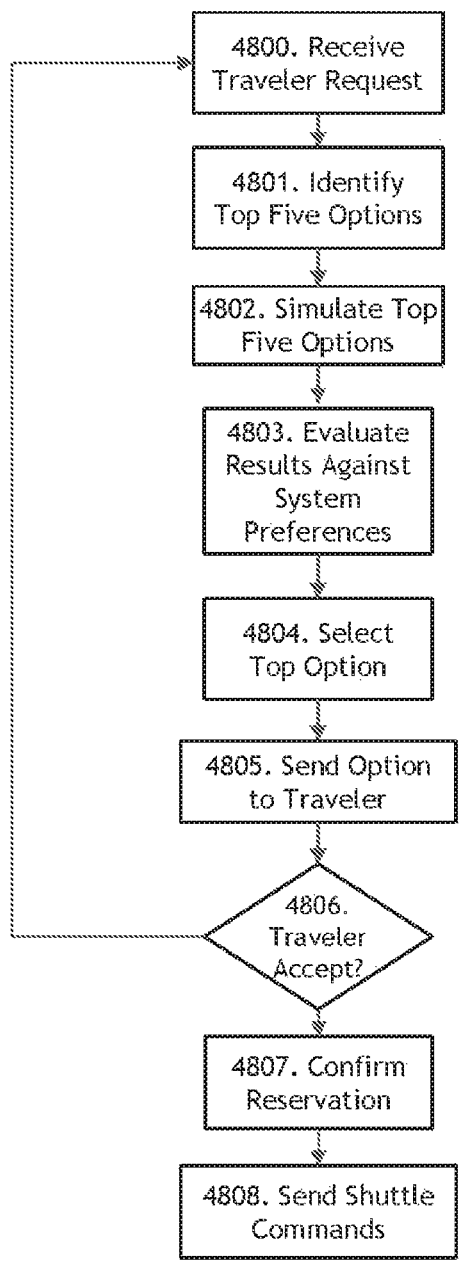
FIG. 50 shows example AI Dispatch—Example Process Flow.
Figure 51:
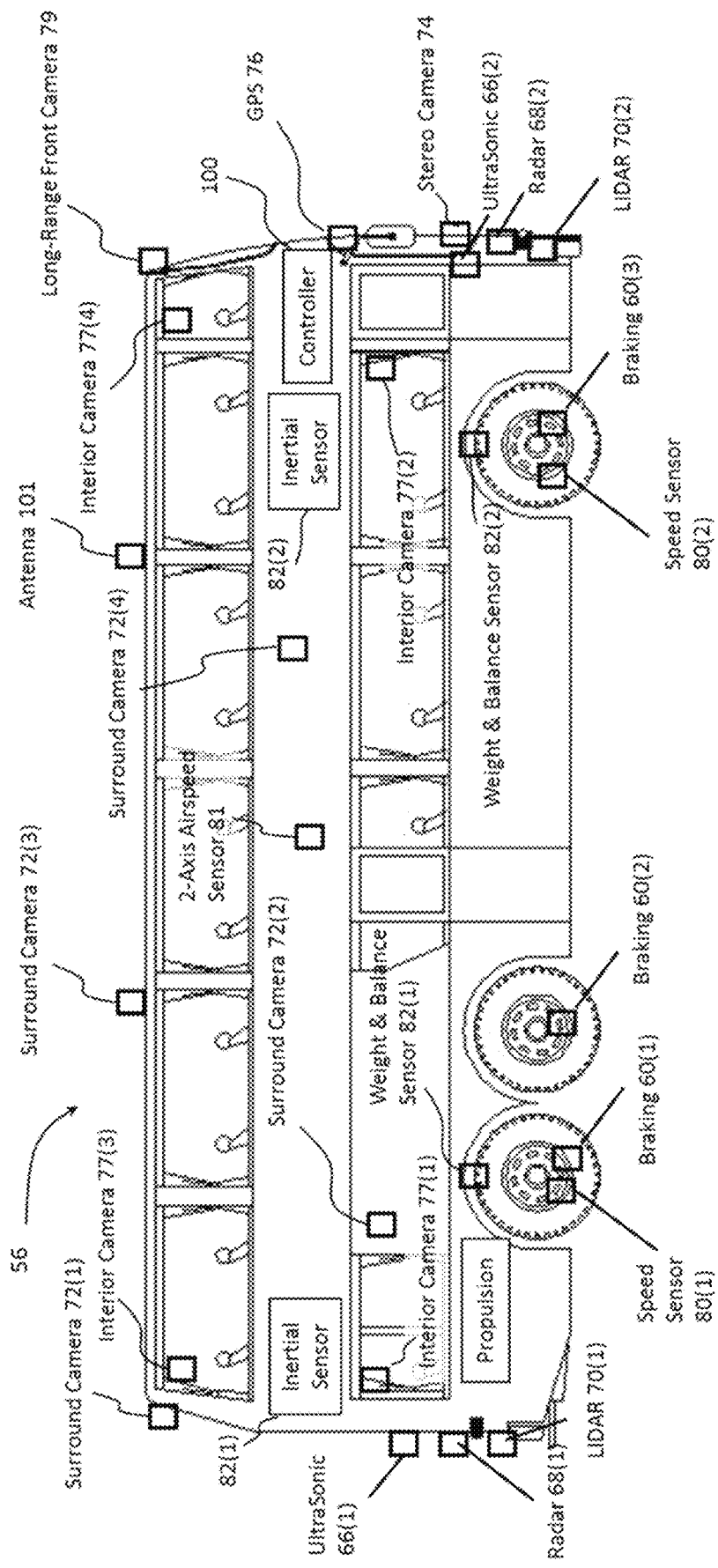
FIG. 51 shows Example Self-Driving Two-Level Bus.

The simulation techniques illustrated in FIG. 45, FIG. 48, and FIG. 49 allow the AI Dispatch (5000) to test multiple shuttle options for each rider request and determine how well each option matches the system preferences set by the operator. For example, FIG. 50 illustrates an example process flow according to one embodiment. After traveler makes a request (4800), AI Dispatch identifies options (4801) and simulates each of the available options using the AI simulation (4802). AI Dispatch compares the results of each simulation against the operator's system preferences (4803), selects the calculated option that best achieves the system preferences (4804), and notifies the traveler of the selected choice (4805).

For example, in one example embodiment, a method for configuring a shuttle system comprises: receiving a selection of system preferences and a selected time window corresponding to said selection of system preferences, setting system parameter targets according to said preferences, conducting a simulation of system performance over said selected time window, comparing the results of said simulation with system parameter targets, outputting at least one result of said simulation, and resetting the system to operate according to said system parameter targets. The selection of system preferences may correspond to a selection of relative priorities for a plurality of system parameters. The system preferences may include at least one of average wait time, maximum wait time, cost per person mile, and total system cost. The selection of system preferences may be received through a manager client. The selection of system preferences may be associated with specific days. The selection of system preferences may be associated with specific time windows. The simulation may be performed on a dispatch server, comprising: a graphics engine, for simulating a virtual world in which a virtual autonomous shuttle, corresponding to an autonomous shuttle, a plurality of graphics processing units, for generating inputs to a plurality of virtual sensors corresponding to said sensors on said autonomous shuttle, an autonomous vehicle platform, for receiving said inputs to said plurality of virtual sensors, and a processor configured to determine the virtual shuttle's performance. The simulation may include at least one hardware-in-the-loop element and/or at least one software-in-the-loop element; or at least one hardware-in-the-loop element and one software-in-the-loop element. The at least one hardware-in-the-loop element comprises at least one GPU. The at least one software-in-the-loop element may comprise software executing on at least one GPU. The at least one hardware-in-the-loop element and the at least one software-in-the-loop element may comprise software executing on at least one GPU. The at least one hardware-in-the-loop element may comprise at least one X86 or other processor. The at least one software-in-the-loop element may comprise software executing on at least one X86 processor. The at least one hardware-in-the-loop element and the at least one software-in-the-loop element comprise software executing on at least one X86 or other processor.

Additional Embodiments

Figure 52:
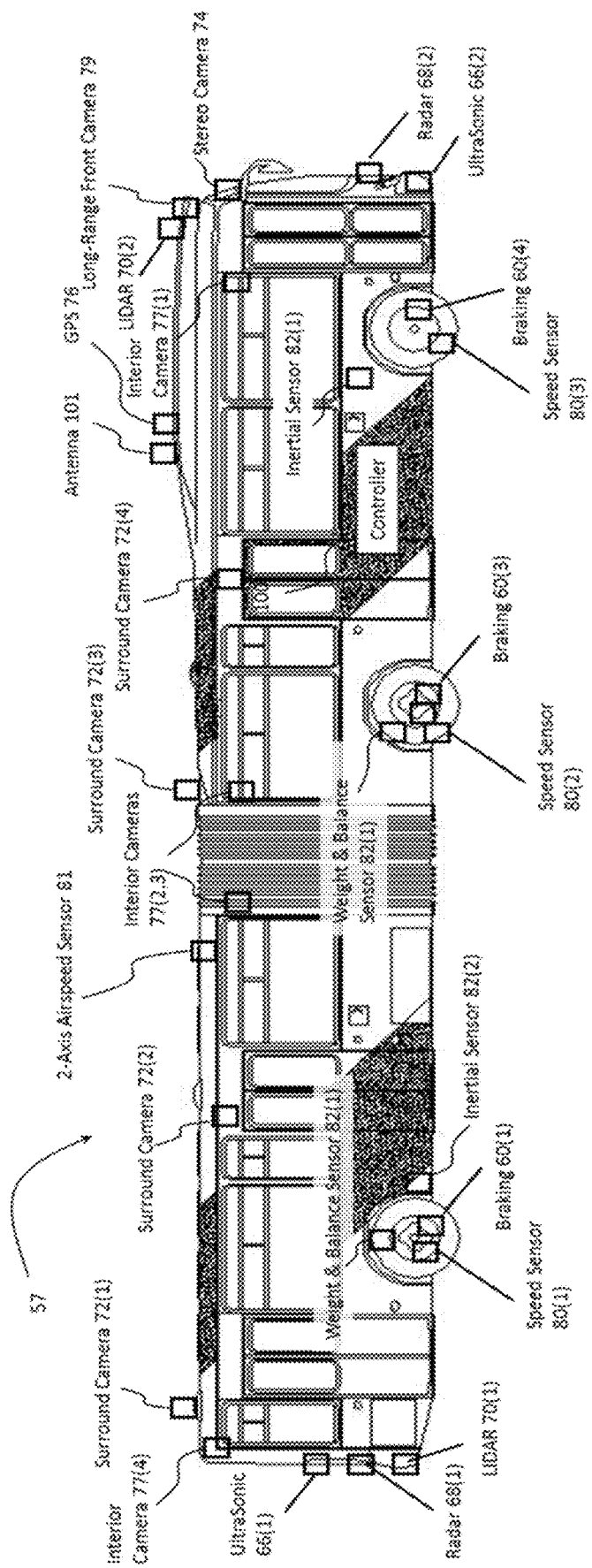
FIG. 52 shows Example Self-Driving Articulated Bus.
Figure 53:
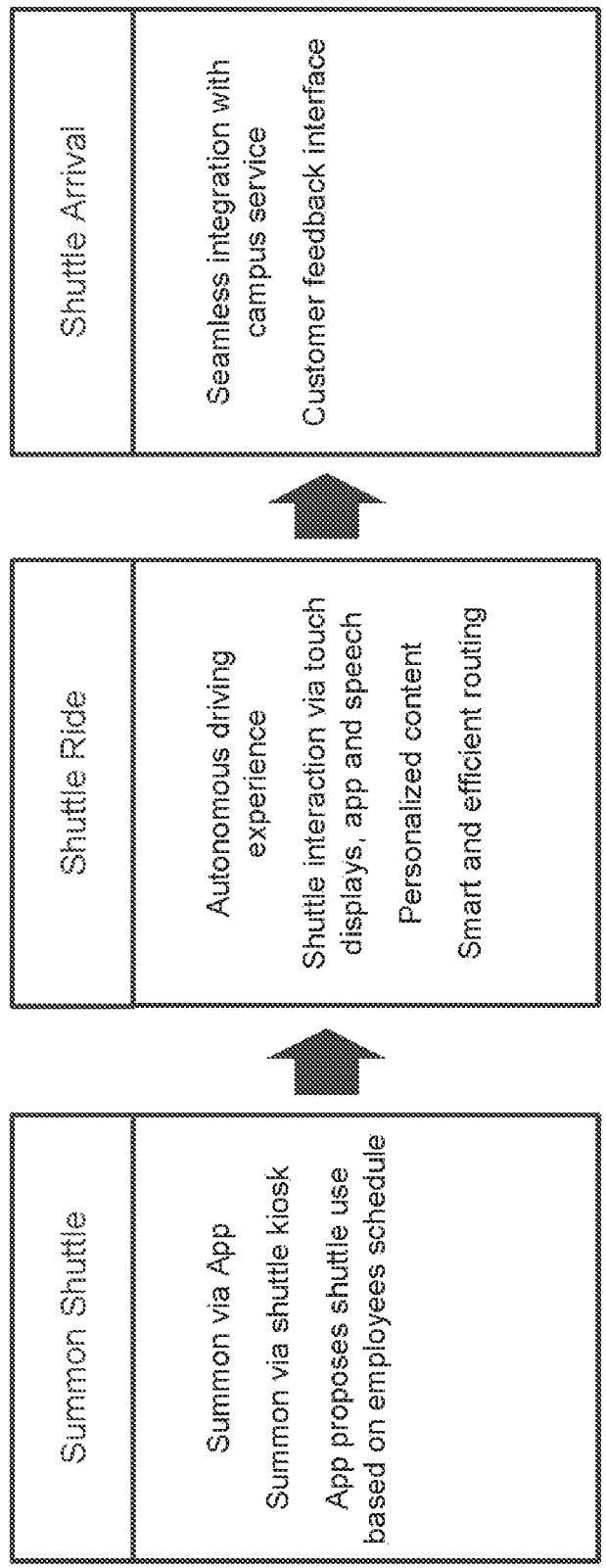
FIG. 53 shows an example use case for on-demand autonomous vehicle use on a corporate campus.

"Shuttles" as used herein includes any suitable vehicle, including vans, buses, double-decker buses, articulated buses, robo-taxis, sedans, limousines, and any other vehicle able to be adapted for autonomous, semi-autonomous or other on-demand or ride-sharing service. For example, FIG. 51 below illustrates a self-driving two-level bus (56). FIG. 52 below illustrates a self-driving articulated bus (57).

Example Consumer Use Case

Figure 54A:
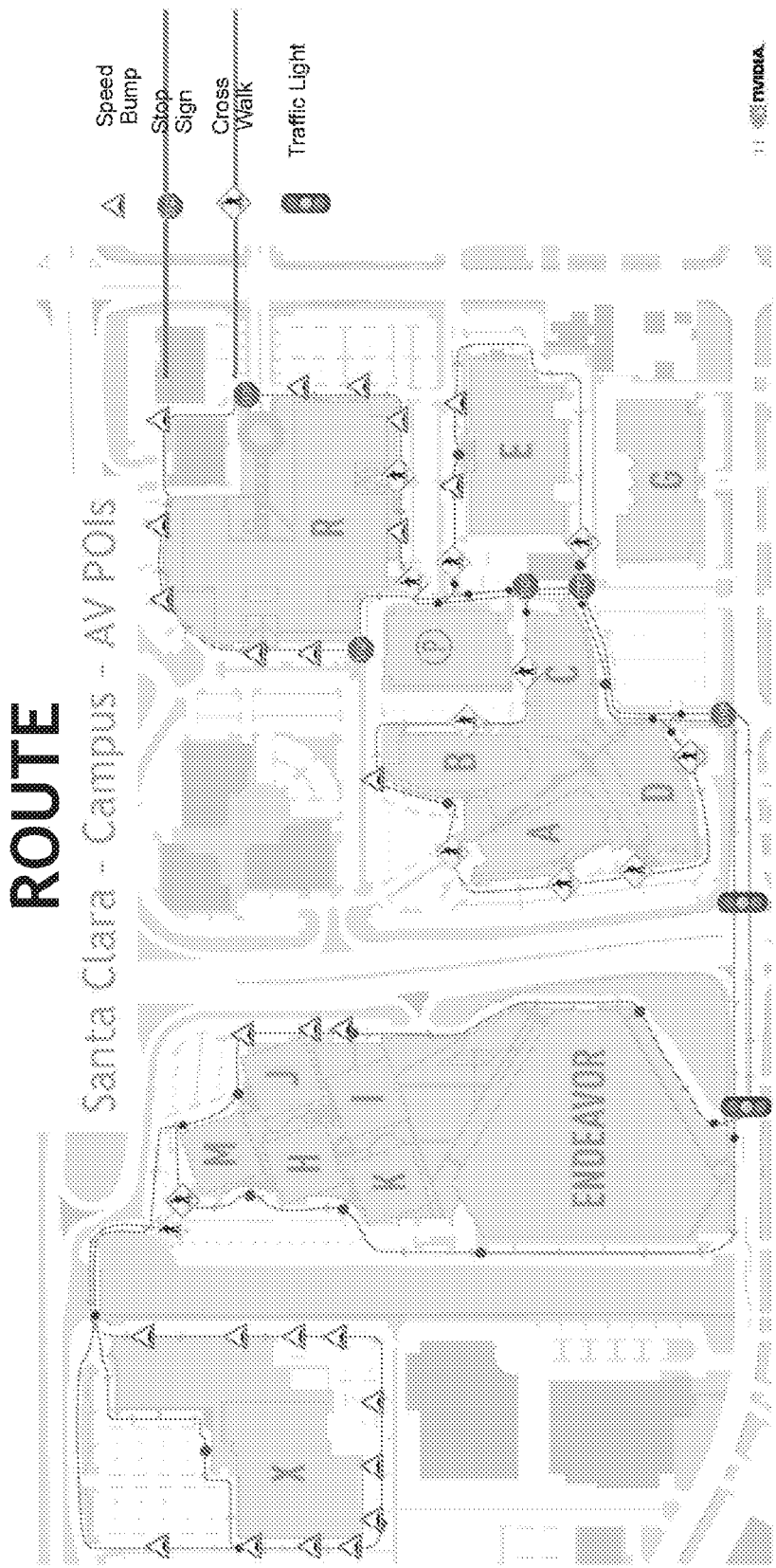
FIGS. 54A-54C show route planning for the example corporate campus on-demand use case.

FIG. 54A shows an example non-limiting shuttle map showing a virtual rail and landmarks on that rail. As can be seen, the virtual rail circumnavigates buildings X, H-K, M, Endeavor, A-D, E, R and several parking areas. It does not circumnavigate other buildings such as G. Furthermore, there are options such as circumnavigating the parking area at the top of building X or instead traveling along the outside of building X between the building and the parking area.

The landmarks may be actual, virtual or both. Some landmarks symbolized by stop signs require the shuttle to stop and wait before proceeding. Other landmarks symbolized by traffic lights require the shuttle to stop and wait its turn before proceeding. Still other landmarks are crosswalks that the shuttle must check for pedestrian traffic before proceeding through. Other landmarks comprise speed bumps that the shuttle should slow down for in order to maximize passenger comfort.

Figure 54B:

FIG. 54B shows an example graphical display that could be displayed on a kiosk, on a user's portable smart device, or on a touch panel display on board the shuttle, that allows a user to select a destination. By touching one of the light-colored building outlines, the passenger (or soon-to-be passenger) can command the shuttle to take them to the selected building. The bottom of the example displays shows number of passengers riding the shuttle, who those passengers are, and where they have asked to be dropped off.

Figure 54C:
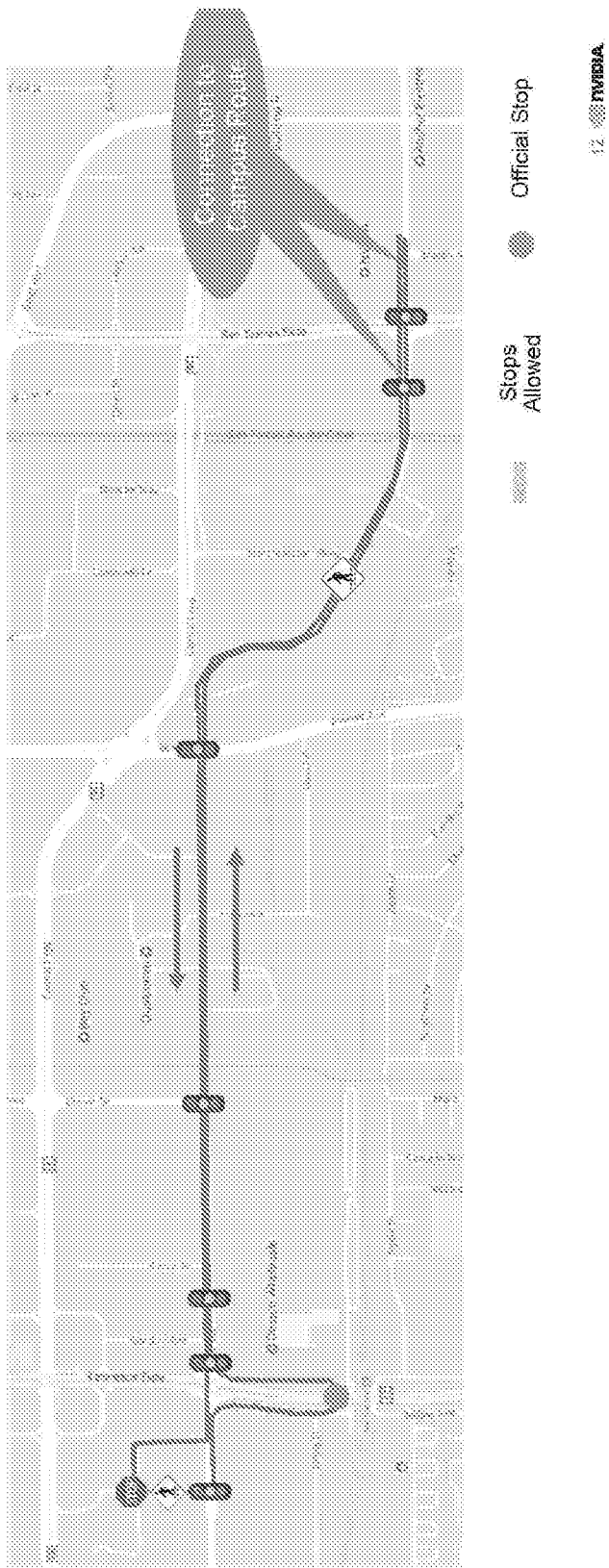

FIG. 54C shows a further route the same or different shuttle may take to transport employees between the corporate campus and a local train station that also provides bus access to a local airport. The local train station may already be serviced by city buses that passengers can board from intersections close to the corporate campus. However, in this embodiment, an autonomous shuttle can provide door-to-door 24-hour service for authorized employees between the corporate campus and the train station. In this example, the shuttle drives on city roads through multiple traffic lights and two crosswalks. This shuttle can be a so-called "circulator" that constantly circulates along a route back and forth between the corporate campus and the train station.

Figure 55:
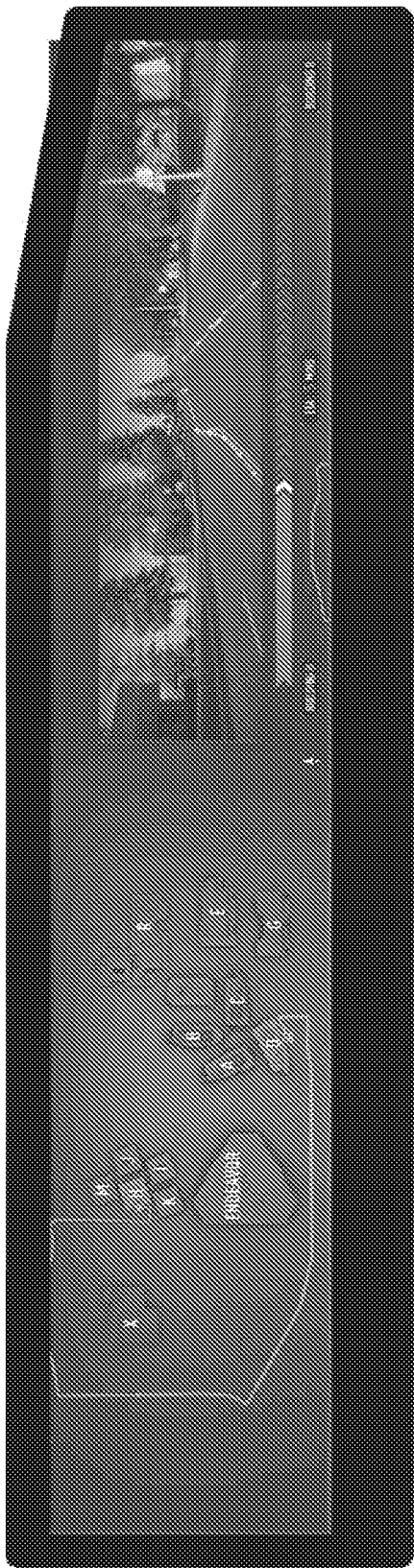
FIGS. 55, 56A-56I, 57, 58 show example user displays.

FIGS. 55-58 show example non-limiting displays. FIG. 55 is an example of a "jumbotron" display—a large display at the front of the shuttle passenger compartment that shows the current route of the shuttle as well as a forward-facing view of what a human drive of the shuttle would see. Such a display could be an overhead display showing an overview map and current route progress and displaying interesting AV driving information. An inspiration for such a display is the type of display in London's "tube" subway cars.

Figure 56C:
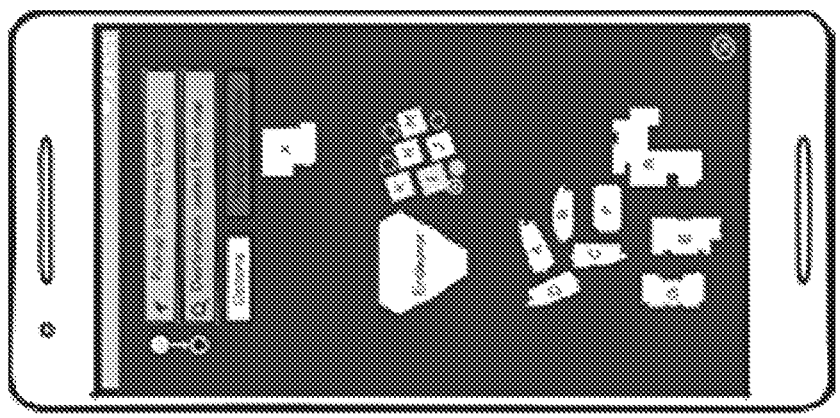
Figure 56B:
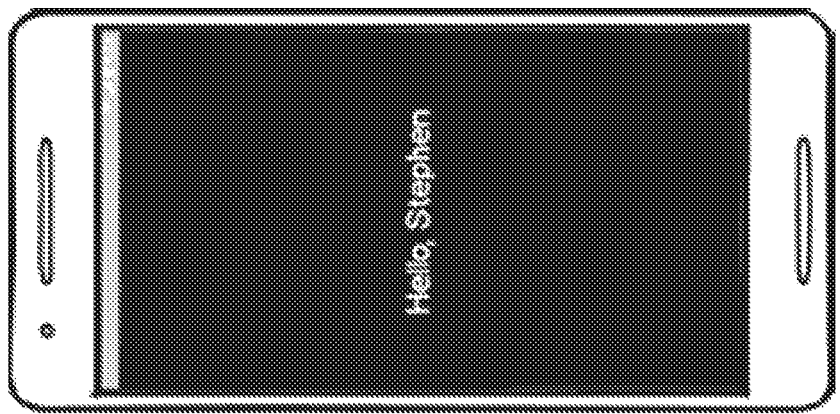
Figure 56A:
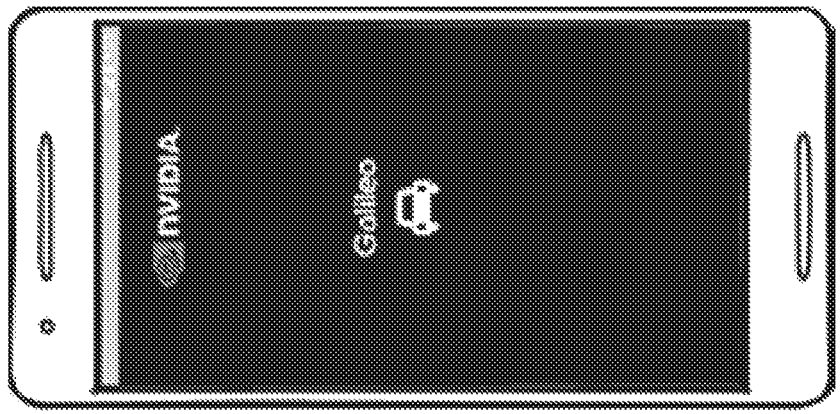
Figure 56F:
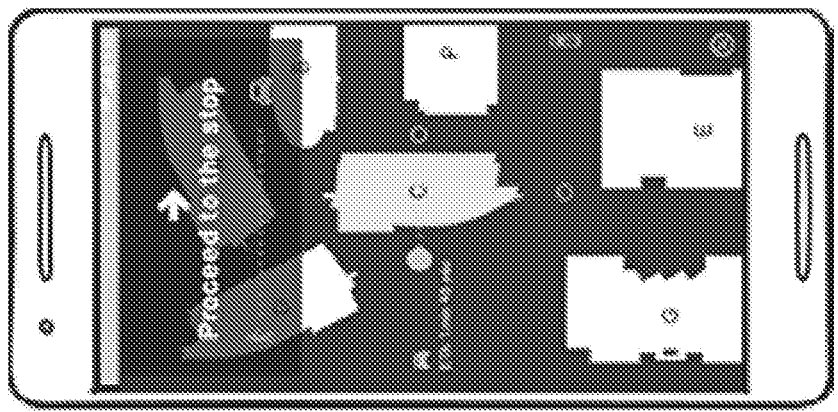
Figure 56E:
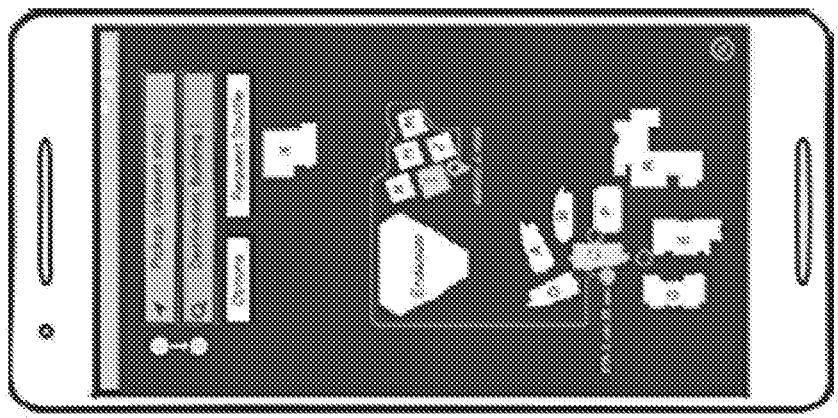
Figure 56D:
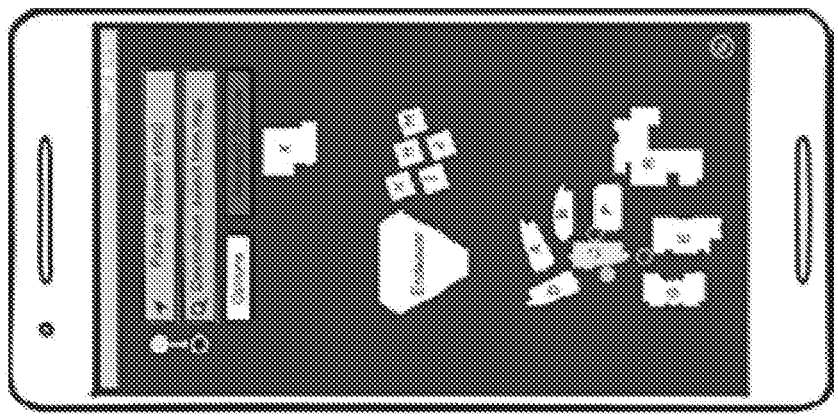
Figure 56G:
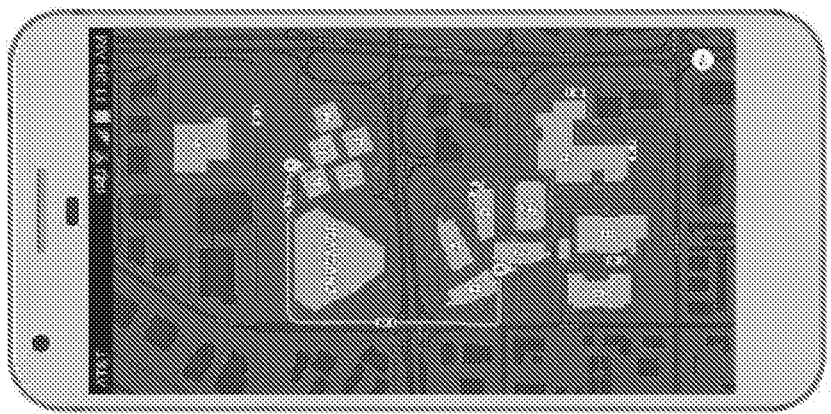
Figure 56H:
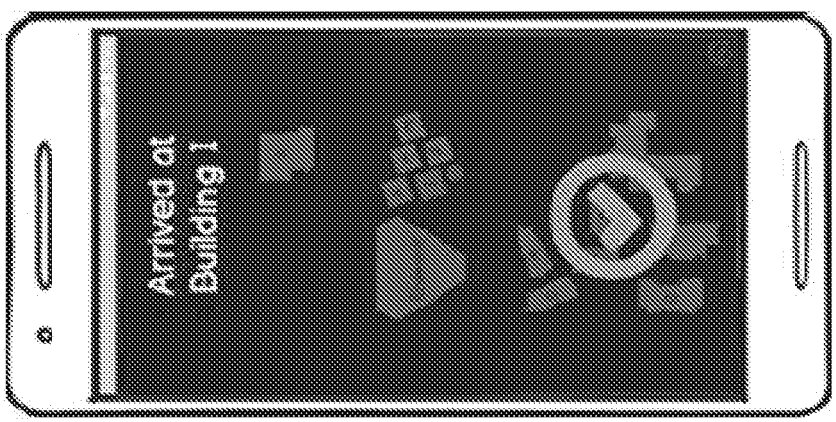
Figure 56I:
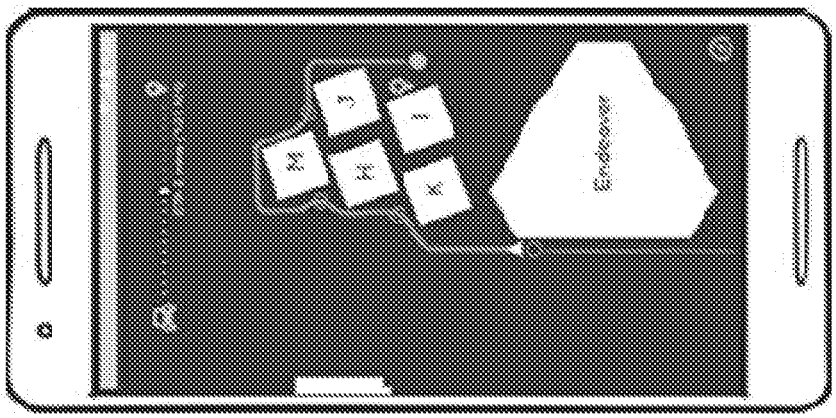

FIG. 56A-56I shows an example non-limiting mobile app that can be present on a passenger's mobile device. Such applications can also be deployable on stationary tablets at main shuttle stops (kiosk). Using such a mobile app, passengers can summon and track their shuttle rides, provide survey and feedback (app usage monitoring and shuttle service ratings), and use Outlook calendar integration (notification to offer shuttle). After greeting the user by name "Hello Stephen" (FIG. 56B), the app may display a map and allow the user to select "Pickup (nearest destination)" to schedule a pickup at the user's current location (in this case building 1) (FIG. 56C). The user may select a destination using the touch screen (in this case building C) (FIG. 56D). The app then displays a proposed route along with a proposed pickup time and an estimated time to arrival at the destination (FIG. 56E). The app lights up a "request shuttle" button (FIG. 56E) that the user depresses to request the shuttle. Once this button is depressed, the app requests the user to proceed to the pickup stop while displaying the shuttle's current location and estimated time of arrival (FIG. 56F, 56G). Once the shuttle arrives at the pickup point, the app displays an arrival notification (FIG. 56H). FIG. 56I shows a further map display of all active shuttles and the current locations of each.

Figure 57:
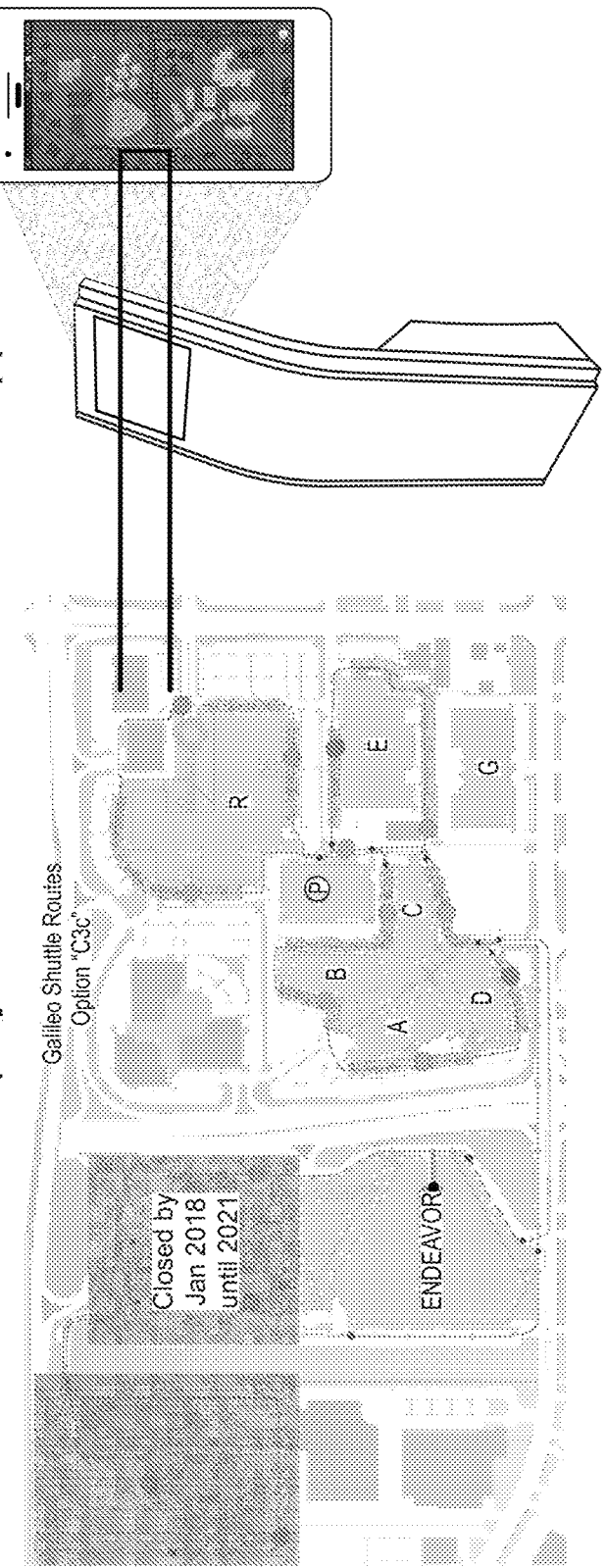
Figure 58:
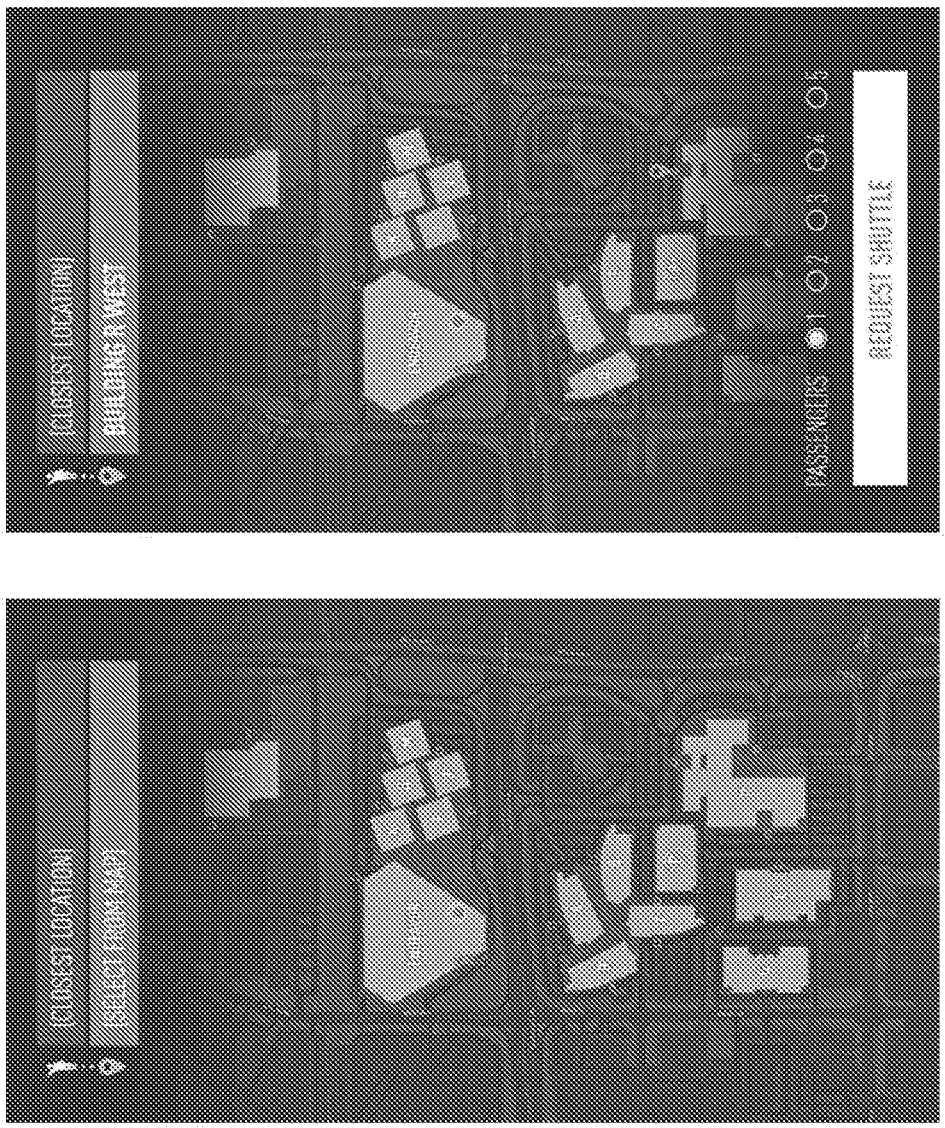

FIG. 57 illustrates that the FIG. 56 displays could also or alternatively be provided on a stationary kiosk device located in the lobby of for example building R. FIG. 58 shows alternative or additional request shuttle displays that allow the user to request a shuttle for a selectable number of passengers (e.g., up to five passengers).

While the invention has been described in terms of what is presently considered to be the most practical and preferred embodiments, it is to be understood that the invention is not to be limited to the disclosed embodiments. For example, unless expressly stated, the invention is not limited to any type or number of sensors; any number or type of sensors falling within the language of the claims may be used. Moreover, as an example, while the discussion above has been presented using NVIDIA hardware as an example, any type or number of processor(s) can be used. On the contrary, is intended to cover various modifications and equivalent arrangements included within the spirit and scope of the appended claims.

The invention claimed is:

1. A vehicle comprising:
a propulsion system delivering power to propel the vehicle;
a passenger space to accommodate at least one passenger;
one or more first sensors to monitor at least a portion of an environment outside the vehicle;
one or more second sensors to monitor at least a portion of the passenger space; and
a controller operatively coupled to the one or more first sensors, the one or more second sensors, and the propulsion system, the controller including at least one graphics processing unit (GPU) and at least one deep learning accelerator, the controller to, without intervention by a human driver, is configured:
identify a passenger to ride in the vehicle;
control the vehicle to take on the identified passenger;
navigate the vehicle including planning a route to a destination; and
control the vehicle to arrange for the identified passenger to leave the passenger space at the destination,
wherein the controller provides massively parallel processing and the vehicle achieves an ISO 26262 level 4 or higher certification.

2. The vehicle of claim 1, wherein the passenger is identified based at least on the controller processing data generated using the one or more first sensors to recognize at least one of a gesture or a pose of the passenger that indicates that an intent of the passenger is to use the vehicle.

3. The vehicle of claim 1, wherein the identifying is based on the passenger operating a mobile user device.

4. The vehicle of claim 1, wherein the controller is further to receive the destination specified by the passenger or another passenger, and plan a route to the specified destination.

5. The vehicle of claim 4, wherein the controller is further to use artificial intelligence to dynamically plan the route and navigate to the specified destination.

6. The vehicle of claim 1, wherein the one or more first sensors include one or more LIDAR sensors, and the controller is configured further to dynamically map at least a portion of the environment around the vehicle using the one or more LIDAR sensors.

7. The vehicle of claim 1, further including a signaling device associated with the vehicle, the signaling device to signal an indication of an intention to pick up the passenger.

8. The vehicle of claim 1, further including a passenger information display disposed in the passenger compartment, the passenger information display to display one or more visualizations corresponding to one or more operations of the vehicle.

9. The vehicle of claim 1, wherein at least a subset of the one or more second sensors are to simultaneously sense concurrent activities of multiple passengers within the passenger space.

10. A system comprising:
a passenger space that can accommodate at least one passenger;
one or more first sensors to monitor at least a portion of an environment outside a vehicle;
one or more second sensors to monitor at least a portion of the passenger space; and
a controller including at least one graphics processing unit (GPU) and at least one deep learning accelerator, the controller to, without intervention by a human driver, perform operations comprising:
identifying a passenger;
controlling the vehicle to an origin location to onboard the identified passenger;
navigating the vehicle to a destination location; and
controlling the vehicle to a drop off location at the destination location to offload the passenger,
wherein the system provides massively parallel processing and achieves an ISO 26262 level 4 or higher certification.

11. The system of claim 10, wherein the identifying includes using the one or more first sensors and artificial intelligence to recognize at least one of a gesture or a pose of a prospective passenger.

12. The system of claim 10, wherein the identifying is based on the passenger operating a mobile user device.

13. The system of claim 10, wherein the operations further comprise the passenger specifying the destination location, and the controller planning a route to the destination location.

14. The system of claim 13, further comprising using artificial intelligence to dynamically plan the route and navigate to the specified destination.

15. The system of claim 10, wherein the one or more first sensors include one or more LIDAR sensors, and the operations further include dynamically mapping at least a portion of the environment around the vehicle using the one or more LIDAR sensors.

16. The system of claim 10, further including signaling, with a signaling device associated with the vehicle, an indication of
an intention to onboard the passenger.

17. The system of claim 10, wherein the system further includes a passenger information display disposed in the passenger compartment, and the operations further include displaying an indication of one or more operations of the vehicle to the passenger on the display.

18. The system of claim 10, wherein the operations further comprise simultaneously sensing concurrent activities of multiple passengers within at least a portion of the passenger space.

19. A system comprising:
one or more processors, including one or more graphics processing units (GPUs) that are used to perform massively parallel processing, the processors configured to perform operations comprising:
identifying a passenger using one or more external facing sensors of a vehicle;
controlling the vehicle to a pickup location to onboard the passenger;
navigating the vehicle to a destination location;
monitoring the passenger during at least a portion of the navigating using one or more internal facing sensors; and
controlling the vehicle to a drop off location at the destination location to drop off the passenger.

20. The system of claim 19, wherein the system achieves an ISO 26262 level 4 or higher certification.

* * * * *